United States Patent
Yun et al.

(10) Patent No.: US 9,865,224 B2
(45) Date of Patent: Jan. 9, 2018

(54) TRANSPARENT DISPLAY APPARATUS AND DISPLAY METHOD THEREOF

(71) Applicant: Samsung Electronics Co. Ltd., Suwon-si, Gyeonggi-do (KR)

(72) Inventors: Il-kook Yun, Suwon-si (KR); Joon-kyu Seo, Suwon-si (KR); Chang-soo Lee, Seosan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 718 days.

(21) Appl. No.: 13/957,027

(22) Filed: Aug. 1, 2013

(65) Prior Publication Data

US 2014/0035942 A1 Feb. 6, 2014

(30) Foreign Application Priority Data

Aug. 1, 2012 (KR) .......................... 10-2012-0084482
Feb. 19, 2013 (KR) .......................... 10-2013-0017637

(51) Int. Cl.
*G09G 5/02* (2006.01)
*G09G 5/00* (2006.01)
(Continued)

(52) U.S. Cl.
CPC .......... *G09G 5/006* (2013.01); *G06F 1/1601* (2013.01); *G06F 1/1637* (2013.01);
(Continued)

(58) Field of Classification Search
CPC ....... G06T 15/503; G06T 11/001; G06T 1/60; G09G 2340/10; G09G 5/393; G09G 5/006;
(Continued)

(56) References Cited

U.S. PATENT DOCUMENTS 7,205,959 B2 * 4/2007 Henriksson ............... G09F 9/00
345/169
7,304,784 B2 12/2007 Chui et al.
(Continued)

FOREIGN PATENT DOCUMENTS

CN 101594403 A 12/2009
CN 102385477 A 3/2012
(Continued)

OTHER PUBLICATIONS

Free Photo Slide Show 2.8, Graphic Region, Jul. 28, 2013.
European Office Action dated Oct. 4, 2017, issued on the European Application No. 13178888.7.

*Primary Examiner* — Abderrahim Merouan
(74) *Attorney, Agent, or Firm* — Jefferson IP Law, LLP

(57) ABSTRACT

A transparent display apparatus is provided. The transparent display includes a display including a plurality of transparent display layers, and a controller configured to control the display, when a first event occurs, to display a first screen on a first transparent display layer from among the plurality of transparent display layers, and to display a second screen on a second transparent display layer that is from among the plurality of transparent display layers, wherein the controller controls the display to display the first screen that is currently displayed on the first transparent display layer to be displayed on the second transparent display layer for a predetermined time when a second event occurs.

18 Claims, 42 Drawing Sheets

(51) Int. Cl.
*G06F 3/14* (2006.01)
*G06F 1/16* (2006.01)
*G06F 3/0481* (2013.01)
*G06F 3/0483* (2013.01)
*G06F 3/0488* (2013.01)
*G02F 1/1347* (2006.01)

(52) U.S. Cl.
CPC .......... *G06F 1/1647* (2013.01); *G06F 3/0481* (2013.01); *G06F 3/0483* (2013.01); *G06F 3/04815* (2013.01); *G06F 3/04883* (2013.01); *G06F 3/1431* (2013.01); *G02F 1/13471* (2013.01); *G09G 2300/023* (2013.01); *G09G 2340/14* (2013.01); *G09G 2360/144* (2013.01)

(58) Field of Classification Search
CPC ......... G09G 2300/023; G09G 2340/14; G09G 2360/144; G06F 1/1601; G06F 1/1637; G06F 1/1647; G06F 3/0481; G06F 3/04815; G06F 3/0483; G06F 3/04883; G06F 3/1431; G02F 1/13471
See application file for complete search history.

(56) References Cited

U.S. PATENT DOCUMENTS

| | | | |
|---|---|---|---|
| 7,999,993 B2 | 8/2011 | Chui et al. | |
| 8,362,992 B2* | 1/2013 | Kuhlman | G02F 1/13306 345/1.1 |
| 8,497,884 B2* | 7/2013 | Cholewin | G06F 1/1626 345/678 |
| 8,649,824 B2 | 2/2014 | Choi et al. | |
| 8,912,986 B2* | 12/2014 | Yamano | G09G 3/20 345/173 |
| 8,941,683 B2* | 1/2015 | Son | G06F 3/0487 345/629 |
| 8,943,427 B2 | 1/2015 | Heo et al. | |
| 9,361,851 B1* | 6/2016 | Basehore | G09G 3/38 |
| 2005/0052341 A1* | 3/2005 | Henriksson | G09F 9/00 345/4 |
| 2006/0077155 A1 | 4/2006 | Chui et al. | |
| 2006/0097991 A1* | 5/2006 | Hotelling | G06F 3/0416 345/173 |
| 2007/0052616 A1 | 3/2007 | Yoon | |
| 2008/0055706 A1 | 3/2008 | Chui et al. | |
| 2008/0231544 A1 | 9/2008 | Cooper et al. | |
| 2009/0295731 A1* | 12/2009 | Kim | G06F 1/1616 345/168 |
| 2009/0298537 A1 | 12/2009 | Choi | |
| 2009/0298548 A1* | 12/2009 | Kim | H04M 1/72544 455/566 |
| 2011/0050594 A1 | 3/2011 | Kim et al. | |
| 2011/0074716 A1* | 3/2011 | Ono | G06F 1/1626 345/173 |
| 2011/0163986 A1* | 7/2011 | Lee | G06F 1/1692 345/173 |
| 2011/0187655 A1 | 8/2011 | Min et al. | |
| 2011/0242103 A1* | 10/2011 | Han | H04N 13/0022 345/419 |
| 2012/0019434 A1* | 1/2012 | Kuhlman | G02F 1/13306 345/1.3 |
| 2012/0023425 A1 | 1/2012 | Hackborn et al. | |
| 2012/0060089 A1* | 3/2012 | Heo | G06F 1/1647 715/702 |
| 2012/0105487 A1* | 5/2012 | Son | G06F 3/0487 345/671 |
| 2012/0113140 A1* | 5/2012 | Hilliges | G06F 3/012 345/633 |
| 2012/0238325 A1* | 9/2012 | Jung | H04M 1/72563 455/566 |
| 2012/0256886 A1* | 10/2012 | Ryu | G06F 1/1632 345/204 |
| 2014/0232704 A1* | 8/2014 | Kim | G09G 3/20 345/204 |
| 2015/0024728 A1* | 1/2015 | Jang | H04M 1/72519 455/418 |

FOREIGN PATENT DOCUMENTS

| | | |
|---|---|---|
| EP | 2 129 084 A1 | 12/2009 |
| KR | 10-2011-0081040 A | 7/2011 |
| KR | 10-2011-0125356 A | 11/2011 |
| KR | 10-2011-0128611 A | 11/2011 |
| KR | 10-2012-0003423 A | 1/2012 |
| RU | 2397519 C2 | 8/2010 |

* cited by examiner

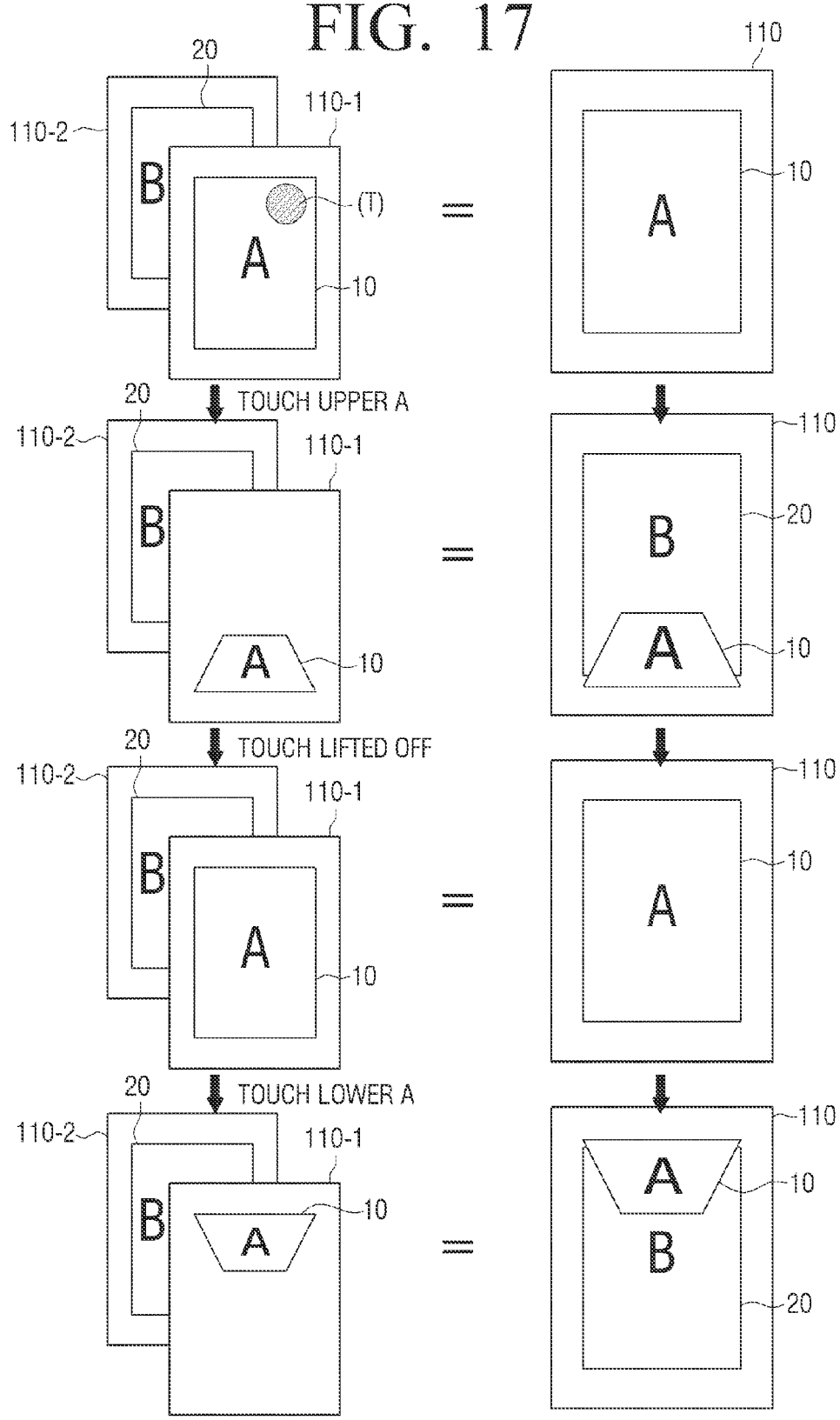

FIG. 35
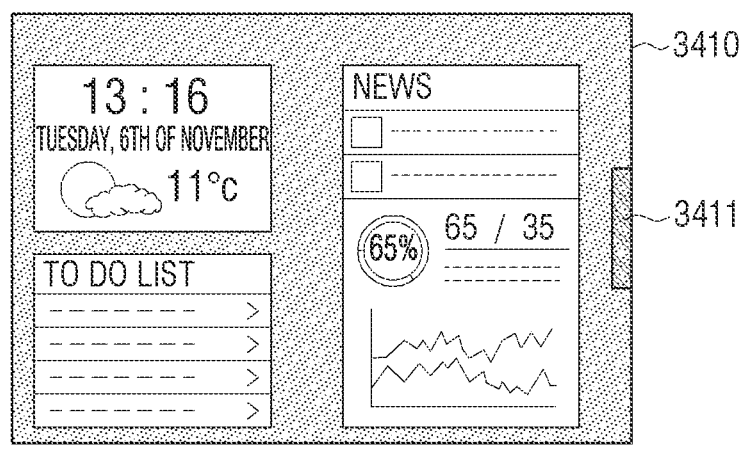
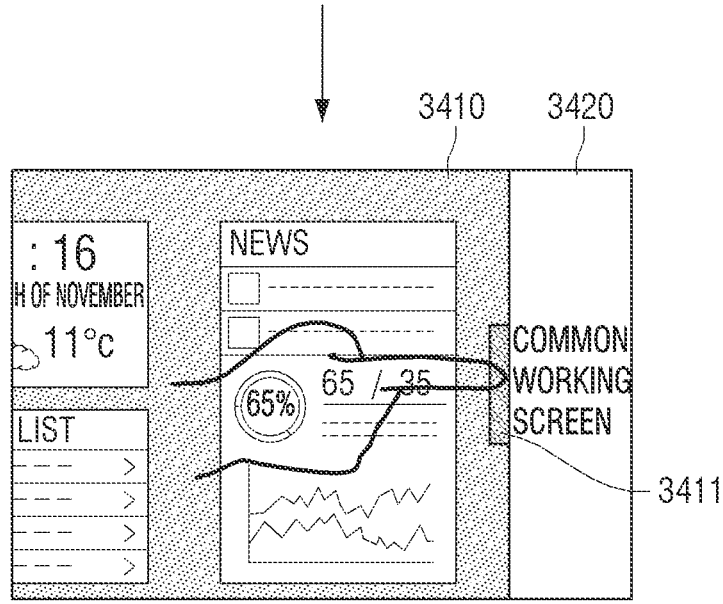

FIG. 38
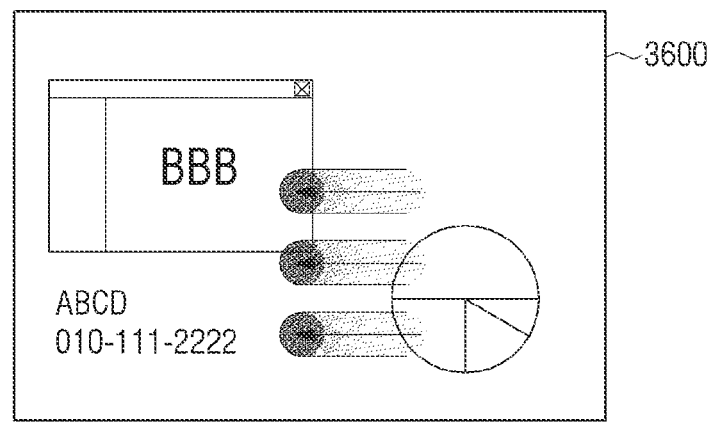
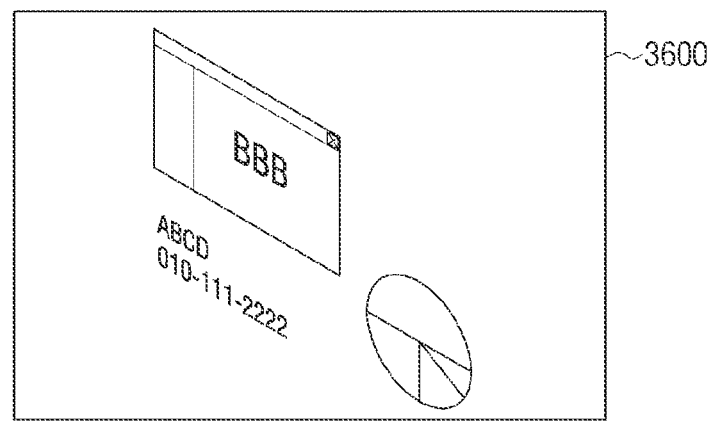
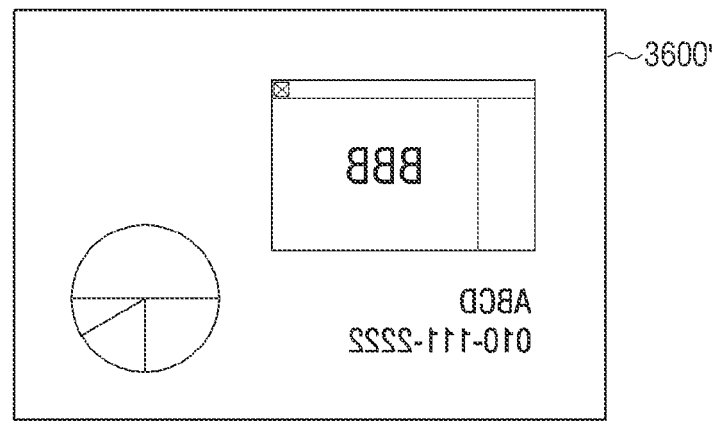

TRANSPARENT DISPLAY APPARATUS AND DISPLAY METHOD THEREOF

CROSS-REFERENCE TO RELATED APPLICATION(S)

This application claims the benefit under 35 U.S.C. §119(a) of a Korean patent application filed on Aug. 1, 2012 in the Korean Intellectual Property Office and assigned Serial No. 10-2012-0084482, and under 35 U.S.C. §119(a) of a Korean patent application filed on Feb. 19, 2013 in the Korean Intellectual Property Office and assigned Serial No. 10-2013-0017637, the entire disclosure of which is hereby incorporated by reference.

TECHNICAL FIELD

The present disclosure relates to a transparent display apparatus and a display method thereof. More specifically, the present disclosure relates to a transparent display apparatus including a plurality of transparent display layers and a display method thereof.

BACKGROUND

Fast development of the electronic technology has enabled the use of various types of display apparatuses in many fields. Research and development are focused on the next-generation display apparatuses, such as a transparent display apparatus. The transparent display apparatus is a device which has transparency so that the background behind the device is seen through the device. Related display panels are manufactured using non-transparent semiconductor compounds such as silicon (Si) or Gallium Arsenic (GaAs). However, as demands rise for various display services that may not be implemented by the related display panels, efforts are made to develop new types of electronic elements. The transparent display apparatus was developed by one of these efforts.

The transparent display apparatus includes a transparent oxide semiconductor layer, and thus, has transparency. When the transparent display apparatus is used, a user can view information through screen of the transparent display apparatus while looking at the background that is at the back side of the apparatus. Therefore, dimension and time limitations that related display apparatuses may have may be resolved. Because the transparent display apparatus displays various information with display units having transparency, real object figures seen through the back side are harmonized with the displayed information. Thus, as user needs are gradually diversified, new technology is needed in order to provide information with more advanced methods while using the transparent display apparatus in a variety of environments.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a concept is not required to overcome the disadvantages described above, and an embodiment of the present disclosure concept may not overcome any of the problems described above.

According to an embodiment, a technical objective is to provide a transparent display apparatus that provides information by using a plurality of transparent display layers, and a display method thereof.

According to an embodiment, a transparent display apparatus is provided. The transparent display apparatus includes a display including a plurality of transparent display layers, and a controller configured to control the display, when a first event occurs, to display a first screen on a first transparent display layer from among the plurality of transparent display layers, and to display a second screen on a second transparent display layer that is from among the plurality of transparent display layers. Herein, the controller may control the display to display the first screen that is currently displayed on the first transparent display layer to be displayed on the second transparent display layer for a predetermined time when a second event occurs.

According to an embodiment, a display method of the transparent display apparatus is provided. The method may include displaying a first screen on a first transparent display layer from among a plurality of transparent display layers, displaying a second screen, the second screen being different from the first screen, on a second transparent display layer from among the plurality of transparent display layers, when a first event occurs, and displaying the first screen displayed on the first transparent display layer on the second transparent display layer for a predetermined time, when a second event occurs.

According to an embodiment, a transparent display apparatus is provided. The transparent display apparatus may include a transparent display, a first sensor configured to sense a first touch inputted to a first surface of the transparent display, a second sensor configured to sense a second touch inputted to a second surface of the transparent display, an image processor configured to generate a cooperative job screen controllable by the first touch and the second touch and an individual job screen controllable by the first touch or the second touch, and a controller configured to display at least one of the individual job screen and the cooperative job screen to the transparent display according to a user manipulation.

According to an embodiment, a display method of a transparent display apparatus is provided. The method may include displaying an individual job screen on a transparent display, controlling the individual job screen in accordance with a first touch inputted to a first surface of the transparent display, displaying a cooperative job screen on the transparent display when an event occurs, and cooperatively controlling the cooperative job screen in accordance with the first touch inputted to the first surface of the transparent display and a second touch inputted to a second surface.

According to the above various embodiments, the transparent display apparatus may provide various information through a plurality of transparent display layers, further enhancing user satisfaction.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 17 is a view provided to explain screen converting operation while the plurality of transparent display layers respectively display screens according to an embodiment of the present disclosure;

FIGS. 34 and 35 are provided to explain a method for displaying a cooperative job screen on one side of the individual job screen according to an embodiment of the present disclosure;

FIG. 38 is a view provided to explain a method for inversing an individual job screen entirely to a state perceivable at an opposite side according to an embodiment of the present disclosure;

Throughout the drawings, it should be noted that like reference numbers are used to depict the same or similar elements, features, and structures.

DETAILED DESCRIPTION

Figure 1:
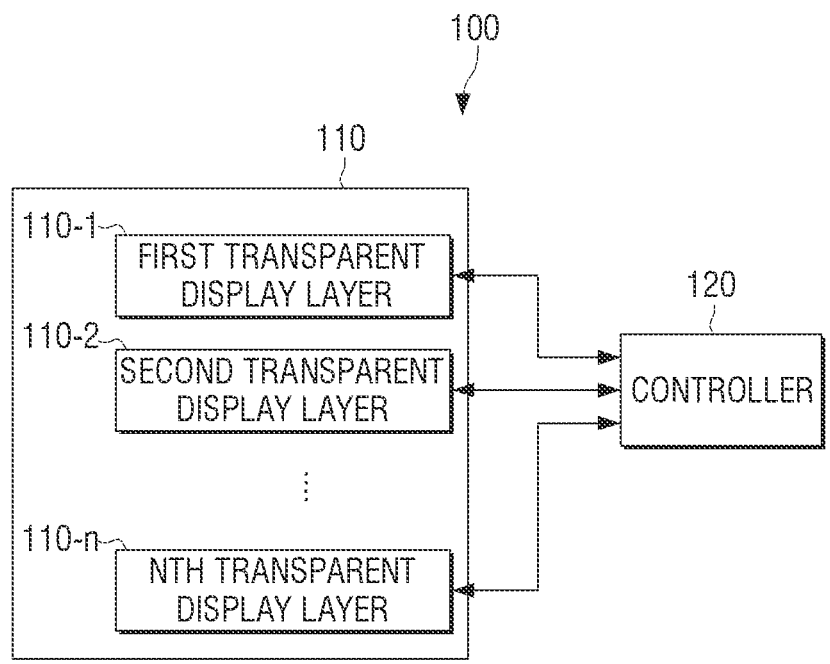
FIG. 1 is a block diagram of a transparent display apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, same drawing reference numerals are used for the same elements even in different drawings. The matters defined in the description, such as detailed construction and elements, are provided to assist in a comprehensive understanding of the present disclosure concept. Accordingly, it is apparent that the various embodiments of the present disclosure concept can be carried out without those specifically defined matters. Also, well-known functions or constructions are not described in detail since they would obscure the disclosure with unnecessary detail.

FIG. 1 is a block diagram of a transparent display apparatus according to an embodiment of the present disclosure.

Referring to FIG. 1, the transparent display apparatus 100 includes a display 110 and a controller 120. The display 110 includes a plurality of transparent display layers 110-1~110-n. Each of the transparent display layers 110-1~110-n may separately display information. Further, because the transparent display layers 110-1~110-n have transparency respectively, the background of the transparent display apparatus 100 may be seen even if the plural layers are overlapped. Detailed constitution of the transparent display layers 110-1~110-n will be specifically described in a later part of the specification.

The controller 120 may respectively display various types of screens by controlling each of the transparent display layers 110-1~110-n. Specifically, the controller 120 may display a first screen on a first transparent display layer, which is one among the plurality of transparent display layers, and may display a second screen on a second transparent display layer, which is another among the plurality of the transparent display layers, when a first event occurs.

Herein, the first screen and the second screen may have sources that are independent of each other. For example, playing screens regarding multimedia contents different from each other may be respectively provided as first and second screens. Alternatively, playing screens of applications different from each other may be respectively provided as first and second screens.

Further, when a second event occurs, the controller 120 may modify the transparent display layers where the first or second screen is displayed. Specifically, when the second event occurs, the controller 120 may display the first screen, which was displayed on the first transparent display layer, on the second transparent display layer for a predetermined time. On the contrary, the controller 120 may display the second screen, which was displayed on the second transparent display layer, on the first transparent display layer for a predetermined time. Further, the controller 120 may convert mutual positions of the transparent display layers on which the first screen and the second screen are displayed. Such operation of the controller 120 may be different according to a type of the second event.

Meanwhile, it is assumed herein that the first transparent display layer is transparent display layer arranged according to a direction in which a user stands relative to the transparent display apparatus and that the second transparent display layer is transparent display layer arranged on the backside of the direction for convenient explanation. For example, when the two transparent display layers 110-1, 110-2 are arranged, an upper layer may be first transparent display layer 110-1 and a lower layer may be second transparent display layer 110-2. However, this is merely one embodiment of the present disclosure, and the controller 120 may display the first screen on the lower layer at first and the second screen on the upper layer when specific event occurs thereafter.

The first screen or the second screen may be variously implemented, and may be a playing screen of images, texts, icons or contents, an application implementing screen, a web browser screen, or other graphic objects screens. As a result, when a user stands on one side of the transparent display apparatus 100, he may comprehensively view screens displayed on each of the transparent display layers 110-1~110-n with the background. The number of the transparent display layers 110-1~110-n may be variously implemented according to a device type, a device size, and a user environment. For convenient explanation, the following will explain a method for displaying screens on the two transparent display layers 110-1, 110-2.

Figure 2:
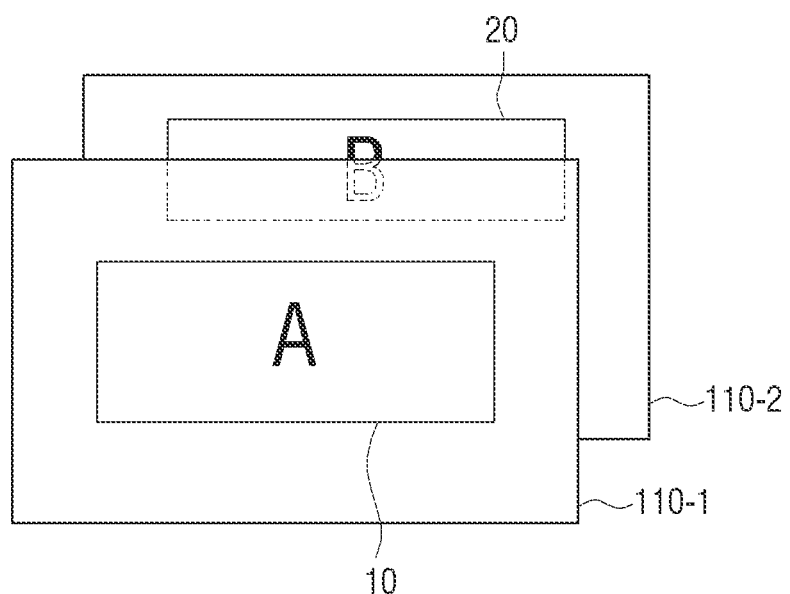
FIG. 2 is a view provided to explain a method for displaying a plurality of screens through a plurality of transparent display layers according to an embodiment of the present disclosure.

FIG. 2 illustrates that screens are respectively displayed on the two transparent display layers 110-1, 110-2 according to an embodiment of the present disclosure.

Referring to FIG. 2, while a first screen 10 is displayed on the first transparent display layer 110-1, a second screen 20 is displayed on the second transparent display layer 110-2. Thereby, when a user stands on the front side, he may view the first screen 10 and the second screen 20 with the background. Because the layers in which the first and second screens 10, 20 are displayed are different from each other, a user may feel perspective feelings between the first and second screens 10, 20. Thus, dimensional feeling can be felt more naturally, and a user may experience a 3-Dimensional (3D) view or perspective of a 2-Dimensional (2D) display.

Further, when the controller 120 generates the first and second screens 10, 20 with uniform images such as arrows, and consecutively displays them according to a time interval, effects to dimensionally guide user paths may be obtained. Screens to be displayed on each of the first and second transparent display layers 110-1, 110-2 may be provided from external devices. Thus, the controller 120 of the transparent display apparatus 100 may receive various screen data from an external server, memory, a Personal Computer (PC), a contents player, or any other similar and/or suitable external source, and may display the screen data through the first and second transparent display layers 110-1, 110-2. Further, such screen data may be generated internally and displayed by the transparent display apparatus 100. When the transparent display apparatus 100 generates the screen data internally, the controller 120 may provide screens to be displayed on each of the first and second transparent display layers 110-1, 110-2 by using different frame buffers with each other.

Figure 3:
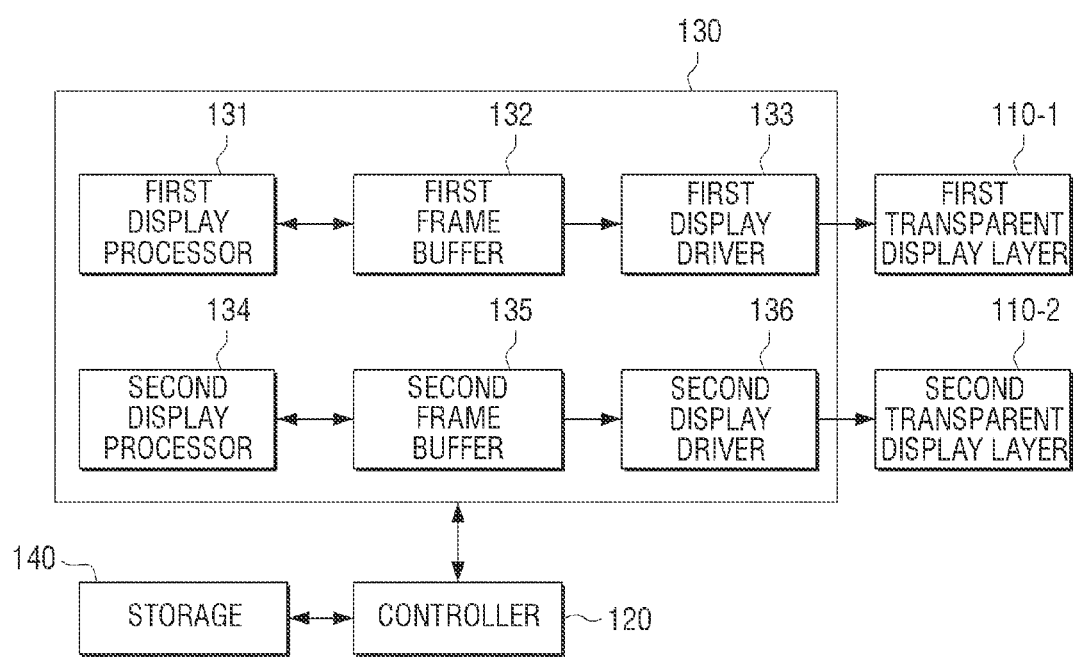
FIG. 3 is a block diagram of the transparent display apparatus which displays screens on each of the transparent display layers by using a plurality of frame buffers according to an embodiment of the present disclosure.

FIG. 3 is a block diagram provided to explain constitution of the transparent display apparatus according to an embodiment which image processing is performed by itself according to an embodiment of the present disclosure.

Referring to FIG. 3, the transparent display apparatus 100 includes a display 110 that includes the first and second transparent display layers 110-1, 110-2, a controller 120, an image processor 130, and a storage 140. The storage 140 may store programs such as an Operating System (OS) and various applications and various data such as user setting data, data generated while implementing applications, and multimedia contents. The controller 120 controls the image processor 130 by using programs and/or data stored in the storage 140. The image processor 130 generates and provides screens to be displayed on the first and second transparent display layers 110-1, 110-2 according to a controlling of the controller 120. The image processor 130 includes first and second display processors 131, 134, first and second frame buffers 132, 135, and first and second display drivers 133, 136.

The first and second display processors 131, 134 respectively generate screen data by performing signal processing according to the control of the controller 120. The first and second display processors 131, 124 may respectively mount a calculator (not illustrated) and a renderer (not illustrated). The calculator calculates feature values such as coordinate value, shape, size and color which screen objects will be marked according to preset layouts. The renderer generates screen data of various layouts which include objects based on the calculated feature values by the calculator. The screen data generated in the first display processor 131 is stored in the first frame buffer 132, and the screen data generated in the second display processor 134 is stored in the second frame buffer 135. Such screen data may be generated and stored in bitmap image format, for example.

The first display driver 133 converts the screen data stored in the first frame buffer 132 to first image source signals and provides them to the first transparent display layer 110-1. The second display driver 136 converts the screen data stored in the second frame buffer 135 to second image source signals and provides them to the second transparent display layer 110-2. Herein, the first and second image source signals include scan signals and driving signals which are provided to electrodes connected with respective cells which constitute the first and second transparent display layers 110-1, 110-2. Therefore, the first and second transparent display layers 110-1, 110-2 may display the first and second screens as illustrated in FIG. 2.

A transparent display layer may be implemented as various display types such as a transparent Liquid Crystal Display (LCD) type, a transparent Thin-Film Electroluminescent (TFEL) type, and a transparent Organic Light Emitting Diode (OLED) type, or any other similar and/or suitable display type.

The transparent LCD type may be a transparent display apparatus which is implemented by removing backlight units from a LCD device which is currently used, and using a pair of polarized light panels, optical film, a transparent thin-film transistor, and a transparent electrode. In a transparent LCD device, transmittance is lower compared to the polarized light panels or the optical film and light efficiency is lower because surrounding lights are used instead of the backlight units; however, the transparent LCD device has an advantage that an encountering transparent display may be implemented.

The transparent TFEL type may be an apparatus using a current-type inorganic TFEL display (AC-TFEL) which is constituted with a transparent electrode, an inorganic luminescent and an insulating layer.

The AC-TFEL may be a display which emits lights by exciting the inorganic luminescent while accelerating electrons to pass through inner paths of the inorganic luminescent. When each transparent display layer is implemented as a transparent TFEL, the controller 120 may determine information marking position by adjusting so that the electrons can pass through on proper positions. Because the inorganic luminescent and the insulting layer have transparency, a display having extreme transparency may be implemented.

The transparent OLED type may be a transparent display apparatus using OLED that can emit light by itself. Because an organic emitting layer is transparent, when both electrodes are used as transparent electrodes, the organic emitting layer may be implemented as a transparent display apparatus. The OLED generates lights by projecting electrons and holes on both sides of the organic emitting layer so that they are combined within the organic emitting layer. The transparent OLED apparatus displays information by using such a principle, i.e., by projecting electrons and holes at requested positions.

Figure 4:
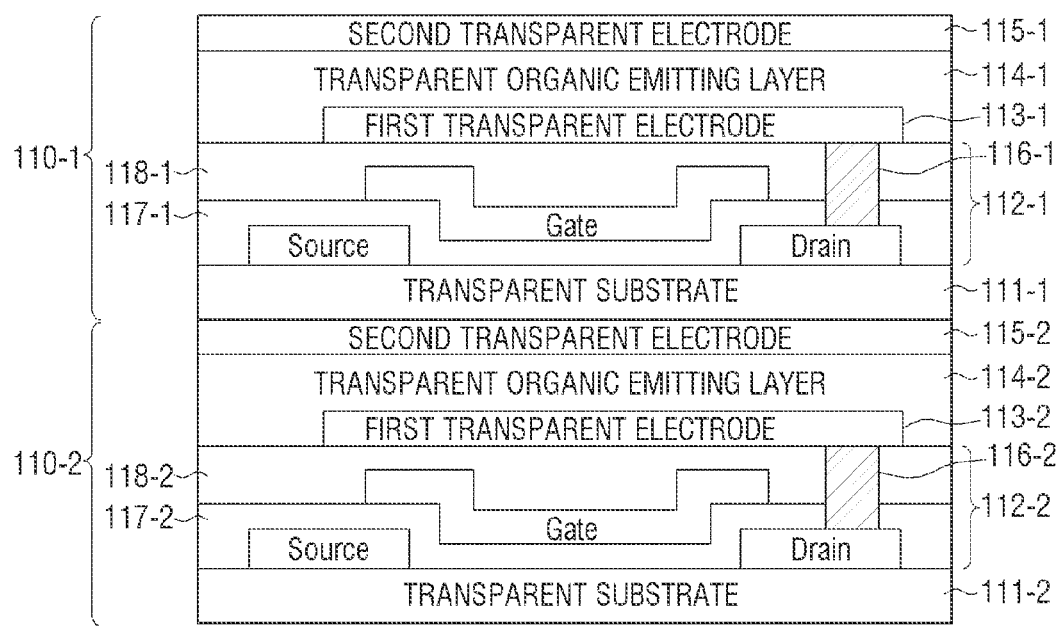
FIGS. 4 and 5 are views provided to explain various embodiments regarding detailed constitution of the display which includes the plurality of transparent display layers according to an embodiment of the present disclosure.
Figure 5:
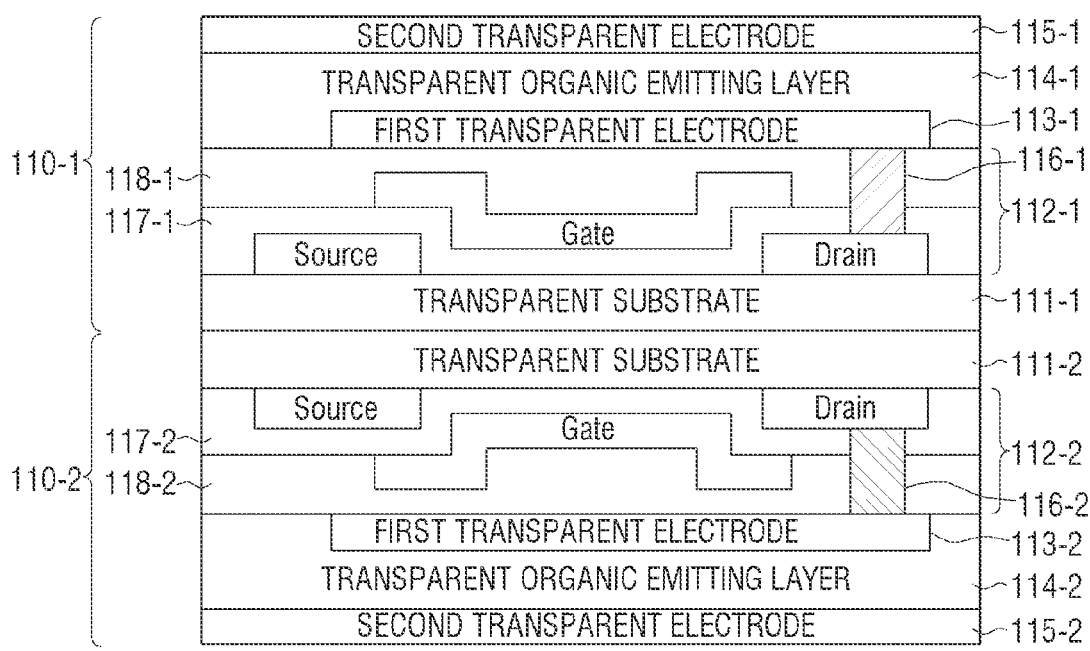

FIGS. 4 and 5 are views provided to explain various embodiments regarding detailed constitution of the display which includes the plurality of transparent display layers according to an embodiment of the present disclosure.

Referring to FIG. 4, an example of a constitution which the transparent display layers, implemented as transparent OLED type, are consecutively integrated toward uniform direction. For convenient explanation, FIG. 4 illustrates that the two transparent display layers 110-1, 110-2 are integrated. First, the first transparent display layer 110-1 includes a transparent panel 111-1, a transparent transistor layer 112-1, a first transparent electrode 113-1, a transparent organic light-emitting layer 114-1, a second transparent electrode 115-1, a connecting electrode 116-1 and conductive layers 117-1, 118-1. The second transparent display layer 110-2 includes a transparent panel 111-2, a transparent transistor layer 112-2, a first transparent electrode 113-2, a transparent organic light-emitting layer 114-2, a second transparent electrode 115-2, a connecting electrode 116-2 and conductive layers 117-2, 118-2.

The first and second transparent display layers 110-1, 110-2 connect with each other where the second transparent electrode 115-2 of the second transparent display layer 110-2 has a face that is adjacent to a face of the transparent panel 111-1 of the first transparent display layer 110-1. Therefore, when the first transparent display layer 110-1 and the second transparent display layer 110-2 are related with each other vertically, the first transparent display layer 110-1 at a upper position may be defined as upper layer and the second transparent display layer 110-2 at a lower position may be defined as lower layer.

Referring to FIG. 4, the first and second transparent display layers 110-1, 110-2 may have a uniform constitution. The following will specifically describe detailed constitution and operation of the first transparent display layer 110-1. For the transparent panel 111-1, a polymer material having transparency, such as plastics, glasses, or any suitable material may be used. Materials of the transparent panel 111-1 may be determined according to user environment which the transparent display apparatus 100 is applied. For example, because a polymer material has an advantage in lightness and flexibility, it may be used in mobile display apparatuses. Glass may be used in show windows of shops or general windows.

The transparent transistor layer 112-2 may be a layer which includes transistors manufactured by substituting nontransparent silicon of the related thin-film transistor with transparent materials, such as zinc oxides, oxide titanium or any other suitable transparent material. Within the transparent transistor layer 112-2, a source, a gate, and the conductive layers 117-1, 118-1 are installed, and the connecting electrode 116-1 that electrically connects the drain and the first transparent electrode 143-1 may be installed. Although FIG. 4 illustrates one transparent transistor which is constituted with the source, the gate, and the drain; included are a plurality of transparent transistors that are distributed evenly on whole area of the display surface when being implemented.

The controller 120 may scan cells that include transparent transistors by providing the image source signals described above to the source, the gate, and the drain of each transistor within the transparent transistor 112-1, and may display various screens by turning on corresponding cells. Specifically, the first transparent electrode 113-1 and the second transparent electrode 115-1 are arranged on contrary directions to each other based on the transparent organic emitting layer 114-1. The first transparent electrode, the transparent organic emitting layer and the second transparent electrode 113-1, 114-1, 115-1 form the transparent organic light-emitting diodes.

The transparent organic light-emitting diodes are classified into a Passive Matrix OLED (PMOLED) and an Active Matrix OLED (AMOLED) according to driving methods. The PMOLED is a structure in which pixels are formed at crossed areas of the first and second transparent electrodes 113-1, 115-1. Meanwhile, the AMOLED is a structure which Thin-Film Transistors (TFT) driving each pixel are arranged. FIG. 4 illustrates the AMOLED.

The first transparent electrode 113-1 and the second transparent electrode 115-1 respectively mount a plurality of line electrodes, and the arrangement directions of the line electrodes are formed as vertical with each other. For example, when the line electrodes of the first transparent electrode 113-1 are arranged horizontally, the line electrodes of the second transparent electrode 115-1 are arranged vertically. Therefore, between the first transparent electrode 113-1 and the second transparent electrode 115-1, a plurality of crossed areas are formed. On each crossed area, the transparent transistor is connected as illustrated in FIG. 4.

The controller 120 forms a difference of electrical potential in each crossed area by using the transparent transistor. Within the crossed area in which the electrical potential difference is formed, electrons and holes project from each electrode toward the transparent organic emitting layer 114-1, combine with each other, and thus, emit light. Meanwhile, at the crossed area that the electrical potential difference is not formed, emitting of light is not performed. Thus, the background is transparent and seen through clearly.

For the first and second transparent electrodes 113-1, 115-1, Indium Tin Oxide (ITO) may be used, however the embodiments of the present disclosure are not limited thereto, and any suitable and/or similar material may be used. For example, new materials such as graphene may be used. Graphene may be a material in which carbon atoms connect with each other to constitute a bee-hive shaped planar structure, and transparency is obtained. The transparent organic light emitting layer 114-1 may be implemented with various materials.

Further, the controller 120 may control displaying screens on the second transparent display layer 110-2 by using the transparent transistors within the second transparent display layer 110-2. As a result, the first and second transparent display layers 110-1, 110-2 respectively display screens.

If the first and second transparent display layers 110-1, 110-2 are arranged toward uniform direction, as illustrated in FIG. 4, when the controller 120 displays screens having uniform pixel values at uniform coordinates with respect to the first and second transparent display layers 110-1, 110-2, the arrangement directions of the first and second screens are the same. Thus, when a user stands on the front side, he may view both of the first and second screens as displayed. Meanwhile, although FIG. 4 illustrates that the first and second transparent display layers 110-1, 110-2 are arranged toward a uniform direction, the first and second transparent display layers 110-1, 110-2 may be arranged towards directions that are opposite to each other.

FIG. 5 illustrates that the first and second transparent display layers 110-1, 110-2 are consecutively integrated at opposite directions to each other according to an embodiment of the present disclosure.

Referring to FIG. 5, the transparent panel 111-1 within the first transparent display layer 110-1 and the transparent panel 111-2 within the second transparent display layer 110-2 are arranged to be attached with each other.

If the first and second transparent display layers 110-1, 110-2 are arranged as illustrated in FIG. 5, when the controller 120 displays screens having uniform pixel values at uniform coordinates with respect to the first and second transparent display layers 110-1, 110-2, the arrangement directions of the first and second screens are opposite to each other. In other words, when a user stands on the front side, the first screen may be viewed as displayed while the second screen may be viewed as horizontally reversible. A user should turn back the transparent display apparatus 100 or move himself to the back side of the transparent display apparatus 100 in order to view the second screen.

Referring to FIGS. 4 and 5, the plurality of transparent display layers are consecutively arranged at uniform directions or opposite directions. However, this is merely one of various embodiments, and the arrangement order of the transparent display layers may be established variously. Thus, the plurality of transparent display layers may be arranged to be parallel, to face with each other, or to slide while overlapping their parts with each other.

Figure 6:
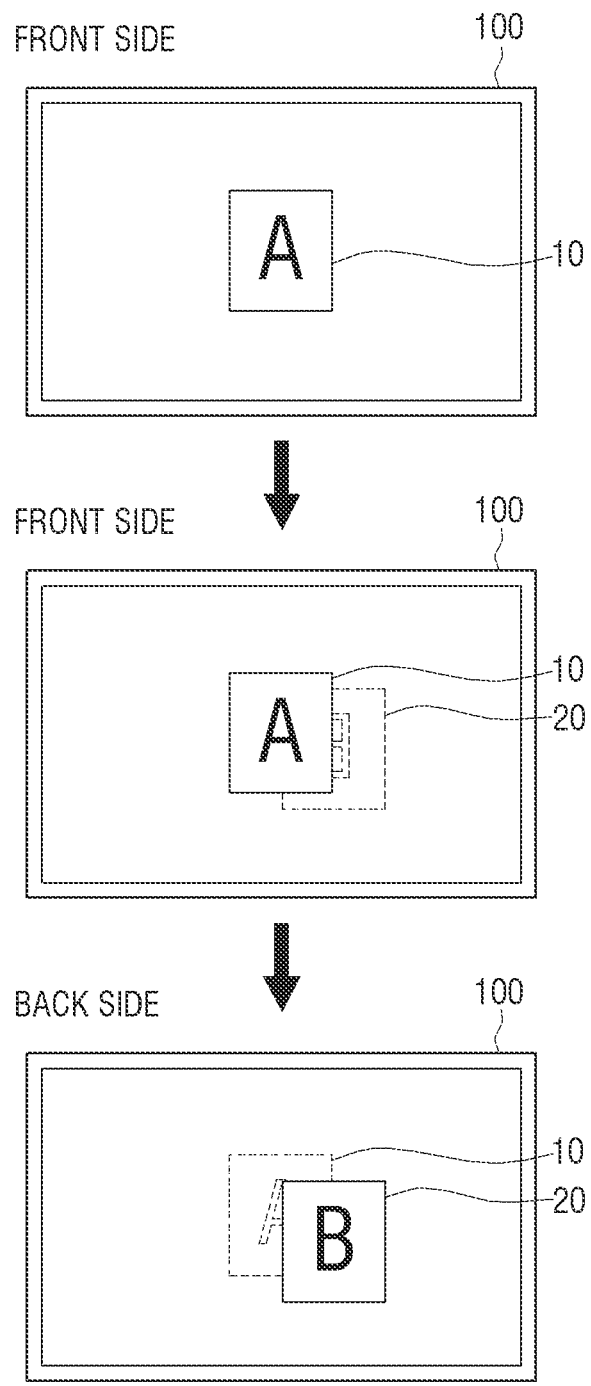
FIG. 6 illustrates an example of a method for confirming screens displayed on a plurality of transparent display layers in the transparent display apparatus according to an embodiment of the present disclosure.

FIG. 6 illustrates an example of a method for confirming screens displayed on a plurality of transparent display layers in the transparent display apparatus according to an embodiment of the present disclosure.

Referring to FIG. 6, a view is provided to explain a method which a user confirms screens displayed on each of the transparent display layers 110-1, 110-2 in the transparent display apparatus 100 implemented as mobile device according to an embodiment of the present disclosure.

As shown in FIG. 6, while a first screen 10 is displayed on the first transparent display layer 110-1, which is placed on the front side of the transparent display apparatus 100, when the first event occurs, a second screen 20 is displayed on the second transparent display layer 110-2, which is placed on the back side. Herein, the first event may be a various events, such as an event wherein a user touches on the first transparent display layer 110-1 or the second transparent display layer 110-2, an event to input a command to implement additional applications, an event to input a command to play additional contents, an event to approach the prestored established time, an event to generate system informing messages, or any other similar and/or suitable event.

For example, when a user touches the first screen 10 while the first screen 10 is displayed, the controller 120 may generate the second screen 20 related with the first screen 10 and display the second screen 20 on the second transparent display layer 110-2. The second screen 20, which is related with the first screen 10, may be screen provided from sources that are linked with objects marked within the first screen 10, or may be a screen implementing applications corresponding to icons marked on the first screen 10. The event to input a command to implement additional applications indicates an occurrence of user touches, button manipulation or remote controller manipulation to implement the additional applications other than the applications already implemented, when the first screen 10 is a screen which displays implementing results of applications. Further, the event to input a command to play additional contents indicates an occurrence of user touches, button manipulation or remote controller manipulation to play contents other than that displayed on the first screen 10, when the first screen 10 is a screen which displays playing results of still images or video contents. The event to approach the prestored established time indicates a situation wherein an established time, which is a display condition from among the display conditions that a user sets and stores for the second screen 20, is approached. For example, when it is established to display the second screen 20 at all times, the second screen 20 may be continuously displayed. When it is established to display for one minute every one hour, the second screen 20 may be displayed for one minute when it comes to every hour. The event to generate the system informing messages indicates a situation that various applications are updated, a situation that mail, messenger and messages are received, a situation that it comes to the prestored schedule information, a situation that it comes to the alarming time, a situation that it comes to time when various informing messages, such as system error messages and battery amount remaining messages, and any other similar and/or suitable messages. Thus, the second screen 20 may be displayed in various formats at various time points according to embodiments.

As shown in FIG. 6, the system informing message is displayed as second screen 20 in pop-up format on the second transparent display layer 110-2 while the first screen 10 is displayed. As described above, the system informing message may be various types of messages. When the second screen 20 is displayed on the second transparent display layer 110-2, a user who watches the front side views the back face of the second screen 20. Thereby, the user confirms the back side by rotating the apparatus as illustrated in FIG. 6. When the apparatus rotates, the second screen 20 on the back side of the apparatus is viewed as displayed, and the back face of the first screen 10 is viewed. Thereby, the first and second screens may be displayed on the different layers with each other so that a user can easily confirm the screens. Meanwhile, a user may control operation by performing touch manipulation on the first and second transparent display layers 110-1, 110-2.

Figure 7:
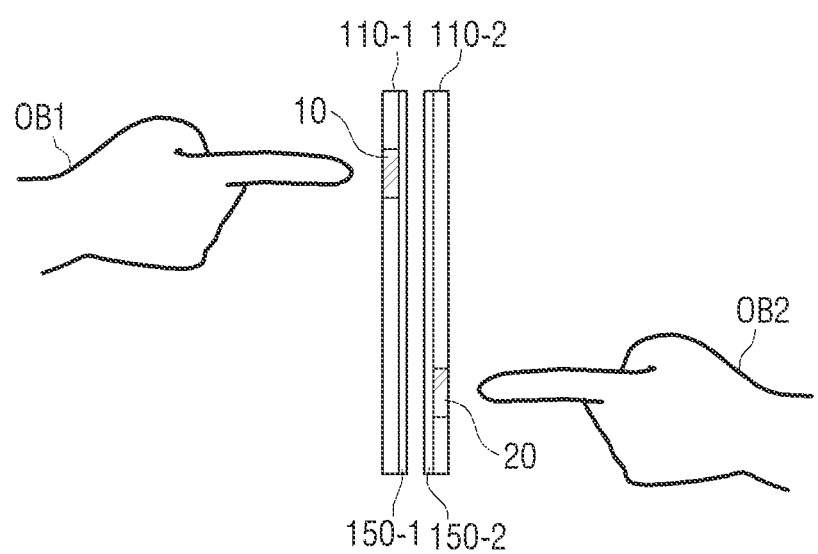
FIG. 7 is a view provided to explain a method for recognizing touches on the contrary directions to each other and operating in the transparent display apparatus according to an embodiment of the present disclosure.

FIG. 7 is a view provided to explain a method for recognizing touches on the opposite directions to each other and operating in the transparent display apparatus according to an embodiment of the present disclosure.

Referring to FIG. 7, the transparent display apparatus 100 includes the first and second transparent display layers 110-1, 110-2. On the first and second transparent display layers 110-1, 110-2, touch sensors are respectively arranged.

Specifically, from among the plurality of transparent display layers, further included may be a first touch sensor 150-1 that senses user touches on the first transparent display layer 110-1, which is placed in a first direction and a second touch sensor 150-2 that senses user touches on the second transparent display layer 110-2, which is placed in a second direction opposite to the first direction.

The first and second touch sensors 150-1, 150-2 may be respectively implemented as capacitive or resistive sensing touch sensor, or may be any suitable and/or similar type of touch sensor. The capacitive sensing is a method which calculates touch coordinate values by sensing micro electricity excited by a user's body when parts of the user's body touch a layer surface of the display with the coated dielectric on the display layer surface. The resistive sensing is a method which includes two electrode plates and calculates touch coordinate values by sensing electricity flows by contacting upper and lower plates on the touched point when a user touches the screen. Thus, the touch sensor may be implemented in various formats.

The controller 120 may determine types of touch manipulation based on sensing signals sensed in the first and second touch sensors 150-1, 150-2. Because the first and second touch sensors 150-1, 150-2 are arranged on both of the two transparent display layers 110-1, 110-2, they may respectively sense touches of different user bodies OB1, OB2. Touch manipulation may be various manipulations such as a simple touch, tap, a touch & hold, a move, a flick, a drag & drop, a pinch in and pinch out, or any other similar and/or suitable manipulations and touches.

The controller 120 may respectively control operation of the transparent display layers 110-1, 110-2 according to user touches sensed in the first touch sensor 150-1 or the second touch sensor 150-2. Specifically, the controller may perform moving display positions of the first screen 10 and the second screen 20 according to user touches, closing displaying situation, and further displaying new additional screens. Further, if the first screen 10 or the second screen 20 displays icons or menu buttons to implement specific functions, the controller 120 may perform displaying a screen corresponding to the function by implementing a corresponding function when the screen is touched.

In summary, the transparent display apparatus 100 may provide various screens by using the plurality of transparent display layers 110-1, 110-2~110-n. The transparent display apparatus 100 may be implemented as various display devices such as cellular phone, tablet PC, laptop computer, monitor, TV, show window, electronic frame, electronic book, MP3 player, PDA kiosk, and any other similar and/or suitable display device or electronic device including a display device.

Figure 8:
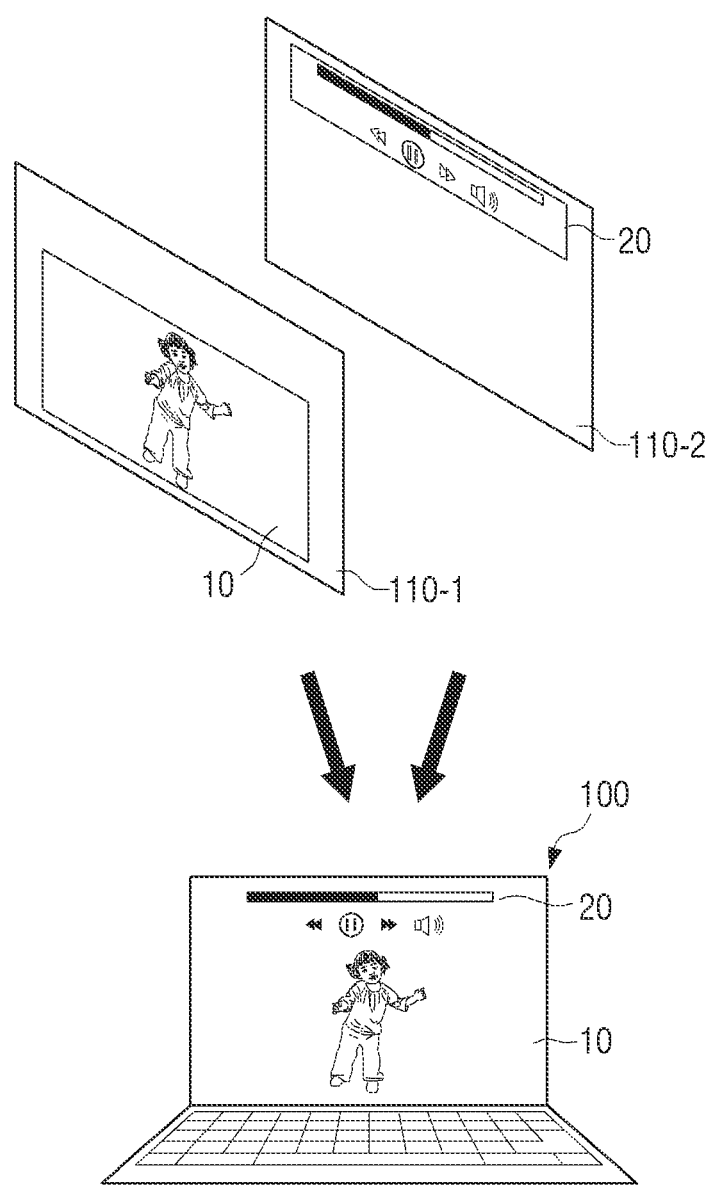
FIG. 8 is a view provided to explain a method for performing contents playing operation in the transparent display apparatus which includes the plurality of transparent display layers according to an embodiment of the present disclosure.

FIG. 8 is a view provided to explain a method for performing contents playing operation in the transparent display apparatus which includes the plurality of transparent display layers according to an embodiment of the present disclosure.

Referring to FIG. 8, the first screen 10 is a contents playing screen which plays and outputs contents. When contents is selected and a playing command is inputted, the controller 120 performs parsing, decoding and scaling regarding the selected contents and displays on the first transparent display layer 110-1.

When contents starts to play, the controller 120 may generate an information screen which includes various information related with the contents as second screen 20 and displays the information screen on the second transparent display layer 110-2. For example, the second screen 20 may be screen which displays various feature information regarding the contents playing on the first screen 10, such as size, type, resolution and playing time, contents playing degree information which shows which point the contents is playing if the contents is video, various menus related with contents playing manipulation, previous contents information, next contents information, contents list, and any other similar and/or suitable information.

Because the second screen 20 is seen while the first screen 10 is viewed, a user may confirm information of the second screen 20 and check various information regarding the contents while viewing the first screen 10, as illustrated in FIG. 8. According to need, a user may adjust the second screen 20 to be displayed on the front side by mutually converting or switching the layer on which the first screen 10 is displayed with the layer on which the second screen 20 is displayed. Such an operation will be described in a later part of the specification. Although FIG. 8 illustrates the transparent display apparatus to be implemented as laptop computer format, the operations of FIG. 8 may also be performed with the uniform method in other various types of transparent display apparatuses.

Figure 9:
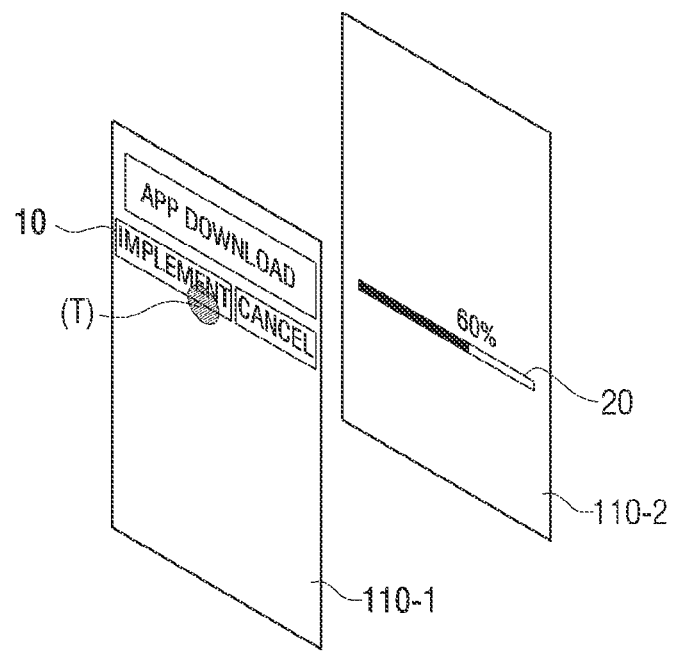
FIG. 9 is a view provided to explain a method for performing application downloading operation in the transparent display apparatus which includes the plurality of transparent display layers according to an embodiment of the present disclosure.

FIG. 9 is a view provided to explain a method for performing application downloading operation in the transparent display apparatus which includes the plurality of transparent display layers according to an embodiment of the present disclosure.

Referring to FIG. 9, contents may also include program contents such as applications other than various multimedia contents such as still image contents, video contents, audio contents and 3D contents. As shown in FIG. 9, when a user command to download contents is inputted, the transparent display apparatus 100 generates a download implementing screen to implement contents downloading as the first screen 10 and displays the first screen 10 on the first transparent display layer 110-1.

The controller 120 of the transparent display apparatus 100 may process page data transmitted from server, which provides contents, and may generate a download implementing screen. A user may input a command to implement downloading regarding contents by performing a touch (T) within the first screen 10. When a download implementing command is inputted on the download implementing screen, the controller 120 accesses to the server and requests downloading corresponding contents.

Thereby, when the downloading begins, the controller 120 generates the download situation displaying screen which marks at least one from among a processing degree of downloading the selected contents, an expected closing time, a contents features information, and a contents source information, as the second screen 20 and displays such on the second transparent display layer 110-2.

As illustrated in FIG. 9, when the first and second transparent display layers 110-1, 110-2 respectively display the different screens 10, 20, one screen which is combined with the two screens 10, 20 may be recognized from the standpoint of a user, as illustrated in FIG. 9. Therefore, recognizing of performance may be enhanced by recognizing information of contents downloading differently from the previous screen 10.

Although FIG. 9 illustrates the transparent display apparatus to be implemented as cellular phone, such operations of FIG. 9 may be performed with the uniform method in other various types of transparent display apparatuses and electronic devices.

FIGS. 8 and 9 illustrate that the second screen 20 automatically marks information related with the first screen. However, the second screen 20 may be generated variously according to apparatus situation differently from the first screen 10. For example, the second screen 20 may be implemented as additional information screen which includes at least one from a battery amount remaining, a communication status, time information, system information, volume information, network connection information, setup information, date information, weather information, text message receiving status information, missed call information, and any other similar and/or suitable information.

Figure 10:
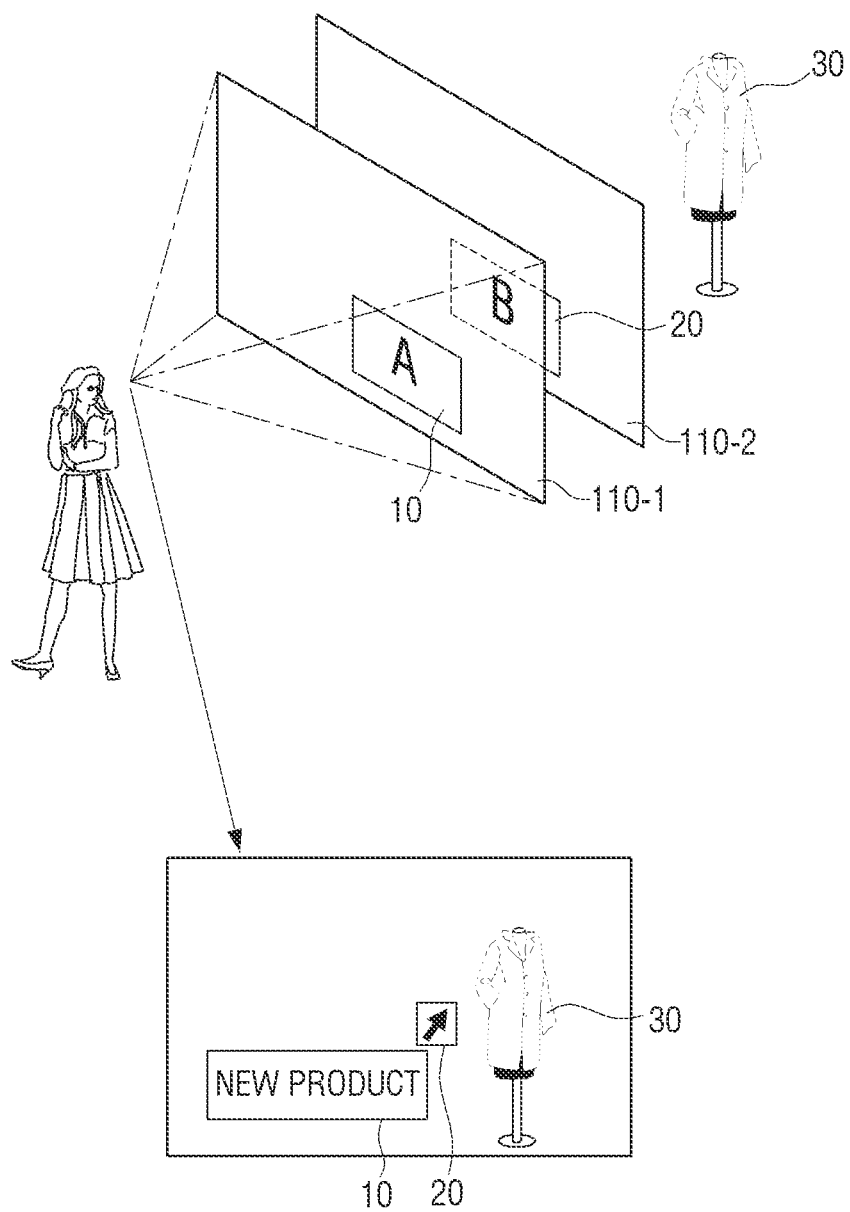
FIG. 10 is a view provided to explain operation of the transparent display apparatus used in show window according to an embodiment of the present disclosure.

FIG. 10 is a view provided to explain operation of the transparent display apparatus used in show window according to an embodiment of the present disclosure.

Referring to FIG. 10, the transparent display apparatus includes the first and second transparent display layers 110-1, 110-2 in window format which are consecutively arranged. Therefore, as illustrated in FIG. 10, the first and second screens 10, 20 respectively displayed on the first and second transparent display layers 110-1, 110-2 and real figures of objects 30, which are arranged on the rear area of the transparent display apparatus 100, are comprehensively viewed to a user.

The first and second screens 10, 20 may be displayed within closer distance while installing related descriptions with each other. For example, the first screen 10 may be displayed as specific text, and the second screen 20 may be displayed as an arrow shape around the first screen 10. Thereby, a user may intuitively recognize that a product indicated by the text of the first screen 10 is placed next to an arrow direction of the second screen 20.

As described above, the first screen 10 and the second screen 20 may be displayed on the different display layers 110-1, 110-2 in various formats and on various positions. The transparent display layers displayed on the first screen 10 and the second screen 20 may be mutually converted with each other according to user manipulation.

In the above embodiments, the transparent display apparatus may adjust display features of each screen separately according to surrounding situation information. Surrounding situation information may be surrounding illumination intensity, weather, a current time, a number of surrounding objects, and any other similar and/or suitable information. Further, display features may be a transparency, a color, a size, a display position, a display time, a display shape and a resolution. For example, when in daytime, the controller 120 marks colors of the first and second screens 10, 20 with thick original colors to enhance recognizing performance.

Further, the controller 120 may respectively adjust resolution of the screens displayed on the various transparent display layers to determine the focus. When resolution of the screen displayed on a third layer (not shown) is adjusted to be clear while adjusting resolution of the screens displayed on the other layers is adjusted to be unclear, the screen on the third layer may be most quickly recognized by a user. The controller 120 may determine the focus regarding each layer according to an activating situation of each application. For example, when an implementing window of a word program displayed on the third layer is activated, then resolution of the implementing window is clear while the other screens are displayed unclearly. Therefore, display features of each screen may be adjusted variously according to situation.

Further, the controller 120 may adjust resolution of each screen according to a user position. The transparent display apparatus 100 may further include a sensor (not illustrated) to sense the user position. The sensor may be implemented as motion sensor, Infrared (IR) sensor, or any similar and/or suitable sensor. The controller 120 of the transparent display apparatus 100 may determine which transparent display layer is closer to a user from among the plurality of transparent display layers by using such a sensor. The controller 120 may adjust display features of the screens displayed on each of the transparent display layers according to the determination results. For example, the controller 120 may establish a resolution of the screen displayed on the backside transparent display layer to be higher than a resolution of the screen displayed on the transparent display layer towards the user position direction. Therefore, screens displayed at a longer distance may be clearly recognized by a user. Further, when being implemented, the controller 120 may prevent deterioration in recognizing performance due to a distance difference by generating a size of the backside screen to be bigger, and to provide perspective by adjusting brightness of each screen according to a distance from a user.

Figure 11:
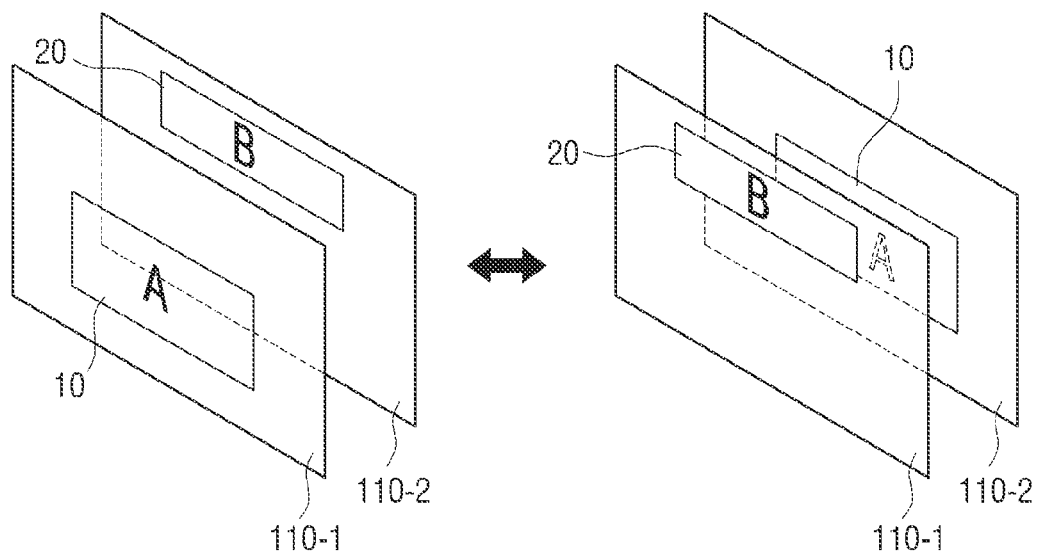
FIGS. 11 and 12 are views provided to explain converting operation of layers with each other in which a plurality of screens are displayed according to an embodiment of the present disclosure.
Figure 12:
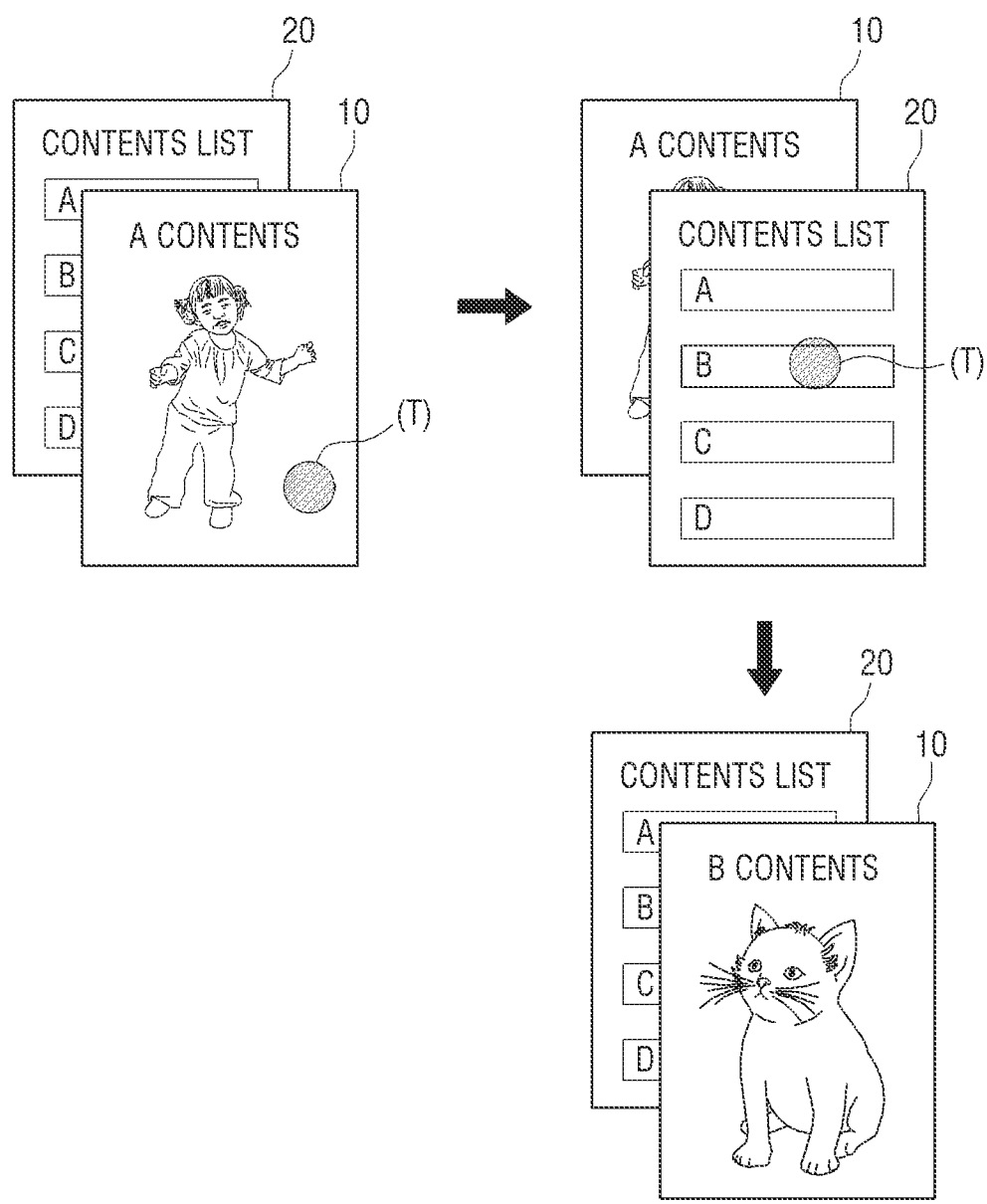

FIGS. 11 and 12 are views provided to explain converting operation of layers with each other in which a plurality of screens are displayed according to an embodiment of the present disclosure.

While the first and second screens 10, 20 are displayed on different transparent display layers, when the second event occurs, the controller 120 of the transparent display apparatus 100 may display one of the first and second screens 10, 20 on the different transparent display layers for a predetermined time, or may modify all the display layers of the two screens. FIG. 11 illustrates that a transparent display layer, on which the first screen 10 and the second screen 20 are displayed, are mutually converted by occurrence of the second event.

Referring to FIG. 11, the first transparent display layer 110-1 may display the first screen 10, and the second transparent display layer 110-2 may display the second screen 20. For convenience of drawing, the first and second screens 10, 20 are shown as illustrating A and B, however, the present embodiment is not limited thereto and the first and second screens 10, 20 may be implemented in various formats as described above and display or illustrate any suitable content. When the second event occurs in the above situation, the first screen 10 is moved and displayed on the second transparent display layer 110-2 and the second screen 20 is moved and displayed on the first transparent display layer 110-1, as illustrated in FIG. 11.

Herein, the second event may be a variety of events. For example, the second event may include at least one from an event to perform long touch, an event to perform double touch, an event to perform touch & drag, an event to perform flick, an event to approach preset modifying time, and an event to generate new informing messages. A long touch may be a user action that touches the front transparent display layer longer than preset time, and a double touch may be a user action that touches consecutively twice. A touch and drag may be a user action that moves the touched point while touching the layer surface, and a flick may be a user action that quickly moves the touched point toward one side while touching the layer surface.

Although FIG. 11 describes an embodiment which the first and second transparent display layers 110-1, 110-2 are included, converting the layers may be performed for any suitable number of transparent display layers. For example, regarding the transparent display apparatus 100 including first, second and third transparent display layers 110-1, 110-2, 110-3 (see FIG. 16), when a command to convert the screen is inputted once by touching the first transparent display layer 110-1 on the front side while first, second and third screens 10, 20, 30 are displayed respectively on the layers, the first screen 10 is moved and displayed toward the second transparent display layer 110-2, the second screen 20 is moved and displayed toward the third transparent display layer 110-3, and the third screen 30 is moved and displayed toward the first transparent display layer 110-1. When a command to convert the screen is inputted again, the display layers of the first, second and third screens 10, 20, 30 may be modified in uniform pattern.

Further, in the transparent display apparatus 100 including first, second, third and fourth transparent display layers 110-1, 110-2, 110-3, 110-4, the first screen 10 may be displayed on the first transparent display layer 110-1 and the second screen 20 may be displayed on the third transparent display layer 110-3. If a command to convert the screen is inputted, the second screen 20 is moved and displayed on the first transparent display layer 110-1 and the first screen 10 is moved and displayed on the third transparent display layer 110-3. Thus, the screens can be moved and displayed between the plurality of transparent display layers according to preset patterns.

Referring to FIG. 12, an example of operation which converts and uses the screen display layers is illustrated. First, 'A' contents screen is displayed on the first transparent display layer as the first screen 10 and a contents list is displayed on the second transparent display layer as second screen 20.

When a user touches (T) the first screen 10, the layers that display the first screen 10 and the second screen 20 are mutually converted. Thereby, the second screen 20 including contents list is displayed on the front face. A user may select contents what he wants from the contents list. As illustrated in FIG. 12, if a user touches (T) 'B' in the contents menu, then the transparent display apparatus 100 closes the playing of 'A' contents and plays 'B' contents. With this operation, as illustrated in FIG. 12, the transparent display apparatus 100 moves the second screen 20 to the second transparent display layer on the back side and displays 'B' contents as first screen 10 on the first transparent display layer 110-1.

Meanwhile, as illustrated in FIG. 12, when the first and second screens 10, 20 are displayed on corresponding positions with each other in the different layers, a user may have difficulty to separately recognize the first screen and the second screen because the two screens are overlapped. Therefore, the transparent display apparatus 100 may adjust display features of the first screen to be different from display features of the second screen. Herein, display features may be transparency, color, size, display position, display time, display shape, and resolution. The transparent display apparatus 100 may adjust display features of each screen and display so that a user can recognize that back screen is generated while not visually disturbing a user's view. For example, if the front screen is displayed with thick colors while the back screen is displayed with relatively mild colors, a user recognizes colors of overlapping parts with the back screen to be different from surrounding colors, and intuitively views that another screen is generated on the back side without having disturbance to view the front screen.

Although FIG. 12 describes an embodiment which the display layers of the two screens are converted alternately according to user selection, the display layer of each screen may be consecutively converted by selecting of a user.

Figure 13:
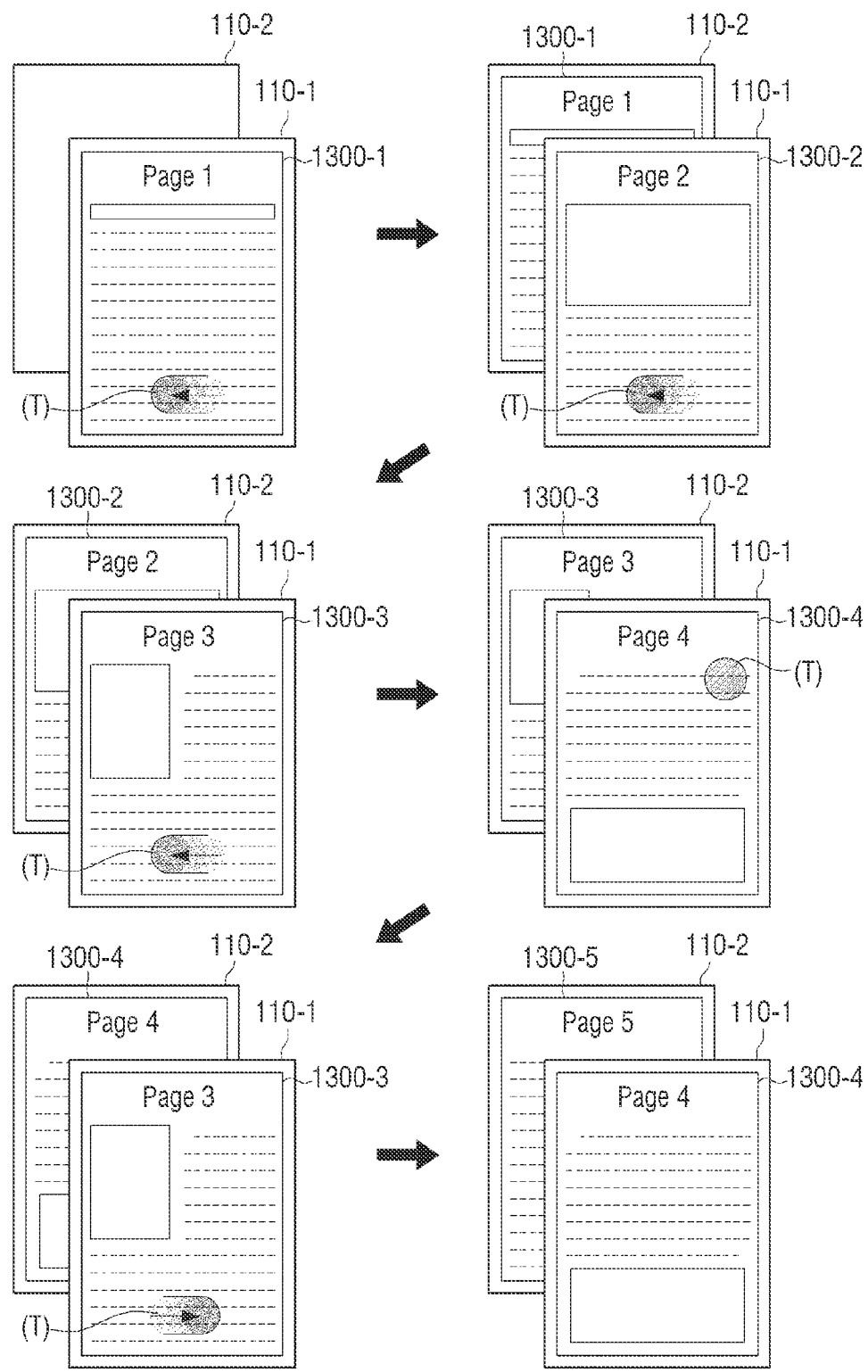
FIG. 13 is a view provided to explain operation of performing converting pages by using the plurality of transparent display layers according to an embodiment of the present disclosure.

FIG. 13 is a view provided to explain operation of performing converting pages by using the plurality of transparent display layers according to an embodiment of the present disclosure.

Referring to FIG. 13, the transparent display apparatus 100 implements a function according to user selection and displays screens. At this process, if the screen to be displayed is constituted with a plurality of pages, one page is first displayed from among them. In FIG. 13, the first displayed screen is illustrated as first page screen 1300-1 for convenient explanation. The layer displaying the first page screen 1300-1 may be different according to user setting values or default values, however, FIG. 13 illustrates that the first page screen 1300-1 is displayed on the first transparent display layer 110-1 on the front side.

In this situation, when a user performs first user manipulation of a touch (T) at one point within the first page screen 1300-1 and drags towards a direction, the transparent display apparatus 100 displays a next page, i.e., a second page screen 1300-2 on the first transparent display layer 110-1 according to dragging direction and the first page screen 1300-1 on the second transparent display layer 110-2, as illustrated in FIG. 13. When the first user manipulation consecutively performs in this situation, according to the dragging direction, a third page screen 1300-3 and a fourth page screen 1300-4 are consecutively displayed on the first transparent display layer 110-1, and the second page screen 1300-2 and the third page screen 1300-3 that were previously displayed are shifted and displayed on the second transparent display layer 110-2, as illustrated in FIG. 13.

Thus, a user may convert the page screens by using the first user manipulation. Meanwhile, as illustrated in FIG. 13, when a second user manipulation, in which a user performs a long touch (T) on the screen while the fourth page screen 1300-4 is displayed, the third page screen 1300-3 which is displayed on the second transparent display layer 110-2 is moved and displayed on the first transparent display layer 110-1 and the fourth page screen 1300-4 which is displayed on the first transparent display layer 110-1 is moved and displayed on the second transparent display layer 110-2, as illustrated in FIG. 13. When the first user manipulation is performed again in this situation, page converting is performed again towards the dragging direction. The fourth page screen 1300-4 is displayed on the first transparent display layer 110-1 and a fifth page screen 1300-5 is displayed on the second transparent display layer 110-2, as illustrated in FIG. 13.

Although FIG. 13 illustrates two types of user manipulation, types of user manipulation may be variously implemented. Meanwhile, display positions of the screens displayed on the plurality of transparent display layers 110-1, 110-2 may be overlapped with each other. In this case, the transparent display apparatus 100 may adjust various display features such as color, resolution, size, display time, font, and clearness of the two screens so that the two screens are recognized as one screen.

Figure 14:
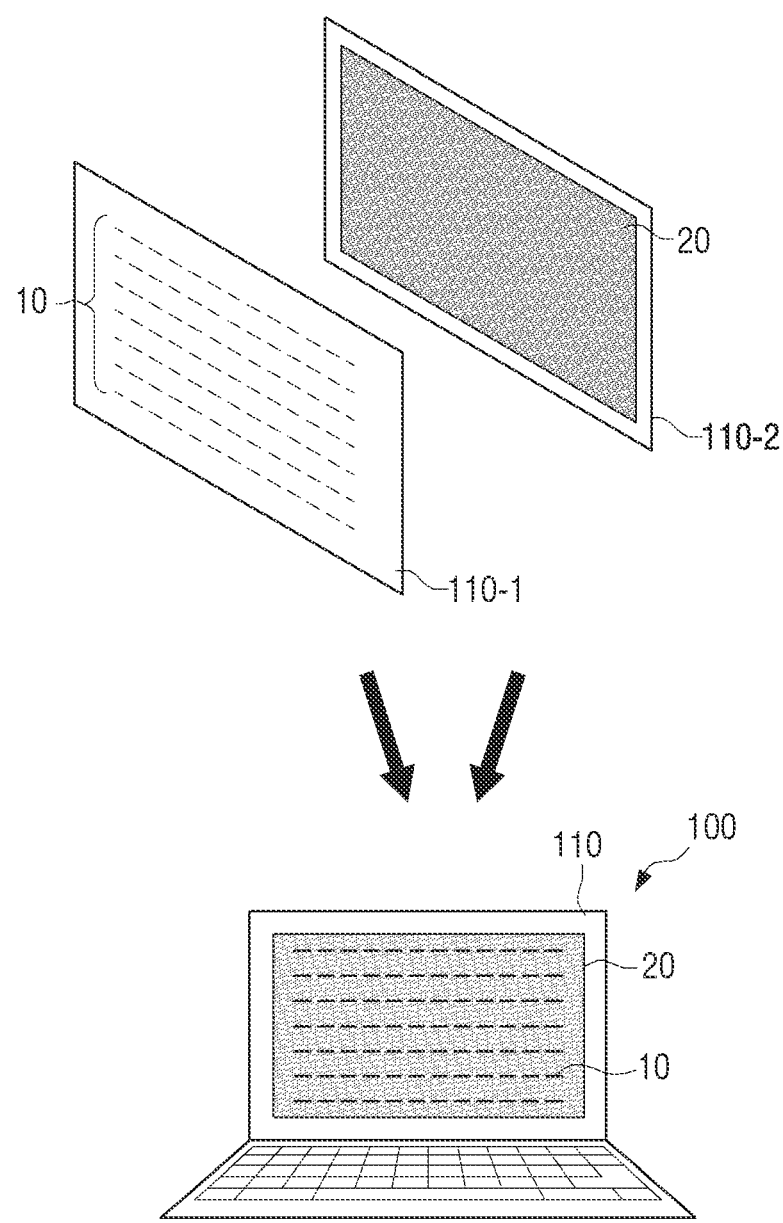
FIG. 14 is a view provided to explain operation of generating one screen by combining screens displayed on the plurality of transparent display layers according to an embodiment of the present disclosure.

FIG. 14 is a view provided to explain operation of generating one screen by combining screens displayed on the plurality of transparent display layers according to an embodiment of the present disclosure.

Referring to FIG. 14, the first screen 10 displayed on the first transparent display apparatus 110-1 is displayed as text and the second screen 20 displayed on the second transparent display apparatus 110-2 is displayed as a back window shape. The back window may be expressed with opaque colors so as to prevent objects placed on the back side from being seen through clearly and confusing the first screen 10. For example, if the text of the first screen 10 is yellow, the second screen 20 may be a singular window in black. In this case, because a user recognizes that the text of the first screen 10 is written on the second screen 20, recognizing performance can be enhanced. Thus, the transparent display apparatus 100 may provide various formats of screens by properly combining display features of each screen.

Figure 15:
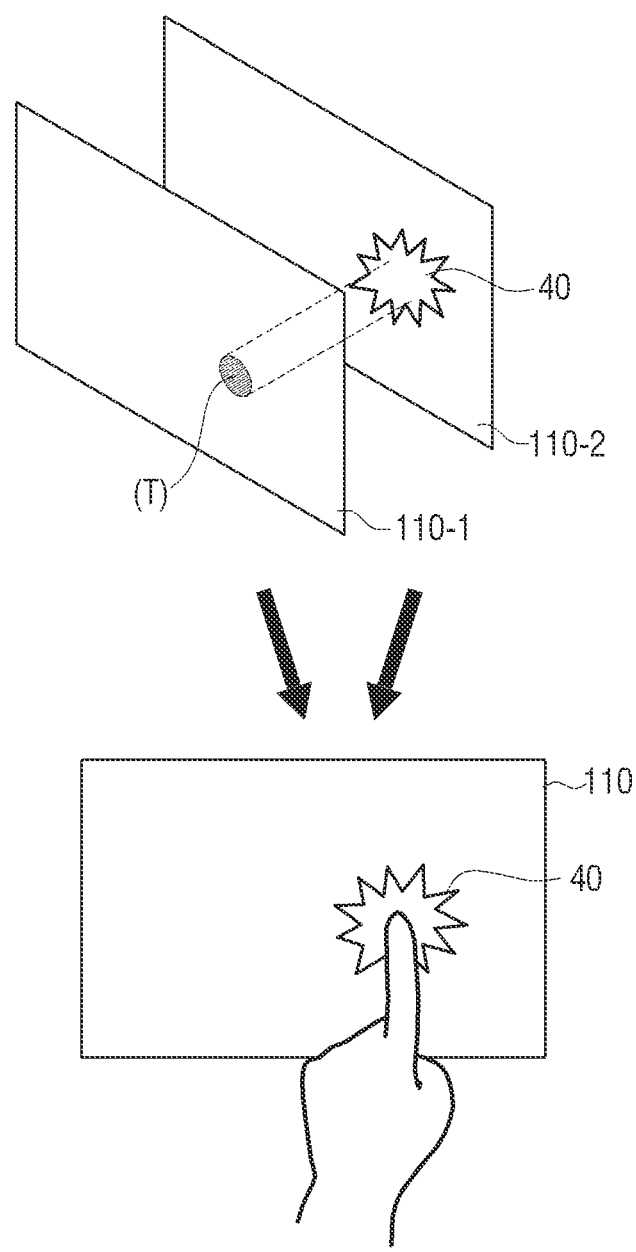
FIG. 15 is a view provided to explain an embodiment which provides feedback effects according to user touches according to an embodiment of the present disclosure.

FIG. 15 is a view provided to explain an embodiment which provides feedback effects according to user touches according to an embodiment of the present disclosure.

Referring to FIG. 15, when a user touches a touch point (T) the first transparent display layer 110-1 on the front side while the first and second transparent display layers 110-1, 110-2 are consecutively arranged, feedback effects 40 corresponding to user touches on area corresponding to the touched point on the second transparent display layer 110-2 are displayed on the back side. Feedback effects may be a graphic image to visually inform that touch is performed. For example, a color image may be displayed within a predetermined radius based on the touch point (T) or image describing that something is blowing may be displayed, as illustrated in FIG. 15. Such feedback effects 40 may be marked immediately when touch is performed and disappear gradually or quickly. Meanwhile, although the above descriptions are based on the transparent display apparatus 100 including the two transparent display layers, a number of the transparent display layers may be implemented to be more than three or any suitable number, as already described above.

Figure 16A:
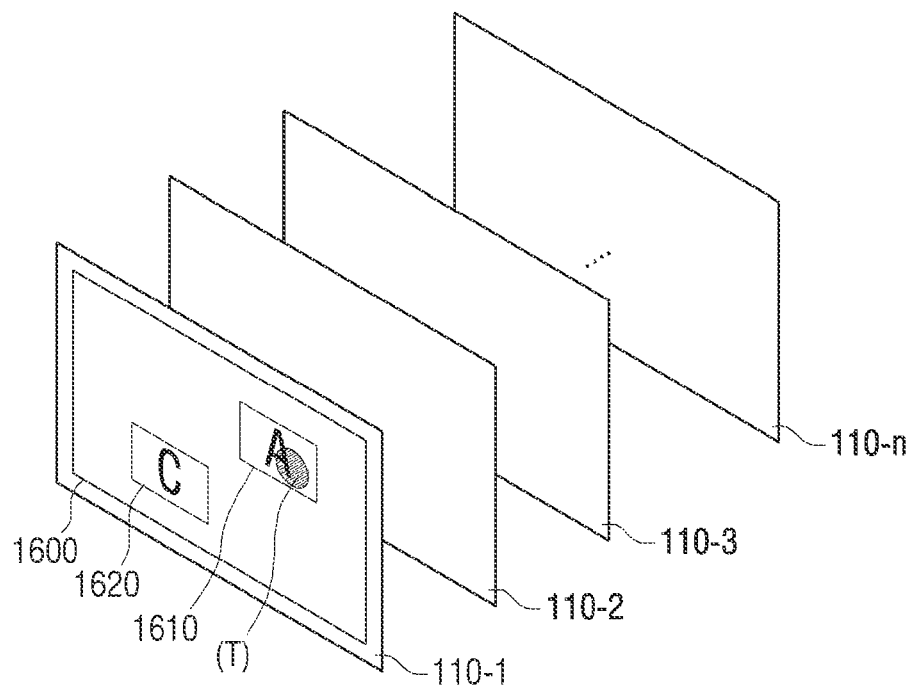
FIGS. 16A and 16B are views provided to explain operation of converting layers which screens will be marked among a plurality of transparent display layers according to an embodiment of the present disclosure.
Figure 16B:
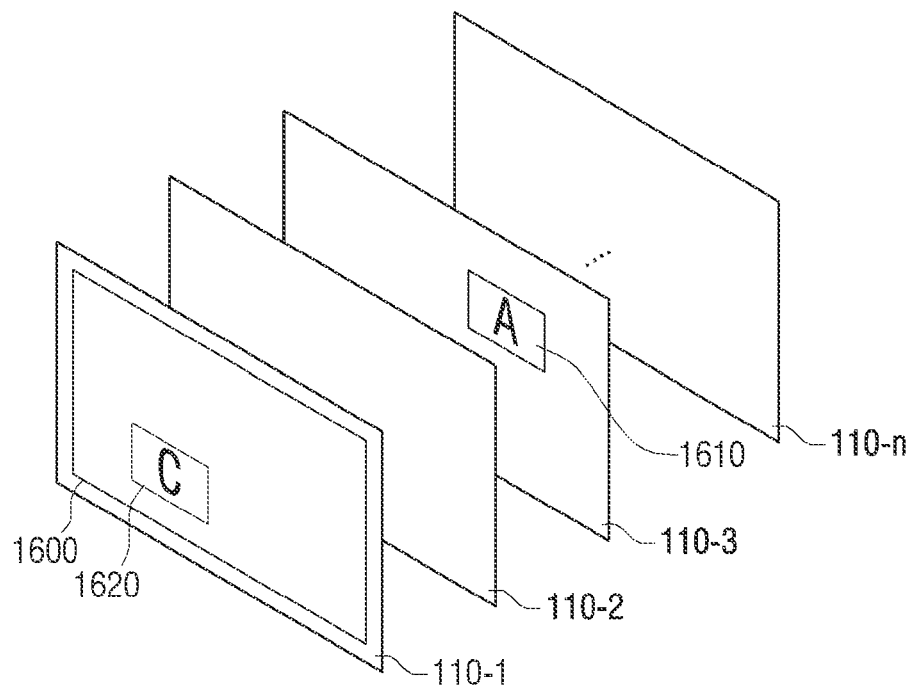

FIGS. 16A and 16B are views provided to explain operation of converting layers which screens will be marked among a plurality of transparent display layers according to an embodiment of the present disclosure.

Referring to FIGS. 16A and 16B, the transparent display apparatus 100 includes n number of the transparent display layers 110-1~110-n. The controller 120 of the transparent display apparatus 100 displays the first screen 1600 on the first transparent display layer 110-1 according to a user input. The first screen 1600 includes a plurality of objects 1610, 1620. Herein, objects may be various types such as an image, a picture, text, a pop-up window, a banner ad window, a media play window, or any other similar and suitable displayable object. A user may touch one object within the first screen 1600, or touch a point where objects are not marked within the first screen 1600. FIG. 16A illustrates a case that one object 1610 is touched within the first screen 1600.

The controller 120 moves and displays the touched object 1610 to another transparent display layer placing lower than the first transparent display layer 110-1. Depth of the transparent display layer that the object is moved may be determined according to features of user touches. Features of user touches may be a user touch pressure, a touch performing time, a touch velocity, a touch number, and any other similar and/or suitable feature. Referring to FIG. 16B, the touched object 1610 is moved and displayed from the first transparent display layer 110-1 to the third transparent display layer 110-3. If touch is performed with more pressure, the object may be moved to the layer lower than the third transparent display layer 110-3. Thereby, the objects 1610, 1620 displayed within one screen 1600 may be distributed and displayed to other transparent display layers according to a user selection.

Meanwhile, when a point where objects are not marked is touched within the first screen 1600, a whole of the first screen 1600 may be moved and displayed to the transparent display layer having corresponding depth to features of user touches.

Thus, regarding each screen or each object, the display layers may be converted according to a user selection. To convert the display layers, the controller 120 may use the frame buffer. For example, when the transparent display apparatus 100 is implemented in the format of FIG. 3, if the screen displayed on the first transparent display layer 110-1 is requested to move to the second transparent display layer 110-2, then the controller 120 copies data stored in the first frame buffer 132 to the second frame buffer 135. The controller 120 may control the second display driver 136 to deliver the copied data on the second frame buffer 135 to the second transparent display layer 110-2. If some of the objects displayed within one screen are requested to be separated, then the controller 120 may extract the objects to be separated by reading the data stored in the first frame buffer 132 or using data inputted to the first display processor 131. The second display processor 134 may process data regarding the extracted objects to be separated, may generate image data regarding corresponding objects, and may store them in the second frame buffer 135. Therefore, the separated objects may be displayed on the second transparent display layer 110-2.

Meanwhile, if screens displayed on the different transparent display layers respectively deliver meaning, when positions of the screens are overlapped, the back screen may be shielded by the front screen. In this case, as described in FIG. 11, the display layers of the screens may be converted according to a user manipulation and the back screen can be viewed. However, according to another embodiment, it may be also implemented that the back screen can be viewed by modifying a shape, a size and/or a position of the front screen.

FIG. 17 is a view provided to explain screen converting operation while the plurality of transparent display layers respectively display screens according to an embodiment of the present disclosure.

A left side of FIG. 17 illustrates shapes of screens respectively displayed on the first and second transparent display layers 110-1, 110-2, and a right side of FIG. 17 illustrates whole screens of the display 110 viewed from the standpoint of a user. Referring to FIG. 17A, when the first and second screens 10, 20 are displayed at a uniform position of the first and second transparent display layers 110-1, 110-2, respectively, then the second screen 20 may be shielded by the first screen 10. Thus, from the perspective of a user, only the first screen 10 is viewed as illustrated in FIG. 17.

When a user touches one part of the first screen 10 in this situation, the second screen 20 is exposed while the shape of the first screen 10 is modified. The shape of the first screen 10 may be variously modified according to touched points. If an upper point is touched, then the first screen 10 is modified as if its upper part slides backward, and thus, the second screen 20 is exposed. The first screen 10 may keep its modification while user touch is performing and may go back to original state immediately when user touch is lifted off. Alternatively, the first screen 10 may be modified for a predetermined time after user touch and may then go back to an original state.

When a user touches a lower point on the first screen 10 in this situation, the first screen 10 is modified as if its lower part is rolling up backward and the second screen 20 is exposed, and thereby, the second screen 20 is exposed to a user's eyes. Thus, the user may confirm each screen. Meanwhile, according to another embodiment, a display situation of each screen may be modified according to a rotating situation by sensing a rotation of the transparent display apparatus.

Figure 18:
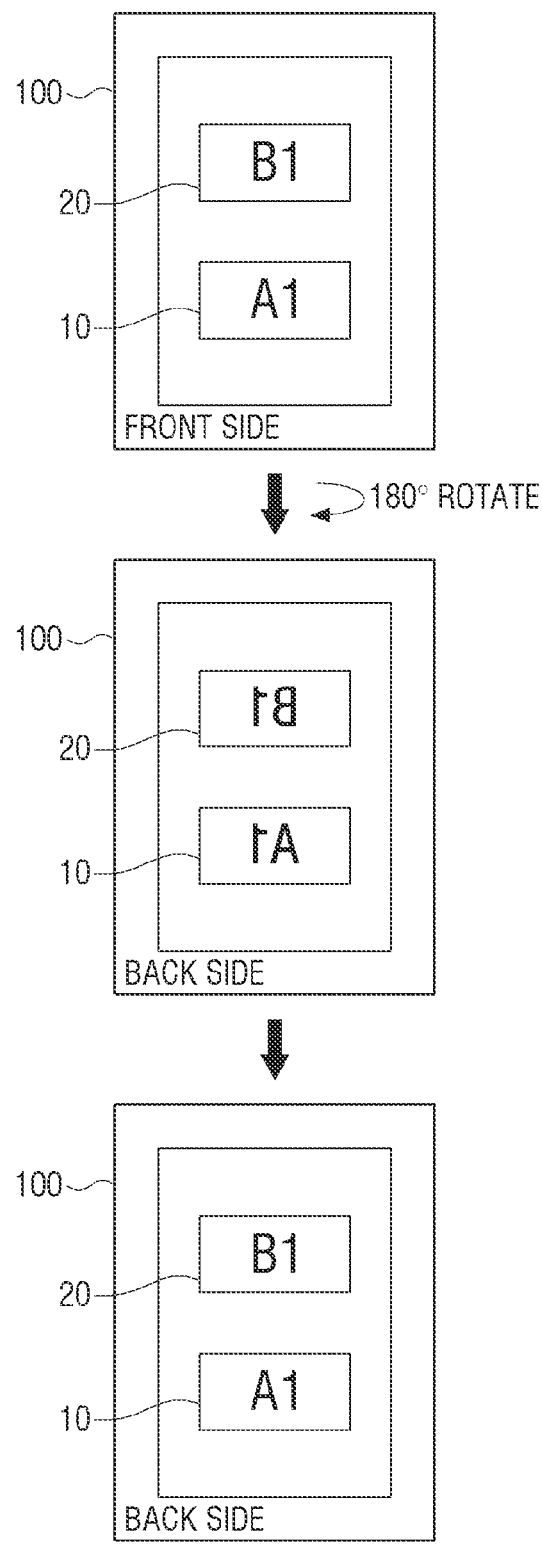
FIG. 18 is a view provided to explain screen converting operation when the transparent display apparatus rotates according to an embodiment of the present disclosure.

FIG. 18 is a view provided to explain screen converting operation when the transparent display apparatus rotates according to an embodiment of the present disclosure.

Referring to FIG. 18, the transparent display apparatus 100 may further include the sensor (not illustrated) that senses rotating situation of the transparent display apparatus. The transparent display apparatus 100 displays the first screen 10 on the first transparent display layer 110-1 and the second screen 20 on the second transparent display layer 110-2, and a user rotates the apparatus 100 from right to left by 180°. When the screens 10, 20 are viewed from the back side, a horizontally reversed displaying is recognized. When the rotating is sensed, the controller 120 converts at least one of the first screen 10 and the second screen 20 horizontally or vertically so as to correspond to the rotating situation and displays. In FIG. 18, the screens 10, 20 are converted horizontally and displayed uniformly with viewing on the front side before rotating.

FIG. 18 illustrates converting from right to left. However the present embodiment is not limited thereto, and if rotating is performed from left to right, or from upper to lower, a display situation of the screens may be rearranged to be suitable for the rotating situation so that a user may view properly arranged screens. Meanwhile, another screen is additionally displayed while viewing one screen in a related display apparatus, and a user may feel anxious because rendering time of another screen takes longer. Thus, according to another embodiment, the transparent display apparatus 100 may use the plurality of transparent display layers and process so that a user may not recognize delay during the screen displaying process.

Figure 19:
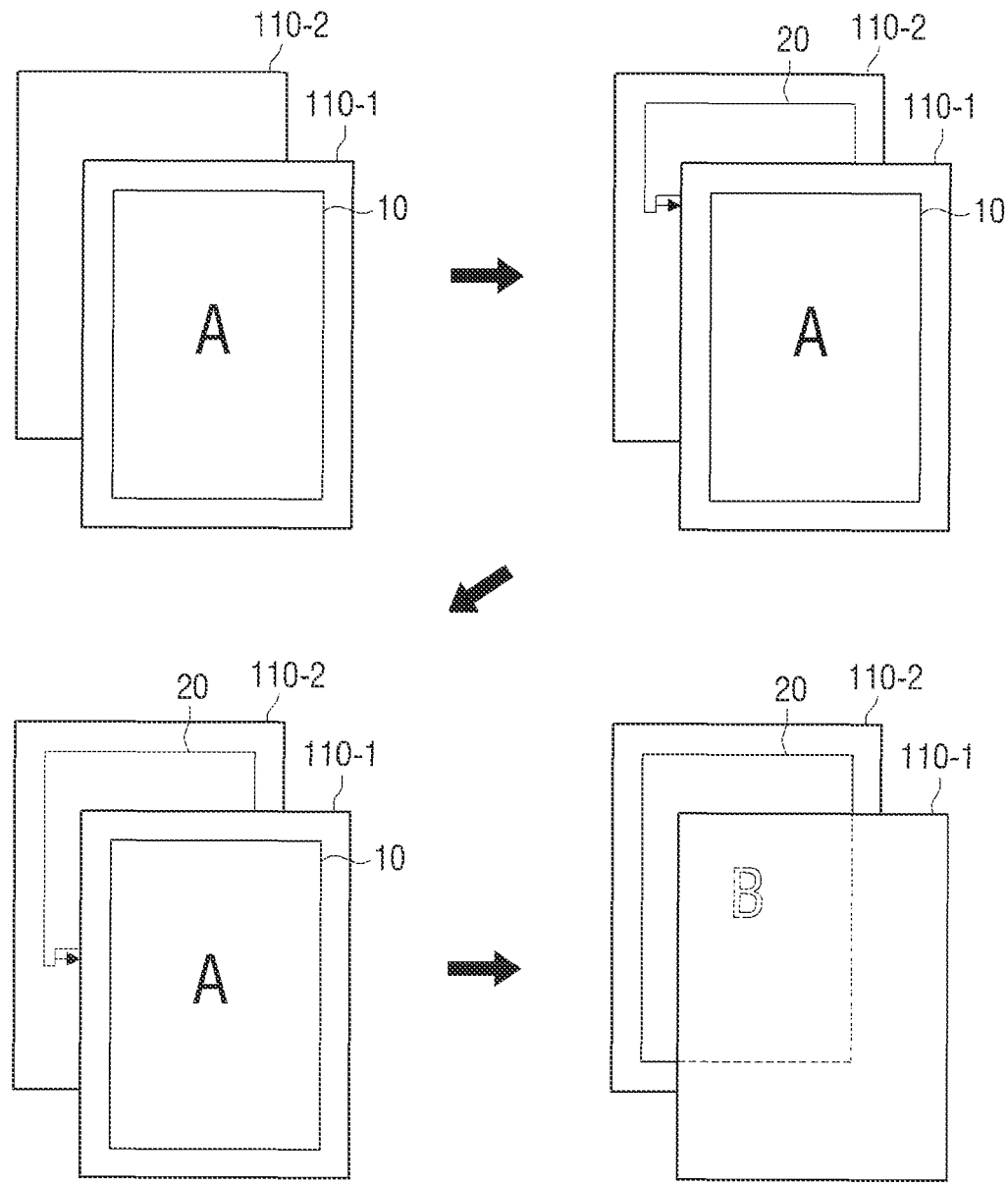
FIG. 19 is a view provided to explain operation of converting screens displayed on the plurality of transparent display layers according to an embodiment of the present disclosure.

FIG. 19 is a view provided to explain operation of converting screens displayed on the plurality of transparent display layers according to an embodiment of the present disclosure.

Referring to FIG. 19, when an event to display the second screen 20 occurs while the first screen 10 is displayed on the first transparent display layer 110-1, the controller 120 of the transparent display apparatus 100 begins rendering the second screen 20 as illustrated in FIG. 19. The second screen 20 is displayed on the second transparent display layer 110-2 which is lower than the first transparent display layer 110-1. The second screen 20 is rendered at a position that is shielded by the first screen 10 from among a whole area of the second transparent display layer 110-2, i.e., a position corresponding to the first screen 10. Rendering may be performed consecutively on a line basis.

As illustrated in FIG. 19, the controller 120 keeps the first screen 10 displayed on the first transparent display layer 110-1 while rendering of the second screen 20 is processing. Therefore, because the second screen 20 is shielded by the first screen 10, a user does not visually see a delay during the displaying process of the second screen 20. When the rendering completes, the controller 120 removes the first screen 10 and exposes the second screen 20 displayed on the second transparent display layer 110-2. Thereby, the second screen 20 is immediately displayed without the rendering process being viewed by a user. Meanwhile, as described above, the transparent display apparatus may be implemented as various types of devices.

Figure 20:
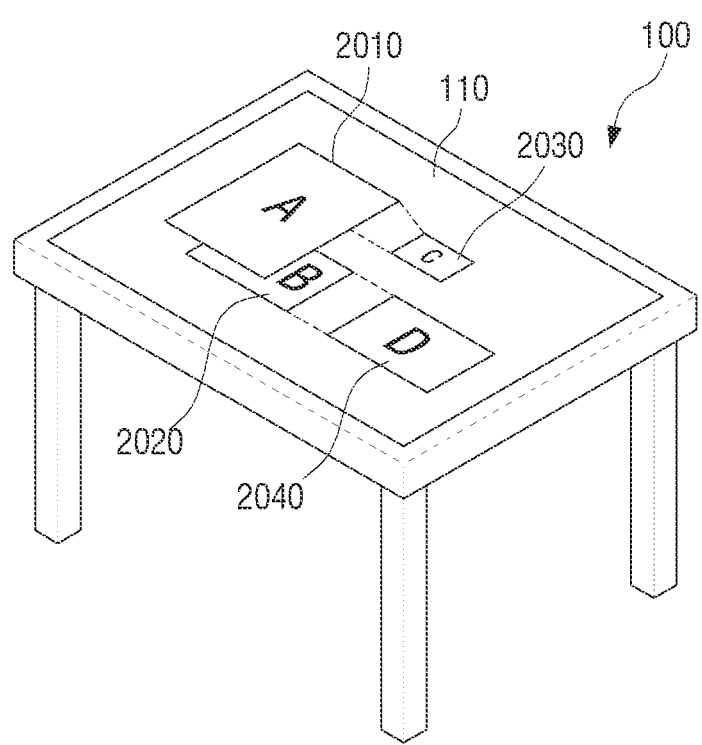
FIG. 20 is a view provided to explain operation of the transparent display apparatus that is implemented as table display apparatus according to an embodiment of the present disclosure.

FIG. 20 is a view provided to explain operation of the transparent display apparatus that is implemented as table display apparatus according to an embodiment of the present disclosure.

Referring to FIG. 20, the transparent display apparatus 100 is implemented to be table including a table supporting plate and table legs. The display 110 is arranged on the table supporting plate. The display 110 includes the plurality of transparent display layers 110-1~110-n, as described above. The controller 120 displays screens 2010, 2020, 2030, 2040 on each of the layers 110-1~110-n. The controller 120 displays the screens 2010, 2020, 2030, 2040 according to the events, when events occur. According to embodiments, displaying methods of each screen may be variously implemented.

FIG. 20 illustrates an embodiment in which the controller 120 differently sets display positions of the screens 2020, 2030, 2040 that are displayed on the lower layers by considering a relatedness with the first screen 2010 while the first screen 2010 is displayed on the first transparent display layer 110-2 which is the most upper layer. For example, when the second screen 2020 related with the first screen 2010 is displayed on the second transparent display layer 110-2, then the second screen 2020 may be displayed to overlap its part with the first screen 2010, and the third and fourth screens 2030, 2040, which are unrelated with the first screen 2010, may be displayed on positions that are not overlapped with the first and second screens 2010, 2020. The second screen 2020, which is related with the first screen 2010, indicates a screen linked by the objects selected on the first screen 2010 or an implementing screen of interlocked applications or widgets. Regarding the parts overlapped with the upper screen, color or clearness may be differently established so that a user can intuitively recognize the overlapping with the upper and lower screens.

The display layers of the screens 2010, 2020, 2030, 2040 may be converted in various methods according to a user selection. These methods are already described in the above various embodiments, which will not be further explained. Further, events to display the screens are described above, which will not be explained. Although FIG. 20 describes the transparent display apparatus in table format, the transparent display apparatus may be implemented as various types of electronic devices, applied and used in various areas such as furniture, window, transparent door, frame, show window and wall, and any other similar and/or suitable electronic device.

Figure 21:
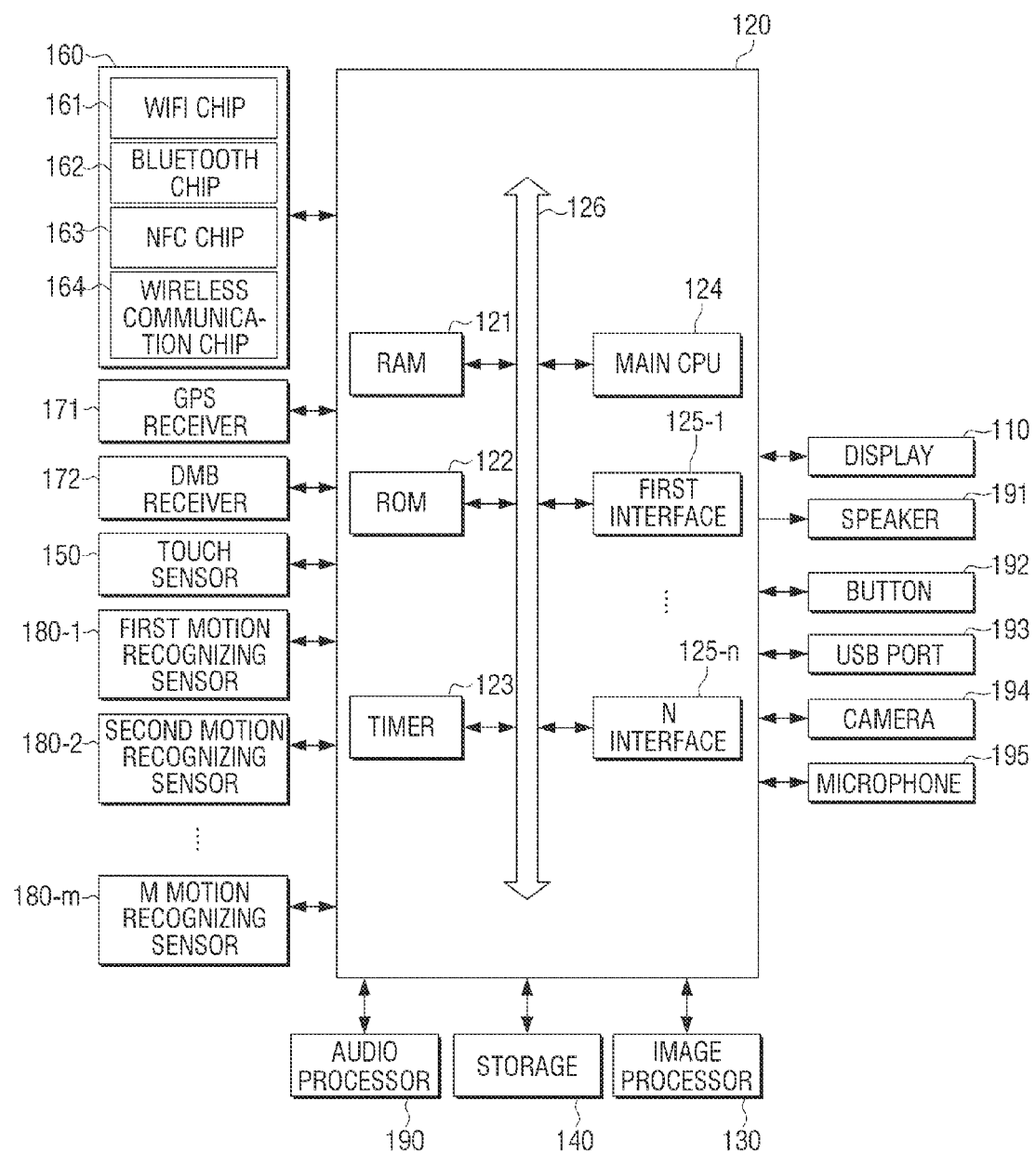
FIG. 21 is a block diagram provided to explain constitution of the transparent display apparatus according to various embodiments of the present disclosure.

FIG. 21 is a block diagram provided to explain constitution of the transparent display apparatus according to various embodiments of the present disclosure.

Referring to FIG. 21, the transparent display apparatus 100 includes the display 110, the controller 120, the image processor 130, the storage 140, a touch sensor 150, a communicator 160, a Global Positioning System (GPS) receiver 171, a Digital Multimedia Broadcasting (DMB) receiver 172, first to m motion detecting sensors 180-1~180-m, an audio processor 190, a speaker 191, a button 192, Universal Serial Bus (USB) port 193, a camera 194, and a microphone 195.

The display 110 includes the plurality of transparent display layers, and each transparent display layer displays screens by being separately controlled with the controller 120. Constitution and operation of the display 110 are described in the above several embodiments, which will not be further explained.

The touch sensor 150 may sense touch manipulation of a user by using the touch sensor arranged on at least one layer among the plurality of transparent display layers. The touch sensor 150 may mount the touch sensor arranged on the most upper layer, or all of the touch sensors arranged on the most upper layer and the most lower layer. The touch sensing method with the touch sensor is already described in the descriptions of FIG. 7, which will not be further explained.

The plurality of motion detecting sensors 180-1~180-m are sensors that can sense a rotation of the transparent display apparatus 100 and a user position. For the sensor to detect the rotation, a geomagnetic sensor, an acceleration sensor and a gyro sensor may be used. The acceleration sensor outputs sensing values corresponding to a gravity acceleration which changes according to gradient of the device attached with the sensor. The gyro sensor is sensor which examines angular velocity by measuring a Coriolis force applied toward the velocity direction when a rotating movement occurs. The geomagnetic sensor is sensor which detects an azimuth. For the sensor to detect a user position, an infrared sensor and a photo diode may be used.

The controller 120 controls the image processor 130 to display various screens on each of the transparent display layers according to sensing results sensed through the touch sensor 150 and the plurality of motion detecting sensors 180-1~180-m, a manipulation of the button 192, user motion gestures obtained with the camera 194, and voice commands obtained with the microphone 195.

The controller 120 may control each unit by using programs and data stored in the storage 140. For example, the controller 120 may perform communication with external devices through the communicator 160. The communicator 160 is a hardware unit which performs communication with various types of external devices according to various types of communication methods. The communicator 160 includes various communication chips such as a WiFi chip 161, a Bluetooth chip 162, a Near Field Communication (NFC) chip 163, and a wireless communication chip 164.

The WiFi chip 161, the Bluetooth chip 162, and the NFC chip 163 perform communication respectively according to a WiFi method, a Bluetooth method, and an NFC method. The NFC chip 163 indicates chip which operates according to the NFC method that uses a 13.56 MHz bandwidth from among the various Radio Frequency-Identification (RF-ID) frequency bandwidths such as 135 kHz, 13.56 MHz, 433 MHz, 860~960 MHz, and 2.45 GHz. When WiFi chip 161 or Bluetooth chip 162 is used, various connection information such as Service Set Identification (SSID) and a session key may be transmitted and/or received first, a communication may be connected by using the information, and various information may be transmitted and/or received. The wireless communication chip 164 performs communication according to various communication standards such as Institute for Electrical and Electronics Engineers (IEEE), Zigbee, $3^{rd}$ Generation (3G), 3G Partnership Project (3GPP), and Long Term Evolution (LTE). The Controller 120 may display data received from external devices through the communicator 160 on each of the transparent display layers.

Meanwhile, the GPS receiver 171 is unit which receives GPS signals from GPS satellites and measures current position of the transparent display apparatus 100. When the navigating function implements, the controller 120 may calculate current position by using the GPS signals received by the GPS receiver 171, and may display a path guide screen which reflects the current position on one of the transparent display layers. In this case, the controller 120 may display the map screen on a lower layer and the path guide screen on an upper layer. Thus, a user may view navigation screen providing dimensional feelings.

The DMB receiver 172 is a hardware unit which receives and processes DMB signals. When a DMB function implements, the controller 120 may display a DMB receiving screen on one of the transparent display layers. If DMB signals are added with scripts, the controller 120 may separate the scripts and display the scripts and the image frames on the different display layers to each other. For example, the image frames may be displayed on a lower layer and the scripts may be displayed on an upper layer. Therefore, a user may recognize the scripts with more dimensional feelings.

The image processor 130 performs a role of generating screens displayed on each of the transparent display layers 110-1~110-n, as described above. The image processor 130 may be constituted as illustrated in FIG. 3. However, the image processor is limited thereto and may be implemented in any similar and/or suitable manner. The image processor 130 may further mount various units such as a codec to encode or decode video data, a parser, a scalar, a noise filter, and a frame rate converting module. Further, the image processor 130 may be implemented to use one united frame buffer, divide the buffering area, and use the respective transparent display layers without using the frame buffers separately arranged on each of the transparent display layers in FIG. 3.

The audio processor 190 is a hardware unit which performs processing audio data. The audio processor 190 may perform various processing such as decoding, amplifying, and noise filtering regarding audio data. When contents including audio data plays, the controller 120 may control the audio processor 190 to output the audio signals while displaying the playing screen on one of the plural transparent display layers. The audio signals are provided to the speaker 191, and outputted. If the plurality of contents are respectively played and displayed on the different transparent display layers, then the controller 120 may control the audio processor 190 to process audio signals corresponding to the contents displayed on the first transparent display layer which is the most upper layer.

The speaker 191 is a hardware unit which outputs various alarm sounds and voice messages as well as the audio data processed in the audio processor 190. The button 192 may be various types of buttons such as a mechanical button, a touch pad or a wheel formed on an area such as a front side, a sectioned side, and a back side of the exterior body in the transparent display apparatus 100. The USB port 193 may perform communication with various external devices through USB cables. The camera 194 is a hardware unit which photographs still image or video according to controlling of a user. The camera 194 may be implemented as a front side camera and a back side camera. The microphone 195 is a hardware unit which receives user voices or other sounds and converts them to audio data. The controller 120 may use user voices inputted through the microphone 195 while calling, or may convert user voices to audio data and store them in the storage 140.

When the camera 194 and the microphone 195 are included, the controller 120 may perform a controlling operation according to user voices inputted through the microphone 195 or user motion recognized by the camera 194. The transparent display apparatus 100 may operate in motion controlling mode or voice controlling mode as well as normal mode which is controlled by user touches or button manipulation. When operating in the motion controlling mode, the controller 120 photographs a user by activating the camera 194, tracks changes in user motion, and performs corresponding controlling operation. When operating in voice controlling mode, the controller 120 may operate in voice recognizing mode which analyzes user voices inputted through the microphone 195 and performs controlling operation according to the analyzed user voices.

Besides, various external inputting ports to connect with various external components such as headset, mouse and LAN may be further arranged. The above described operation of the controller 120 may be performed by the programs stored in the storage 140. The storage 140 may store OS software to drive the transparent display apparatus 100, various applications, various data inputted or established while implementing applications, contents, touch gestures, motion gestures, voice commands, and event information. The controller 120 controls general operation of the transparent display apparatus 100 by using the various stored programs.

The controller 120 includes a Random Access Memory (RAM) 121, a Read Only Memory (ROM) 122, a timer 123, a main Central Processing Unit (CPU) 124, first to n interfaces 125-1~125-n, and a bus 126. The RAM 121, the ROM 122, the timer 123, the main CPU 124, and the first to n interfaces 125-1~125-n may be connected with each other through the bus 126. The first to n interfaces 125-1~125-n connect with the above various units. One of the interfaces may be a network interface which connects to external devices through network. The main CPU 124 performs booting by accessing to the storage 140 and using an OS stored in the storage 140. Further, the main CPU 124 performs various operations by using various programs, contents and data stored in the storage 140.

The ROM 122 stores sets of commands for system booting. When a command to turn on is inputted and electrical power is supplied, the main CPU 124 copies the stored OS in the storage 140 to the RAM 121 according to the stored commands in the ROM 122, and boots the system by implementing the OS. When the booting completes, the main CPU 124 copies the various application programs stored in the storage 140 to the RAM 121, and performs various operations by implementing the copied application programs in the RAM 121.

When various types of user manipulation are sensed through the plurality of motion recognizing sensors 180-1~180-m, the button 192, the camera 194 and the microphone 195, the main CPU 124 determines whether event matched with the event information stored in the storage 140 occurs by using the sensing results. Further, the main CPU 124 may determine whether event occurs by using the sensing results sensed by other units. As described, the event may be variously established. For example, the event may be an event to perform user touches or button selecting, an event to input motion gestures and voice commands, an event to input a command to implement applications, an event to input a command to play contents, an event to approach preset time or preset period, an event to generate system informing messages, an event to communicate with external sources, and any other similar and or suitable event.

When the event occurs, the main CPU 124 loads programs corresponding to the event from the storage 140 to the RAM 121 and implements the programs. The main CPU 124 drives the image processor 130 according to implementing of the programs, and displays screens corresponding to the event.

While one screen, i.e., the first screen 10, is displayed on the first transparent display layer 110-1, when an event to display another other screen, i.e., the second screen 20, occurs, then the main CPU 124 determines the display layer which displays the second screen. In this case, the main CPU 124 may determine the display layer by considering relatedness with the first screen and the second screen, user setting information, and screen size. Thus, when the first screen 10 and the second screen 20 are screens to display a uniform level of information, the main CPU 124 displays them on the same layer. For example, when a user inputs a command to implement a web browser again while the first screen 10 is a web browsing screen, then the second screen 20 may be implemented as web browsing screen and displayed on the same first transparent display layer. Meanwhile, when a user selects some of the objects within the first screen 10 while the first screen 10 is web browsing screen, the web browsing screen provided from the sources linked by the selected objects, i.e., the second screen 20 is displayed on the different layer from the first screen 10. Thus, when the first screen 10 is displayed on the upper layer, the first screen 10 may be moved to the lower layer and the second screen 20 may be newly displayed on the upper layer.

The main CPU 124 may determine the display layer to display the second screen 20, and determine a size or a display position of the second screen 20 according to a user setting situation. Thus, when a user sets the second screen 20 not to overlap with the first screen 10, then the main CPU 124 may display the second screen 20 on another position while avoiding displaying position of the first screen 10, and may determine its size or its shape so as not to overlap with the first screen 10. In summary, a display layer of each screen, a display position and other display features may be determined by the controller 120.

When at least one of the motion detecting sensors 180-1~180-m senses rotating of the transparent display apparatus 100 or when the user touches are sensed by the touch sensor 150, then the main CPU 124 may convert the display layers of the screens, or may modify the display positions and other display features according to the rotating or the touching. Such operation is specifically described in the above various embodiments, which will not be further explained.

Meanwhile, the main CPU 124 may count time by controlling the timer 123. Thereby, the main CPU 124 may determine whether it is long touch by counting the time of keeping user touching situation, and adjust the screen display layers or other display features according to the determining results. Further, whether the event occurs may be determined according to the counting results of the timer 123.

FIG. 21 comprehensively illustrates various units by exemplifying a case that the transparent display apparatus 100 includes various functions such as a communication function, a broadcasting receiving function, a video playing function and a displaying function. However, the present embodiment is not limited thereto, and any suitable and/or similar function may be provides by the transparent display apparatus 100. Thus, according to embodiments, some of the units illustrated in FIG. 21 may be deleted or modified, or other units are newly added. Meanwhile, as described above, the controller 120 may perform various functions by implementing the programs stored in the storage 140.

Figure 22:
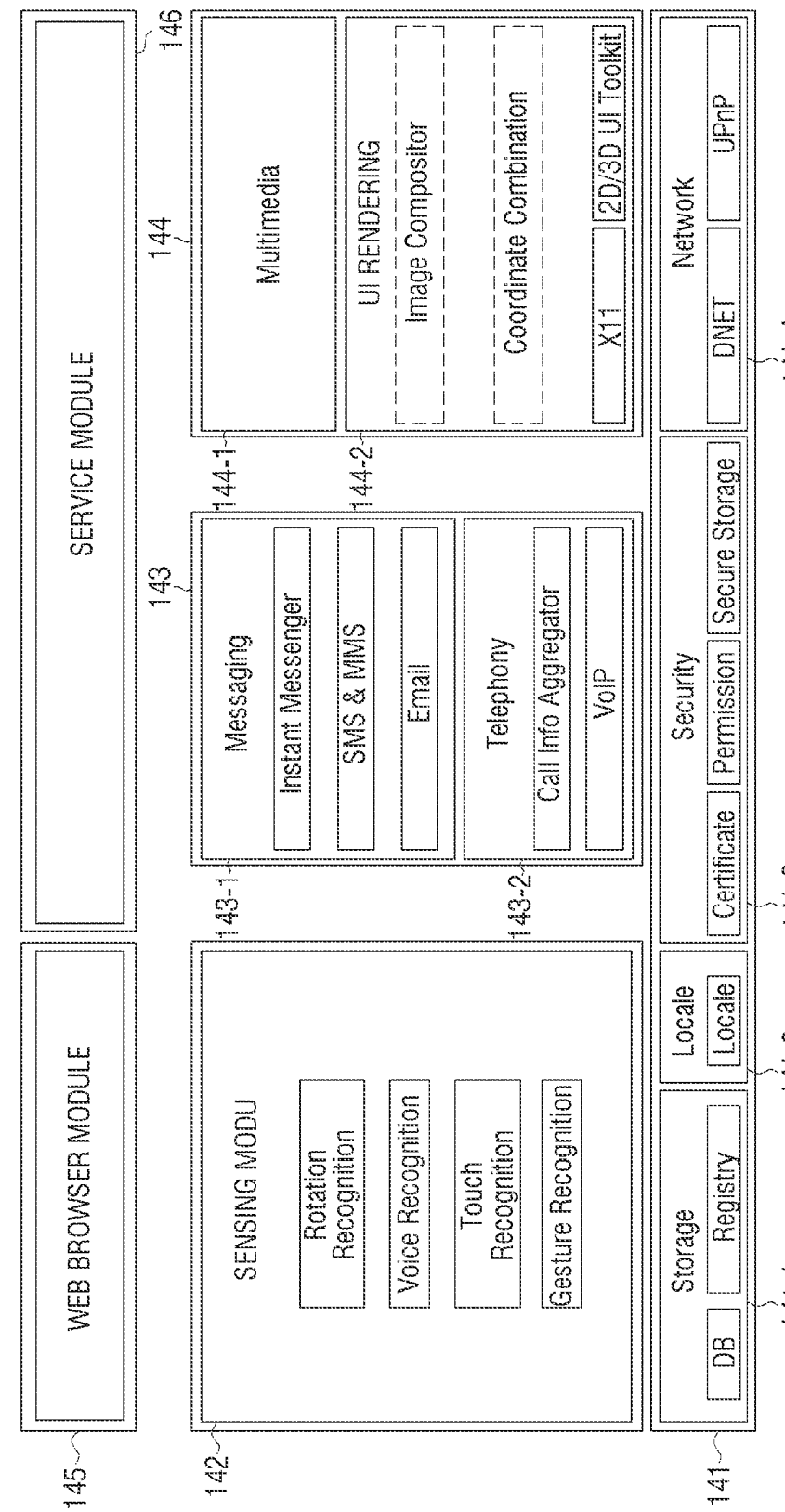
FIG. 22 illustrates software architecture that is applicable to the transparent display apparatus according to an embodiment of the present disclosure.

FIG. 22 illustrates software architecture that is applicable to the transparent display apparatus according to an embodiment of the present disclosure.

Referring to FIG. 22, the storage 140 may store the software which includes a base module 141, a sensing module 142, a communication module 143, a presentation module 144, a web browser module 145, and a service module 146. The base module 141 indicates basic module which processes signals delivered from each of hardware included in the transparent display apparatus 100 and transmits to the signals to upper layer modules. The base module 141 includes a storage module 141-1, a position based module 141-2, a security module 141-3, and a network module 141-4.

The storage module 141-1 is program module which manages a Database (DB) or a registry. The main CPU 124 may access the database within the storage 140 by using the storage module 141-1 and may read various data. The position based module 141-2 is program module which supports position based services by interlocking with hardware such as a GPS chip. The security module 141-3 is program module which supports certification of hardware, requests permission and secures storage, and the network module 141-4 is module to support network connection and includes DNET module and a Universal Plug-n-Play (UPnP) module.

The sensing module 142 is module which collects information from various the sensors, analyzes and manages the collected information. Specifically, the sensing module 142 is program module which performs operation of extracting manipulation features such as a coordinate value where the touch is performed, a touch movement direction, a movement velocity, and a movement distance.

The main CPU 124 may extract a rotation situation, a user position, and a touched point of the transparent display apparatus 100 by implementing the sensing module 142 and analyzing the sensing values sensed with the plurality of motion recognizing sensors. Besides, according to various embodiments, the sensing module 142 may include a face recognizing module, a voice recognizing module, a motion recognizing module, and an NFC recognizing module.

The communication module 143 is module which performs communication externally. The communication module 143 may include a messaging module 143-1 such as a messenger program, a Short Message Service (SMS) & Multimedia Message Service (MMS) program and an e-mail program, and a calling module 143-2 installing a call information aggregator program module and Voice over Internet Protocol (IP) (VoIP) module.

The presentation module 144 is module which generates displays screens. The presentation module 144 includes multimedia module 144-1 to play and output multimedia contents, and a User Interface (UI) rendering module 144-2 to perform processing UI and graphics. The multimedia module 144-1 may include a player module, a camcorder module, and a sound processing module. Thereby, the multimedia module 144-1 performs playing various multimedia contents by generating and playing screens and sounds. The UI rendering module 144-2 may include an image compositor module which combines images, a coordinate combining module which combines and generates coordinate values on the screens in which images are displayed, an X11 module which receives various events from hardware, and a 2D/3D UI toolkit which provides tools to generate a UI in 2D or 3D format.

When an event to display screens occurs, the main CPU 124 determines the transparent display layer which the screens are displayed after generating screens by implementing the presentation module 144. The main CPU 124 displays corresponding screens on the transparent display layer. Thereafter, when the event to display other screens occurs, the presentation module 144 determines the transparent display layer which corresponding screens are displayed and displays the screens on the determined layer. Besides, operations such as screen converting or display situation modifying may be performed by the presentation module 144.

The web browser module 145 indicates module which accesses web server by performing web browsing. The web browser module 145 may mount various modules such as web view module to generate web pages, download agent module to perform downloading, bookmark module, and webkit module. As described above, the web browsing screens generated by the web browser module 145 may be displayed on the transparent display layer.

The service module 146 is module which stores the programs to generate the screens according to various types of user manipulation. The service module 146 may include various program modules such as a navigation program, a contents playing program, a game program, an electronic book program, a calendar program, an alarm managing program, and other widgets. The main CPU 124 may display each of the screens generated by implementing the service module 146 on each of the transparent display layers. Although FIG. 22 illustrates various program modules, some of the various illustrated program modules may be deleted or modified, or new modules may be added according to types and features of the transparent display apparatus 100.

Figure 23:
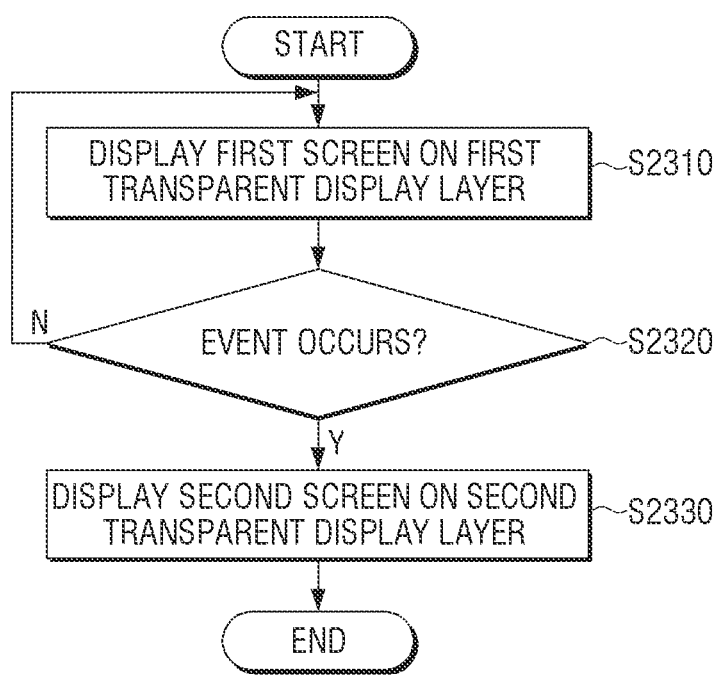
FIG. 23 is a flowchart provided to explain a display method of the transparent display apparatus according to an embodiment of the present disclosure.

FIG. 23 is a flowchart provided to explain a display method of the transparent display apparatus according to various embodiments of the present disclosure.

Referring to FIG. 23, the transparent display apparatus may include the plurality of transparent display layers which are consecutively integrated. When an event occurs at operation S2320 while the first screen 10 is displayed on the first transparent display layer 110-1 at operation S2310, then the transparent display apparatus displays the second screen 20 on the second transparent display layer 110-2 which is different from the layer that the first screen 10 is displayed on at operation S2330. The layer that the first screen is displayed and the layer that the second screen is displayed are mutually converted according to a user command.

Figure 24:
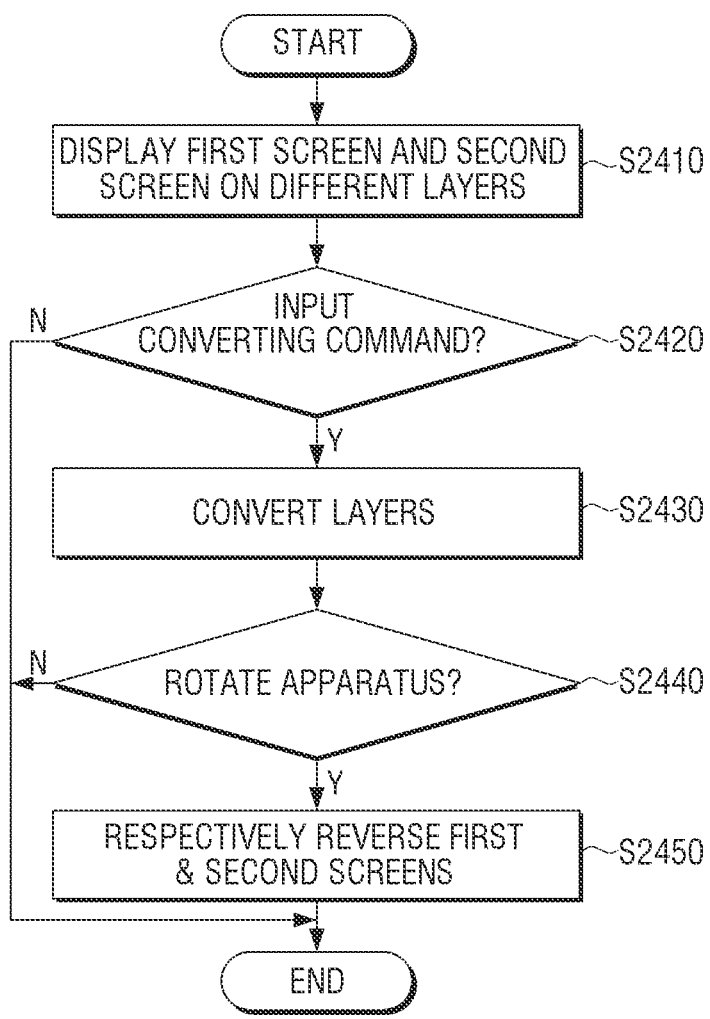
FIG. 24 is a flowchart provided to explain displaying operation of the transparent display apparatus according to various embodiments of the present disclosure.

FIG. 24 is a flowchart provided to explain displaying operation of the transparent display apparatus according to various embodiments of the present disclosure.

Referring to FIG. 24, when a user inputs a converting command at operation S2420 while the first and second screens 10, 20 are respectively displayed on the different transparent display layers with each other at operation S2410, the transparent display apparatus 100 converts the layers that the first and second screens 10, 20 are respectively displayed at operation S2430. Herein, inputting a converting command is one of the described second events, and layer converting may be performed according to various cases. Further, converting the layers at operation S2430 may arrange various sub-processes according to embodiments.

For example, when the second event occurs, displaying the first screen 10 displayed on the first transparent display layer 110-1 on the second transparent display layer 110-2 for a predetermined time may be arranged. Further, converting the layers may arrange displaying the second screen 20 displayed on the second transparent display layer 110-2 on the first transparent display layer 110-1 for a predetermined time when the second event occurs, and all of such detailed processes. Herein, certain time may be time to keep the second event, or an established time such as preset basic time (e.g., five seconds). Types of the screens and operations of converting the screens are already described in the above various embodiments, which will not be further explained.

Meanwhile, when rotating is sensed at operation S2440, the transparent display apparatus may respectively reverse the first screen 10 and the second screen 20 according to the rotating situation at operation S2450. Herein, the reversing indicates that the screens are turned over on horizontal or vertical direction and displayed, as illustrated in FIG. 18. In summary, the transparent display apparatus may provide various formats of UI by using the plurality of transparent display layers. Therefore, recognizing performance of the screens can be enhanced, and various feelings of the screens can be provided, which enhance a user satisfaction. Further, in the above various embodiments, the first screen 10 is described as A and the second screen 20 is described as B for convenient explanation, however, the first and second screens 10, 20 may be implemented in various formats. The following will explain various embodiments of each screen.

Figure 25:
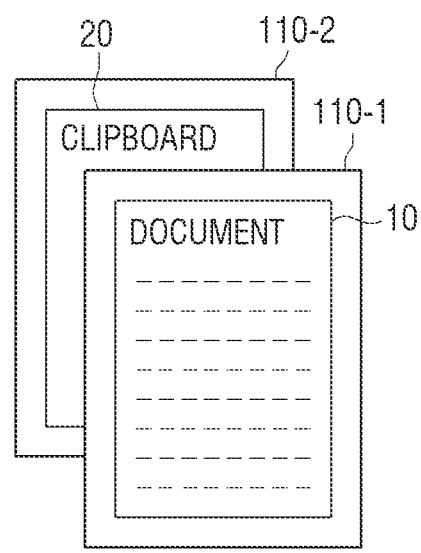
FIGS. 25, 26, and 27 illustrate examples of the screens displayed on the plurality of transparent display layers according to an embodiment of the present disclosure.
Figure 26:
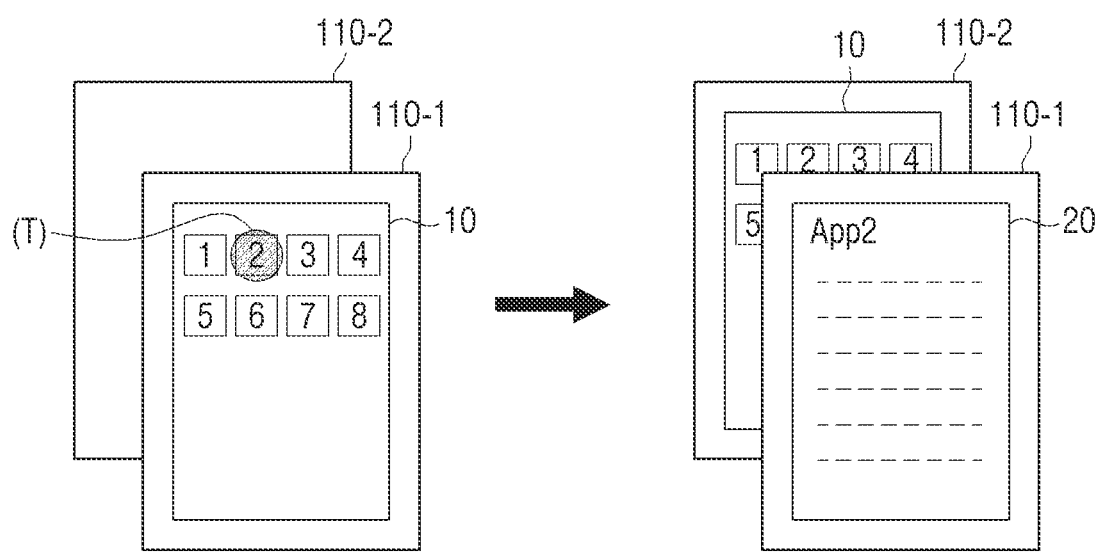
Figure 27:
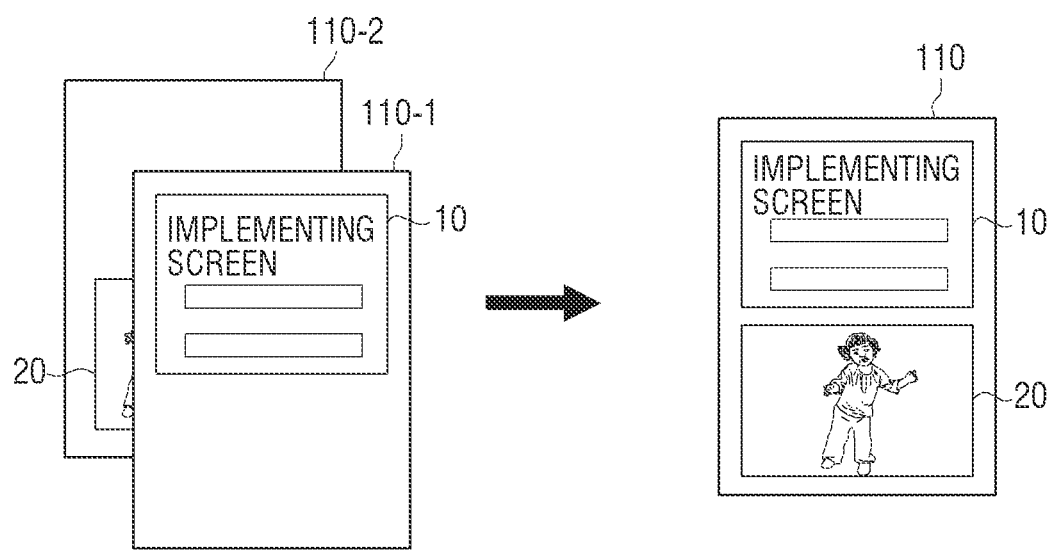

FIGS. 25, 26, and 27 illustrate examples of the screens displayed on the plurality of transparent display layers according to an embodiment of the present disclosure.

Referring to FIG. 25, the first and second screens 10, 20 may be described with reference to specific embodiments of screens and may be referred to as a variety of specific screens corresponding to the specific embodiments. The first transparent display layer 110-1 displays the implementing screen 10 of the document writing program and the second transparent display layer 110-2 displays the clip board screen 20. If a user wants to capture specific phrases, charts, and images while writing documents, he may perform preset touch manipulation on corresponding parts. The controller 120 may copy or paste the selected parts to the clip board screen 20 according to touch manipulation. For example, when long touch manipulation on specific objects is performed and when a copying command regarding the long touch manipulation is matched, corresponding objects may be displayed uniformly on the clip board screen 20 while displaying the objects on the implementing screen 10 as they are. Further, when double touch manipulation on specific objects is performed and when a pasting command regarding the double touch manipulation is matched, corresponding objects may be deleted from the implementing screen 10 and displayed on the clip board screen 20.

A user may arrange the clip board screen 20 on the front side and the implementing screen 10 on the back side by converting the layers to display the screens. For example, when a user performs touch & drag manipulation toward one direction, the layers to display the screens are converted. When preset manipulation is performed on the objects displayed on the clip board screen 20 in this situation, corresponding objects may be moved and displayed again to the implementing screen 10. When the document writing program implements, the clip board screen 20 may be automatically implemented by interlocking with the program, or selectively implemented by a user command.

Referring to FIG. 26, an embodiment which displays icon displaying screen and implementing screen by selecting the icon respectively on the different transparent display layers to each other is illustrated. The transparent display apparatus 100 may display the background screen 10 which includes various icons in a normal stand-by situation. The background screen 10 may be displayed on the most upper layer that can directly sense touches, i.e., the first transparent display layer 110-1. When one icon 2 receives a user touch (T) in this situation, the transparent display apparatus 100 implements an application corresponding to the icon 2 and generates the implementing screen 20. At this moment, the transparent display apparatus 100 displays the implementing screen 20 on the first transparent display layer 110-1 while moving and displaying the background screen 10 previously displayed on the first transparent display layer 110-1 on the second transparent display layer 110-2. Thereby, the transparent display apparatus 100 may directly sense that a user touches the implementing screen 20. When a user completes the implementing screen 20, the transparent display apparatus 100 removes the implementing screen 20, moves and displays the background screen 10 to the first transparent display layer 110-1 again. Although FIG. 26 describes the operation when the application icon is selected, similar operation may be performed when folder icon or file icon is selected. For example, when folder icon is selected, screen to mark a list of files stored within the folder may be immediately displayed on the first transparent display layer 110-1.

Referring to FIG. 27, an embodiment that setting screen that a user can set various functions in the transparent display apparatus 100 is displayed is illustrated. When a user selects function setting menu, the transparent display apparatus 100 displays an implementing screen 10 on the first transparent display layer 110-1, and a quick-view screen 20 according to the functions established on the implementing screen 10 on the second transparent display layer 110-2. As described above, because image processing is performed separately regarding the first and second transparent display layers 110-1, 110-2, display features of the quick-view screen displayed on the second transparent display layer 110-2 may be modified only according to the setting values established on the implementing screen 10 while keeping display features of the implementing screen 10 as an original state. For example, when a user adjusts various display features such as color, resolution, size and clearness according to the implementing screen 10, the transparent display apparatus 100 generates the quick-view screen 20 by applying the values modified on the implementing screen 10 and displays the screen on the second transparent display layer 110-2. To view the quick-view screen 20 while setting, the transparent display apparatus 100 may arrange position of the implementing screen 10 and position of the quick-view screen 20 so as not to overlap with each other. Therefore, a user may immediately confirm changes of the quick-view screen 20 simultaneously while setting through one display 110.

In summary, the respective screens displayed on the transparent display layers may be variously implemented. Thus, as described above, the image frames and the scripts may be separated and displayed on the different transparent display layers to each other, or the background screen and the characters may be separated from one image frame and displayed on the different transparent display layers to each other, which providing dimensional feelings.

The screens displayed on the lower layer may be various application pop-up information such as message arriving reporting, a number of unchecked messages, e-mail arriving reporting, a number of unchecked e-mails, a calling stand-by time, a calling connecting time, an alarm setting situation, an alarm keeping time, a snooze applying time, a music playing time, a video playing time, an amount of total lists, an application updating display, a folder modification request display, a download processing display, and a free usage amount display. Further, system pop-up information to provide information on an amount of a battery remaining, a volume, an antenna intensity, and a local area out of receiving may be displayed.

Further, the controller 120 may store various situations such as a type, a stack, a color and a size of the screens displayed on the transparent display layer in the storage 140, and may adjust display features of the screens displayed on the lower transparent display layers according to the situations. For example, the controller 120 may adjust generating the lower screen with different colors or text from those of the upper screen and may adjust displaying the lower screen at a position where the upper screen is not displayed, i.e., a position that does not overlap with the upper screen. Such operations are specifically described in the above various embodiments, which will not be further explained. Meanwhile, in another embodiment, it is possible to provide, respectively, an individual job screen and cooperative job screen using the transparent display.

Figure 28:
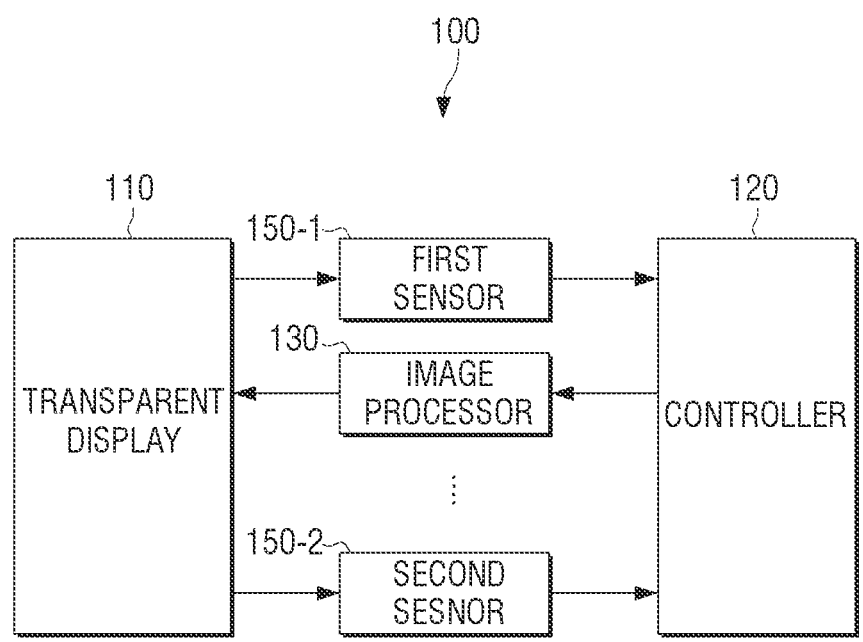
FIG. 28 is a block diagram of a transparent display apparatus according to an embodiment of the present disclosure.

FIG. 28 is a block diagram of a transparent display apparatus according to an embodiment of the present disclosure.

Referring to FIG. 28, the transparent display apparatus 100 includes a transparent display 110, a controller 120, an image processor 130, a first sensor 150-1, and a second sensor 150-2. The transparent display 110 has a transparent property so that images are seen there through. The transparent display 110 may be implemented in a planar form. The first sensor 150-1 senses a touch inputted to a first surface of the two surfaces of the transparent display 110, and the second sensor 150-2 senses a touch inputted to a second surface which is different from the first surface of the transparent display 110. The first and second sensors 150-1, 150-2 may be implemented as touch sensors.

The image processor 130 generates various screens under control of the controller 130 and provides the generated screens to the transparent display 110. To be specific, an 'individual job screen' refers to one controllable screen of the two surfaces of the transparent display 110, while a 'cooperative job screen' refers to both surfaces of the transparent display 110 which are controllable. Both the individual and cooperative job screens may each be various types of screen such as an application executing screen, a web browser screen, a multimedia content playback screen, an icon displaying screen, etc.

The controller 120 may display at least one of the individual and cooperative job screens on the transparent display 110 according to a user selection. When the individual job screen is displayed, the controller 120 controls the display of the individual job screen according to a touch inputted to the direction where the individual job screen is displayed. For example, when the document writing program is provided as the individual job screen, the controller 120 may display various texts or the like within the individual job screen or edit document in accordance with the touch inputted to the surface of the two surfaces of the transparent display 110 on which the individual job screen is displayed. Accordingly, the individual job screen is controlled by only one user.

On the contrary, when the document writing program is provided on the cooperative job screen, the controller 120 may display various texts in the cooperative job screen or may edit documents in accordance with touch inputted to both surfaces of the transparent display 110. That is, a first user in a first surface direction and a second user in a second surface direction, who are opposed to each other with the transparent display 110 interposed there between, may be able to cooperatively control the cooperative job screen by touching on the screens. The individual job screen may include non-transparent background area to prevent perception at the opposite side, and the cooperative job screen may include transparent background area to enable perception at the opposite side.

Figure 29:
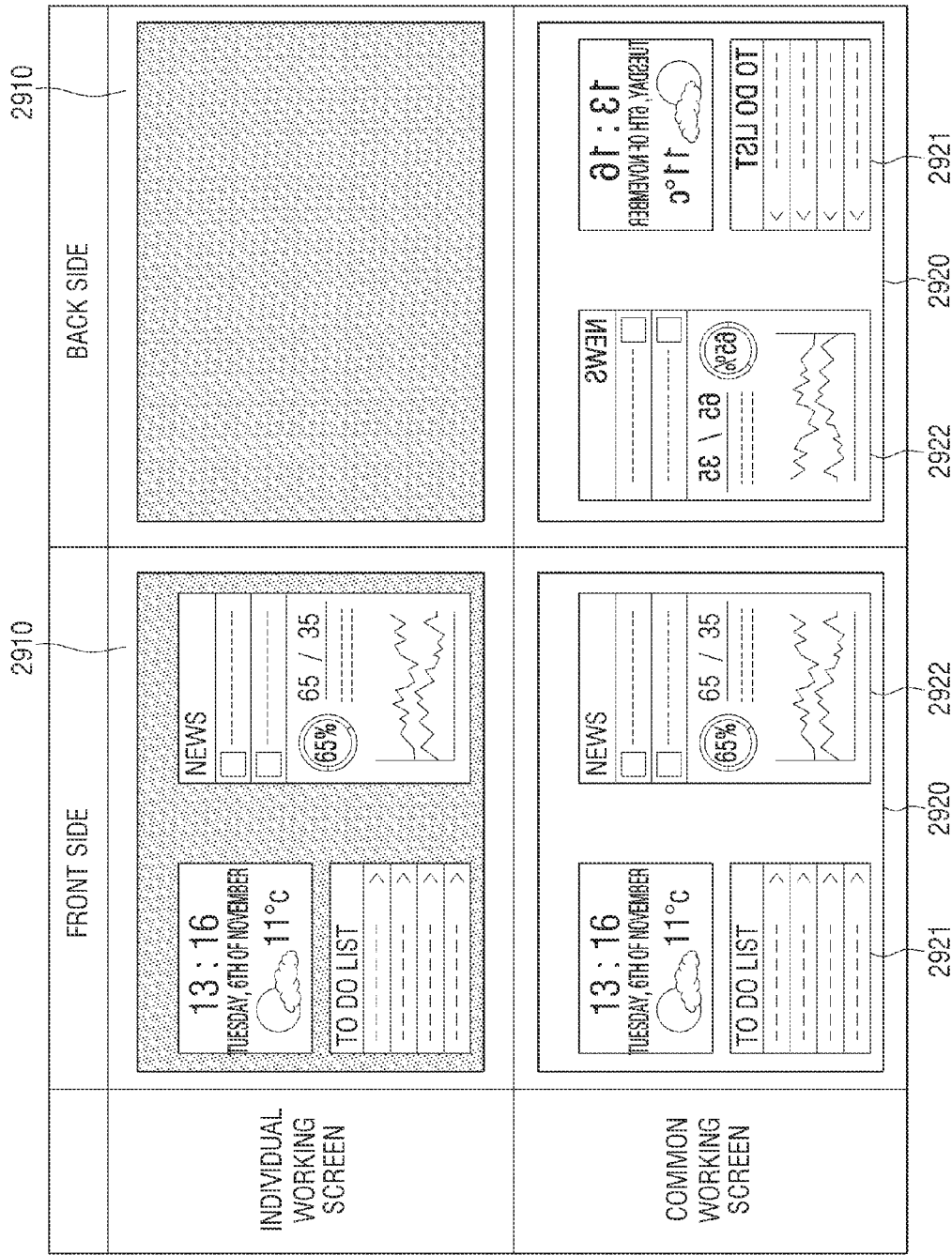
FIG. 29 illustrates in detail the individual and cooperative job screens according to an embodiment of the present disclosure.

FIG. 29 illustrates in detail the individual and cooperative job screens according to an embodiment of the present disclosure.

Referring to FIG. 29, an individual job screen 2910 of the transparent display apparatus is successfully perceived in the first surface direction, i.e., a front direction, while this is only viewed as a non-transparent background screen in the second surface direction, i.e., a back direction. On the contrary, concerning a cooperative job screen 2920, which has a transparent background area, it is possible to perceive the screen both in front and back directions. The only difference of viewing from the back is that objects 2921, 2922 on the cooperative job screen 2920 are inversed left and right. For convenience of explanation, the screens illustrated in FIG. 29 have the identical layout and objects, except for the difference of background areas in the individual job screen and cooperative job screen. To provide non-transparent and transparent background areas, the transparent display 110 may include two transparent display layers.

Figure 30:
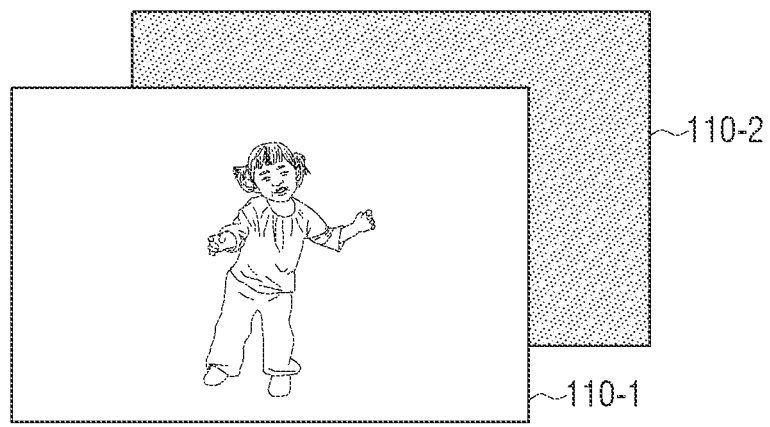
FIGS. 30 and 31 are views provided to explain a method for displaying individual and cooperative job screens using two transparent display layers according to an embodiment of the present disclosure.
Figure 31:
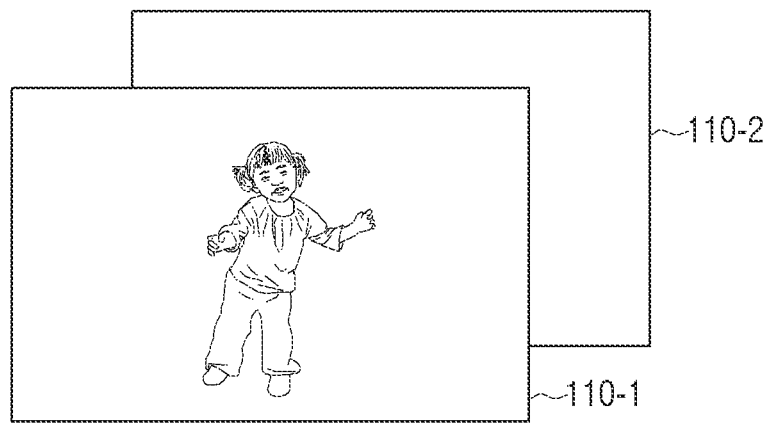

FIGS. 30 and 31 are views provided to explain a method for displaying individual and cooperative job screens using two transparent display layers according to an embodiment of the present disclosure.

Referring to FIG. 30, the transparent display 110 includes a first and second transparent display layers 110-1, 110-2 which are stacked sequentially on each other. As explained above, since both the first and second transparent display layers 110-1, 110-2 have transparent property, the background of the transparent display apparatus 100 is seen through even when there are a plurality of layers stacked on each other. The constitution of the transparent display 110 will not be redundantly explained below, but referenced to the detailed explanation provided above with reference to FIGS. 3, 4 and 5.

When the individual job screen is displayed on the first transparent display layer 110-1, the controller 120 may control so that the particular area among the entire areas of the second transparent display layer 110-2 that corresponds to the individual job screen turns non-transparent. When the second transparent display layer 110-2 includes a plurality of LCD pixels, the controller 120 may cause the area to be non-transparent by applying a driving voltage to the respective pixel units and thus blocking light penetration.

Referring to FIG. 31, the controller 1220 displays a screen on the first transparent display layer 110-1 and controls the second transparent display layer 110-2 to be transparent, so that the screen displayed on the first transparent display layer 110-1 is perceived from both directions. When the first user inputs a preset manipulation with respect to the cooperative job screen, the controller 120 may control the image processor 130 to inverse left and right sides of the cooperative job screen. For example, the cooperative job screen may be inversed left and right in response to a flicking or dragging of the user who touches the cooperative job screen and moves to a certain direction. As explained above, the first and second users, who are opposed to each other with respect to the transparent display 110 interposed therein, may be able to invert the left and right sides of the cooperative job screen as necessary, to align the text or image in the cooperative job screen to a direction suitable for viewing.

On the contrary, when the second user inputs a preset manipulation with respect to the cooperative job screen, the controller 120 may change the cooperative job screen to individual job screen. For example, the screen may change to the individual job screen when the user makes long-touch manipulation on the cooperative job screen. FIGS. 30 and 31 illustrate an example where the entire screen is implemented as the individual or cooperative job screen. However, the individual or cooperative job screen may be displayed partially on the screen, or displayed together within one screen. Meanwhile, there may be other than two transparent display layers. For example, three transparent display layers may be provided.

Figure 32:
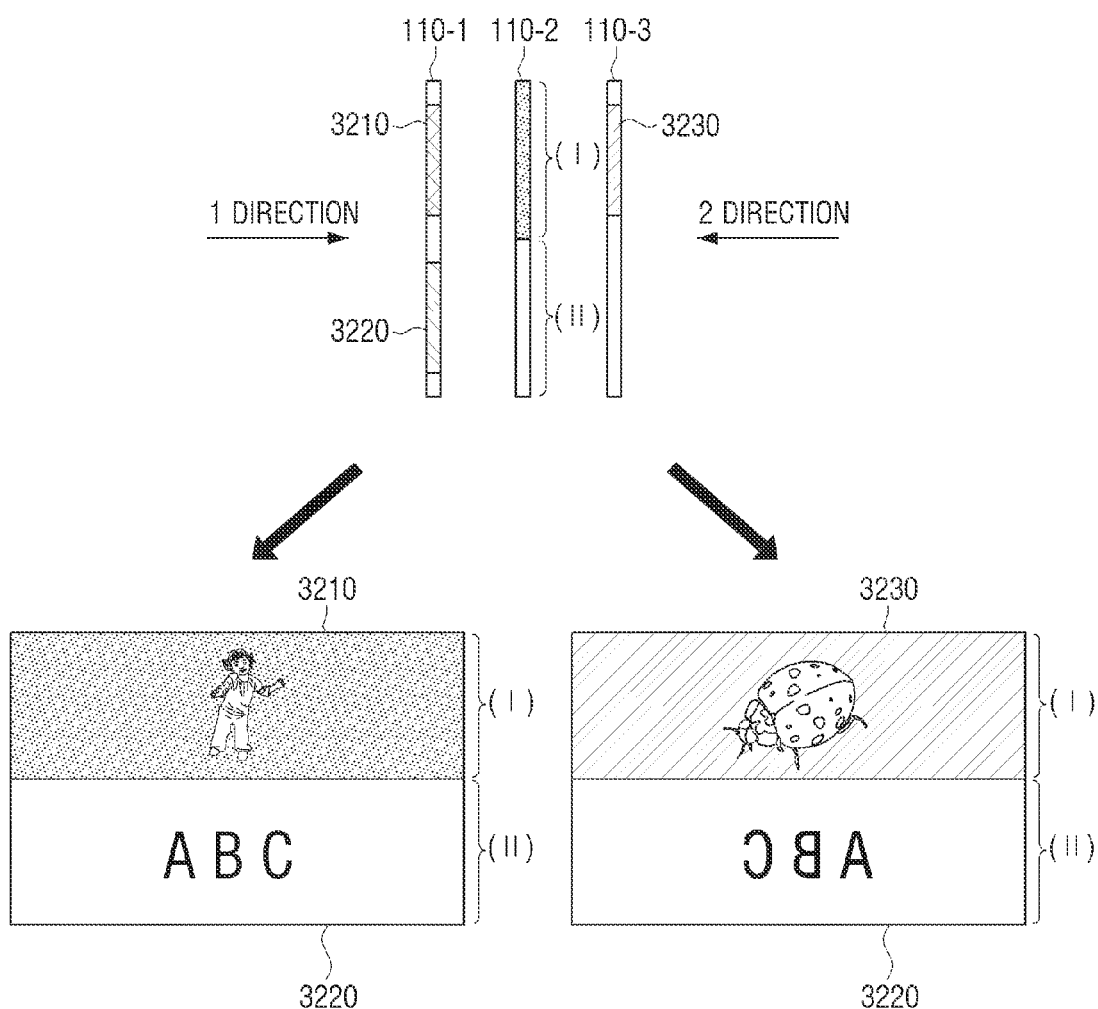
FIG. 32 is a view provided to explain a method for displaying individual and cooperative job screens using three transparent display layers according to an embodiment of the present disclosure.

FIG. 32 is a view provided to explain a method for displaying individual and cooperative job screens using three transparent display layers according to an embodiment of the present disclosure.

Referring to FIG. 32, the transparent display 110 may include a first, second and third display layers 110-1, 110-2, 110-3. The controller 120 may control the second transparent display layer 110-2, which is intermediate, to be transparent or non-transparent. That is, the controller 120 may control an area (I) corresponding to the individual job screen to turn non-transparent, while controlling an area (II) corresponding to the cooperative job screen to turn transparent.

FIG. 32 particularly illustrates an example where an upper area (I) of the second transparent display layer 110-2 is turned non-transparent, while a lower area (II) is turned transparent. The controller 120 may display a first individual job screen 3210 on the upper area of the first transparent display layer 110-1, while displaying the cooperative job screen 3220 on the lower area. Further, a second individual job screen 3230 may be displayed on an upper area of the third transparent display layer 110-3.

FIG. 32 also illustrates a screen which is perceived in the first direction of the transparent display 110. A first individual job screen 3210 having a non-transparent background area (I), and a cooperative job screen 3220 having a transparent background area (II) may be displayed together. A second individual job screen 3230 having a non-transparent background area (I) and a cooperative job screen 3220 having a transparent background area (II) may be displayed together in the second direction. The cooperative job screen 3220 perceived in the second direction is in inversed relationship with respect to the cooperative job screen 3220 perceived in the first direction.

Accordingly, the first user in the first direction is able to use the first individual job screen 3210 and the cooperative job screen 3220, while the second user in the second direction is able to use the second individual job screen 3220 and the cooperative job screen. The controller 120 controls the first individual job screen 3210 in accordance with a first touch inputted to the first surface, controls the second individual job screen 3230 in accordance with a second touch inputted to the second surface, and controls the cooperative job screen 3220 in accordance with both the first and second touches inputted in both directions.

Although FIGS. 31 and 32 particularly illustrate a method of constructing an individual job screen and a cooperative job screen using a plurality of transparent display layers, it is also possible to construct the individual job screen and the cooperative job screen using one transparent display layer. In this case, the individual job screen and the cooperative job screen may each be displayed in transparent state. The controller 120 may control the individual job screen in accordance with a touch inputted in one direction, and control the cooperative job screen in accordance with the touches inputted in both directions.

The controller 120 may selectively display the individual and cooperative job screens in accordance with user manipulation. For example, when a preset event occurs in a state that the individual job screen is displayed, the controller 120 may change the individual job screen into cooperative job screen. The 'event' as used herein may include input of a preset user touch manipulation, or selection of screen change menu.

Figure 33:
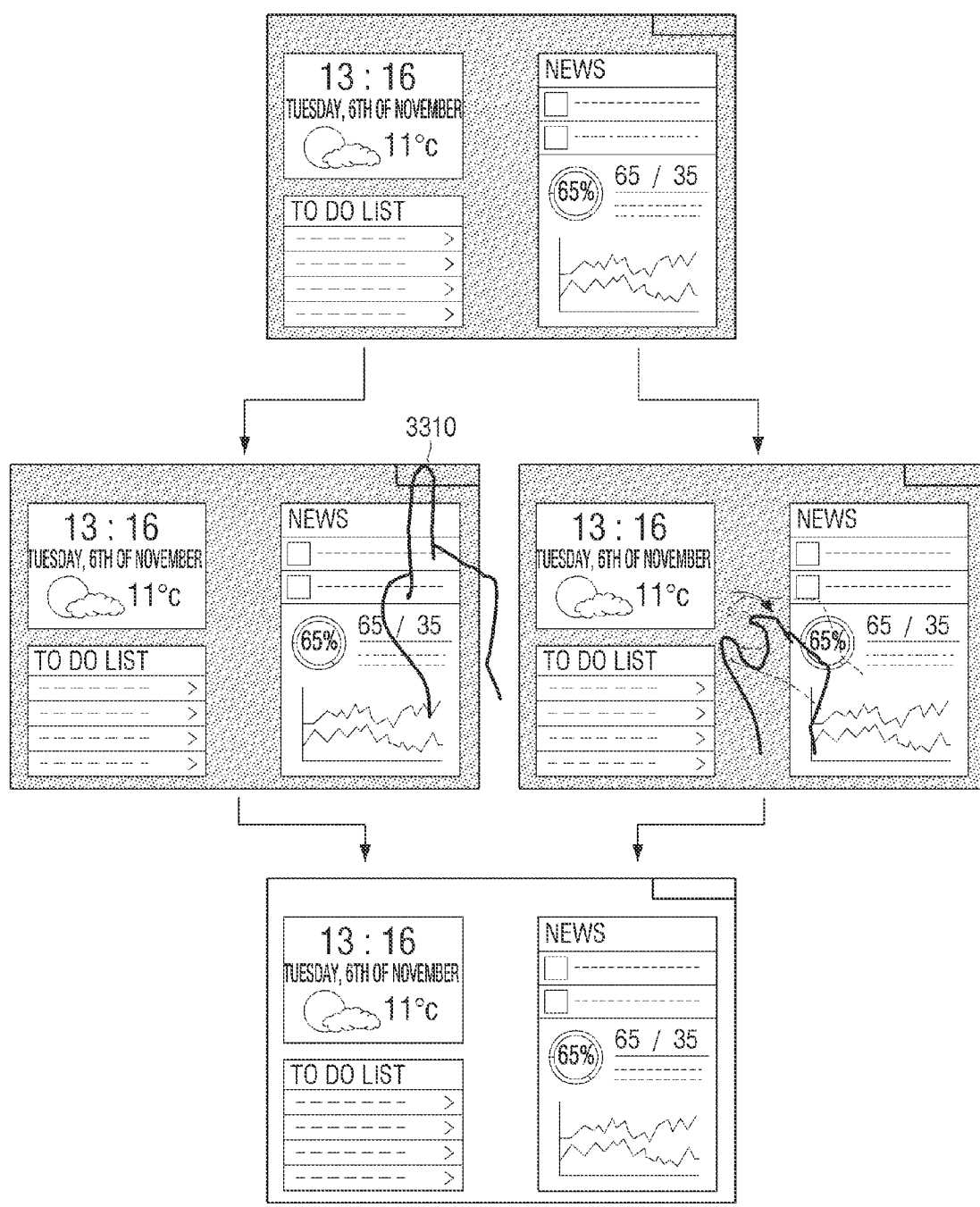
FIG. 33 is a view provided to explain a method for changing between individual job screen and cooperative job screen according to an embodiment of the present disclosure.

FIG. 33 is a view provided to explain a method for changing between individual job screen and cooperative job screen according to an embodiment of the present disclosure.

FIG. 33 illustrates an individual job screen. The individual job screen has at least one object displayed on a non-transparent background area. A menu 3310 to change a screen may be added on the individual job screen. When the user touches the menu 3310 as illustrated in FIG. 33, the controller 120 may change the individual job screen into cooperative job screen as illustrated further below in FIG. 33. Alternatively, when the user touches the individual job screen and rotates it clockwise or counterclockwise as illustrated in FIG. 33, then the controller 120 may change the background area of the individual job screen to transparent state, and change the individual job screen into cooperative job screen, as illustrated further below in FIG. 33. In yet another embodiment, the user may control so that the cooperative job screen and the individual job screen are displayed together, by dragging the individual job screen.

Figure 34:
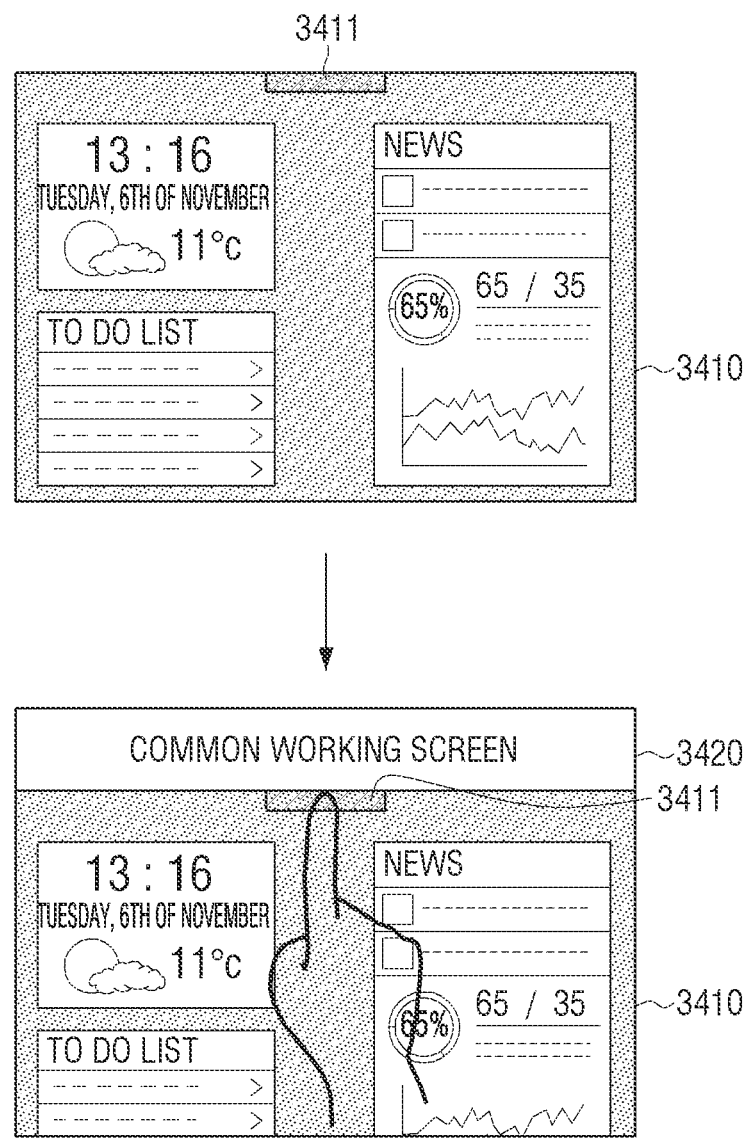

FIGS. 34 and 35 are provided to explain a method for displaying a cooperative job screen on one side of the individual job screen according to an embodiment of the present disclosure.

Referring to FIG. 34, the individual job screen 3410 may display a scroll bar 3411. The user may touch the scroll bar 3411 and drag it. The controller 120 may move the individual job screen 3410 in response to the user's dragging, while additionally displaying the cooperative job screen 3420 on one side of the individual job screen 3410. Although FIG. 34 illustrates an example where the scroll bar 3411 is displayed on the upper center area of the individual job screen 3410, according to which the cooperative job screen 3420 is slid from above to downward direction, the scroll bar 3411 may be positioned differently.

Referring to FIG. 35, a situation where the scroll bar 3411 is displayed on the center of the right edge of the individual job screen 3410 is illustrated. Accordingly, when the user touches the scroll bar 3411 and drags it to the left side, in response to such dragging, the cooperative job screen 3420 is slid from the right edge to left direction. Meanwhile, except for a situation where the entire individual job screen is changed to cooperative job screen, the transparent display apparatus 100 may change into the cooperative job screen in the unit of objects or areas.

Figure 36:
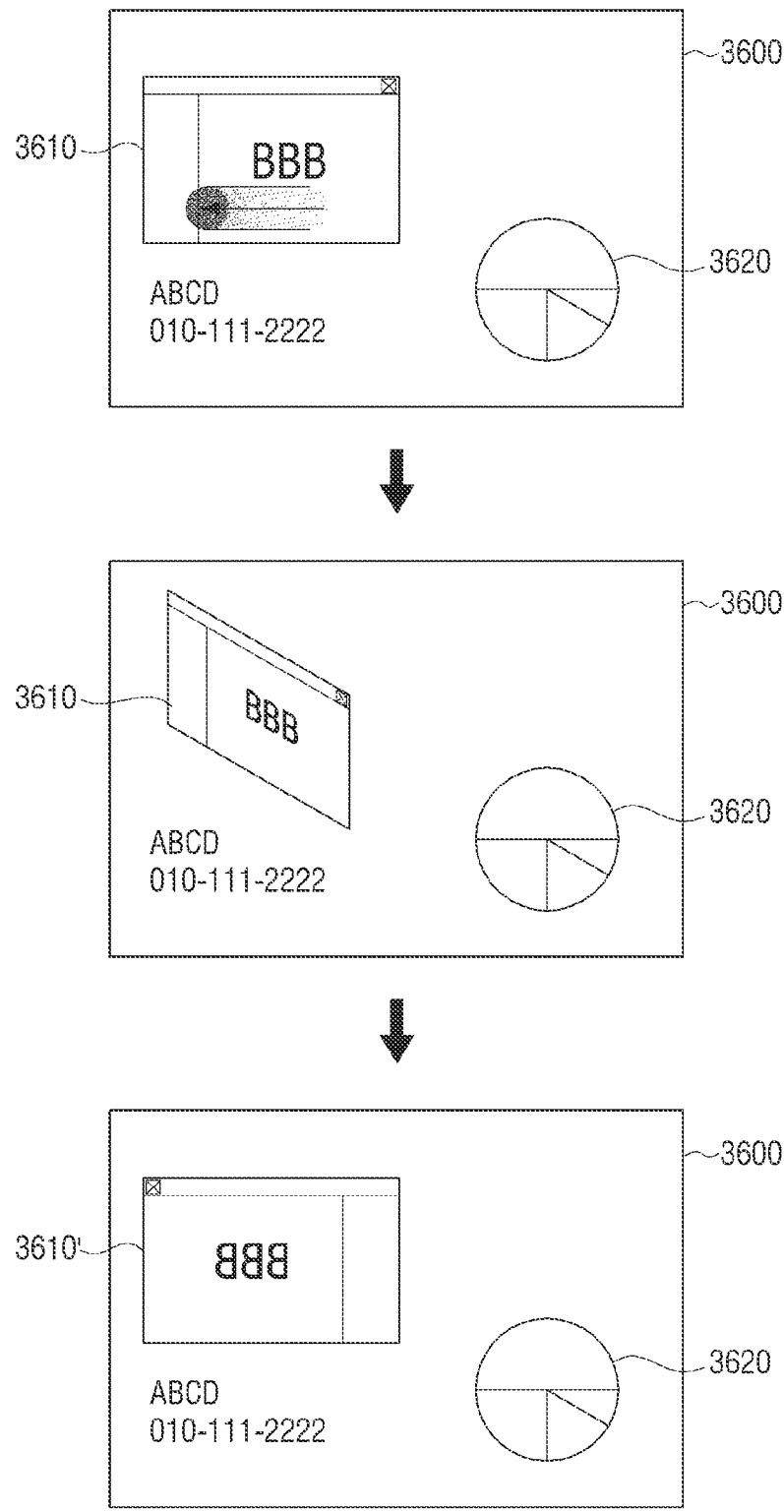
FIG. 36 is a view provided to explain a method for inversing a display of an object on an individual job screen to a state perceivable at an opposite side according to an embodiment of the present disclosure.

FIG. 36 is a view provided to explain a method for inversing a display of an object on an individual job screen to a state perceivable at an opposite side according to an embodiment of the present disclosure.

Referring to FIG. 36, an individual job screen 3600 may include a plurality of objects 3610, 3620. When the user flicks one object 3610, the controller 120 controls the image processor 130 to rotate the flicked object 3610 to the left-right inversed state and displays the same. Further, the controller 120 processes the inversed object 3610' so that the object 3610' is perceivable on both sides. Accordingly, the user at the opposite side can view the object 3610 correctly.

Figure 37:
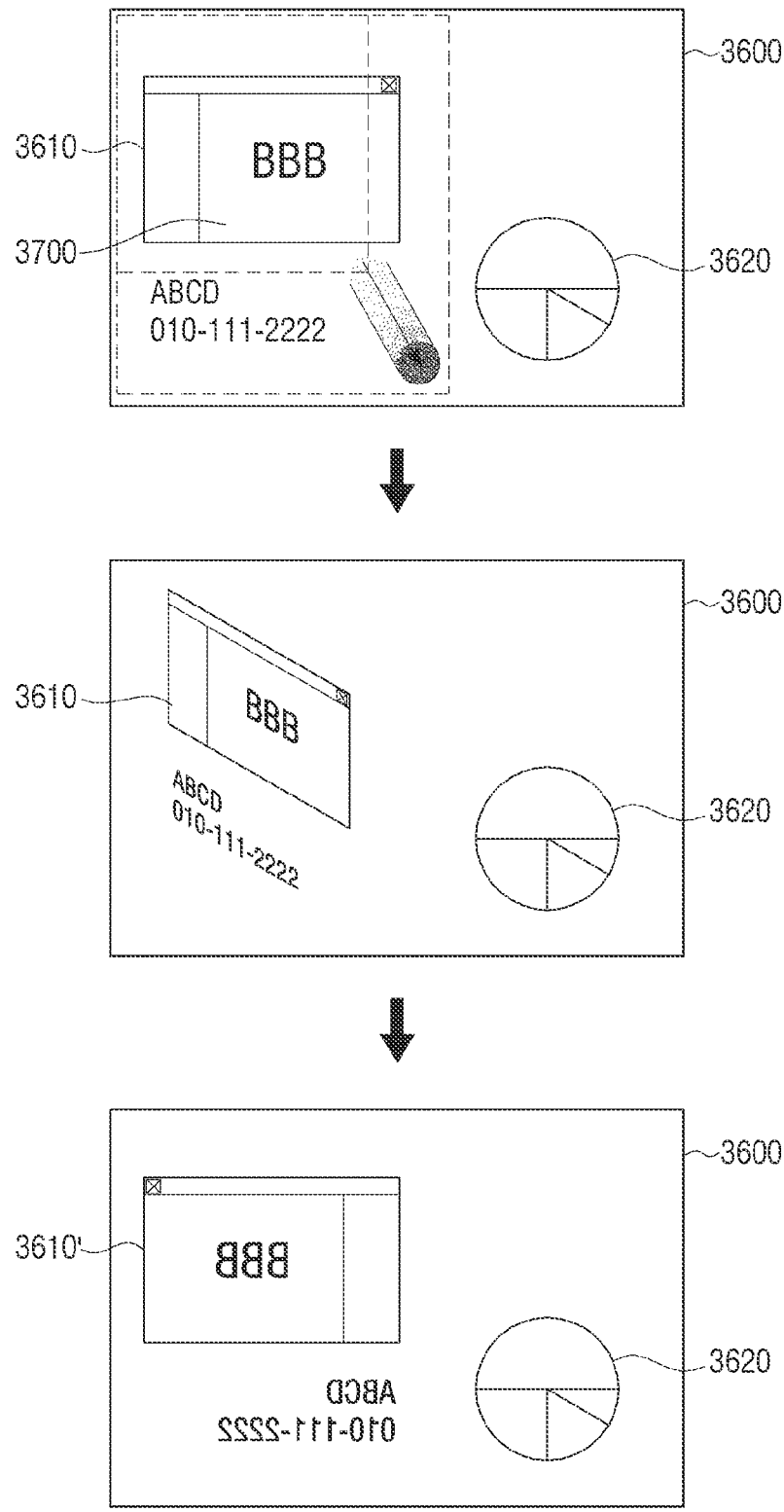
FIG. 37 is a view provided to explain a method of inversing a display of a certain area of an individual job screen to a state perceivable at an opposite side according to an embodiment of the present disclosure.

FIG. 37 is a view provided to explain a method of inversing a display of a certain area of an individual job screen to a state perceivable at an opposite side according to an embodiment of the present disclosure.

Referring to FIG. 37, when a user manipulation to designate a specific area within the individual job screen 3600 is inputted, the controller 120 of the transparent display apparatus 100 controls the image processor 130 to inverse a display state at a specific area. Further, the controller 120 processes so that the inversed area 3610' is perceived on both sides of the transparent display 110. The user may touch a specific area within the individual job screen 3600 and drags the same to designate the area. When the user touches the screen, a select area 3700 is displayed with reference to the touched spot. The select area 3700 changes size and form as the touch spot moves. When the touching ceases as the user removes hand from the screen, the screen within the finally-displayed select area 3700 is inversed.

FIG. 38 is a view provided to explain a method for inversing an individual job screen entirely to a state perceivable at an opposite side according to an embodiment of the present disclosure.

Referring to FIG. 38, when the user inputs a preset user manipulation on the individual job screen 3600, the individual job screen 3600 may entirely rotate to the left-right inversed state. Accordingly, the inversed screen 3600' is displayed.

Although FIGS. 36 to 38 illustrate an example where the individual job screen is changed to the cooperative job screen, the embodiments are not limited thereto. That is, it is equally possible to change the cooperative job screen into individual job screen. When the cooperative job screen is displayed, the first user in the first direction and the second user in the second direction are able to control the display state of the job screen as necessary, by inversing the display state. Accordingly, a plurality of users are able to cooperative construct the cooperative job screen.

Further, the screen attributes may be maintained, while the display state is inversed. For example, when a preset user manipulation is inputted to the individual job screen, the inversion may occur in the unit of screen, areas or objects, as explained above. Accordingly, the first user may show the result of his work to the second user who is on the opposite side, and then return the screen back to the first user. Meanwhile, the transparent display apparatus 100 is able to change the direction if displaying screen according to the position of the user.

Figure 39:
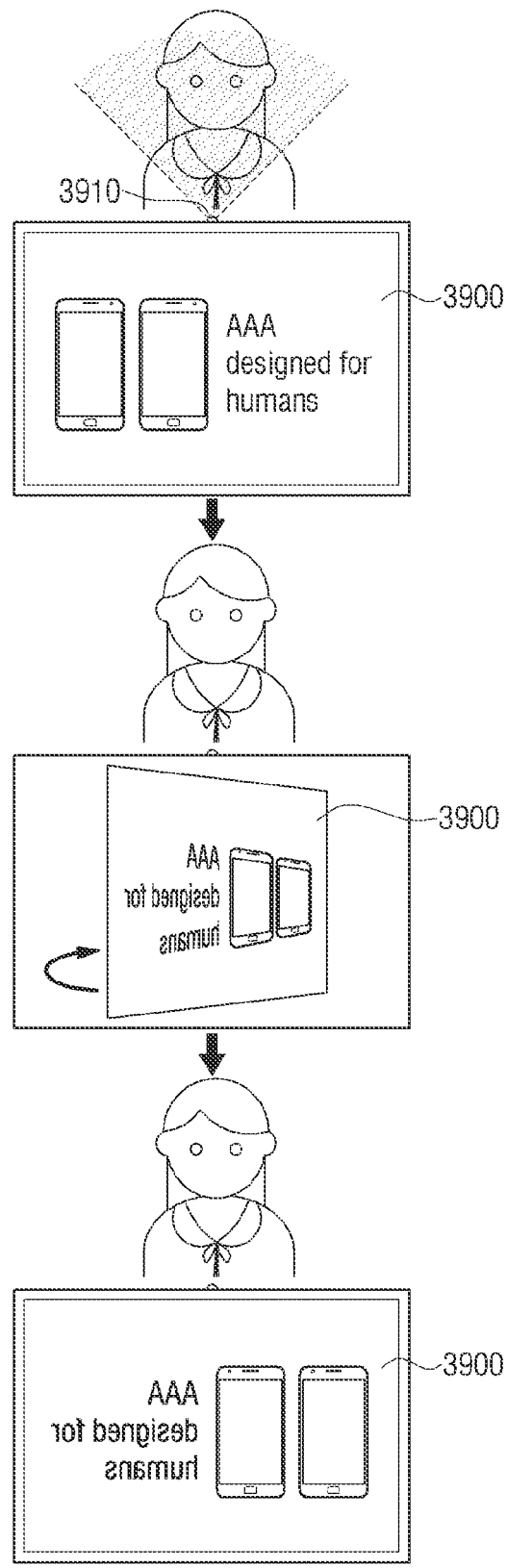
FIG. 39 is a view provided to explain a method for changing a direction of displaying screen according to an embodiment of the present disclosure.

FIG. 39 is a view provided to explain a method for changing a direction of displaying screen according to an embodiment of the present disclosure.

Referring to FIG. 39, the transparent display apparatus may include a user sensor 3910. The user sensor 3910 may include various types of sensors such as an ultrasonic sensor, an infrared sensor or any suitable and/or similar type of sensor. A camera may also be implemented. When the camera is implemented, the user sensor 3910 may determine a presence and/or an absence of the user by analyzing the photographed image. When sensing the position of the user through the user sensor 3910, the controller 120 displays the individual job screen or the cooperative job screen to the direction where the user position is sensed.

In a state where the individual job screen 3900 is displayed in the first direction, when the user is sensed in the second direction, then the controller 120 inverses the individual job screen 3900 to the second direction where the user is at. Accordingly, the user is able to perceive screen without left-right inversion at any direction. Although FIG. 39 illustrates an example where the direction of displaying screen inverses depending on the position of the user, the controller 120 may change screen based on the recognition of gaze of the user's eyes.

Figure 40:
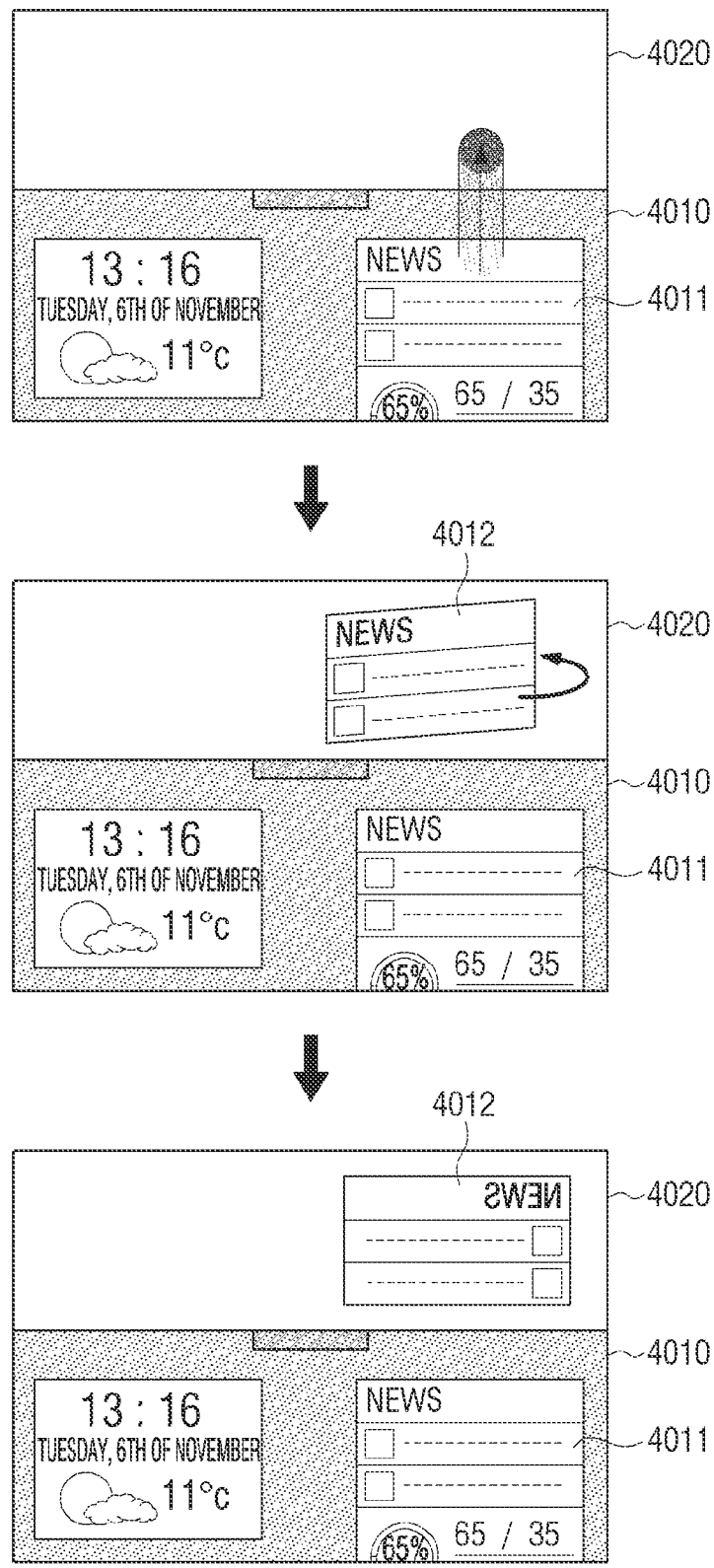
FIG. 40 is a view provided to explain a method for moving an object on an individual job screen to a cooperative job screen and displaying it thereon according to an embodiment of the present disclosure.

FIG. 40 is a view provided to explain a method for moving an object on an individual job screen to a cooperative job screen and displaying it thereon according to an embodiment of the present disclosure.

Referring to FIG. 40, the transparent display apparatus 100 displays a cooperative job screen 4020 on one side of an individual job screen 4010. The user may move the objects on the respective screens 4010, 4020. FIG. 40 particularly illustrates an example where an object 4011 displayed in the individual job screen 4010 is moved to the cooperative job screen 4020. When a user manipulation is inputted, touching and moving the object 4011 to the cooperative job screen 4020, the controller 120 displays an object 4012, which is identical to the selected object 4011, in the cooperative job screen 4020, and displays the object 4012 in the left-right inversed state. Accordingly, the selected object 4012 is displayed in the cooperative job screen 4200 to be perceivable on both sides of the transparent display 110.

Figure 41:
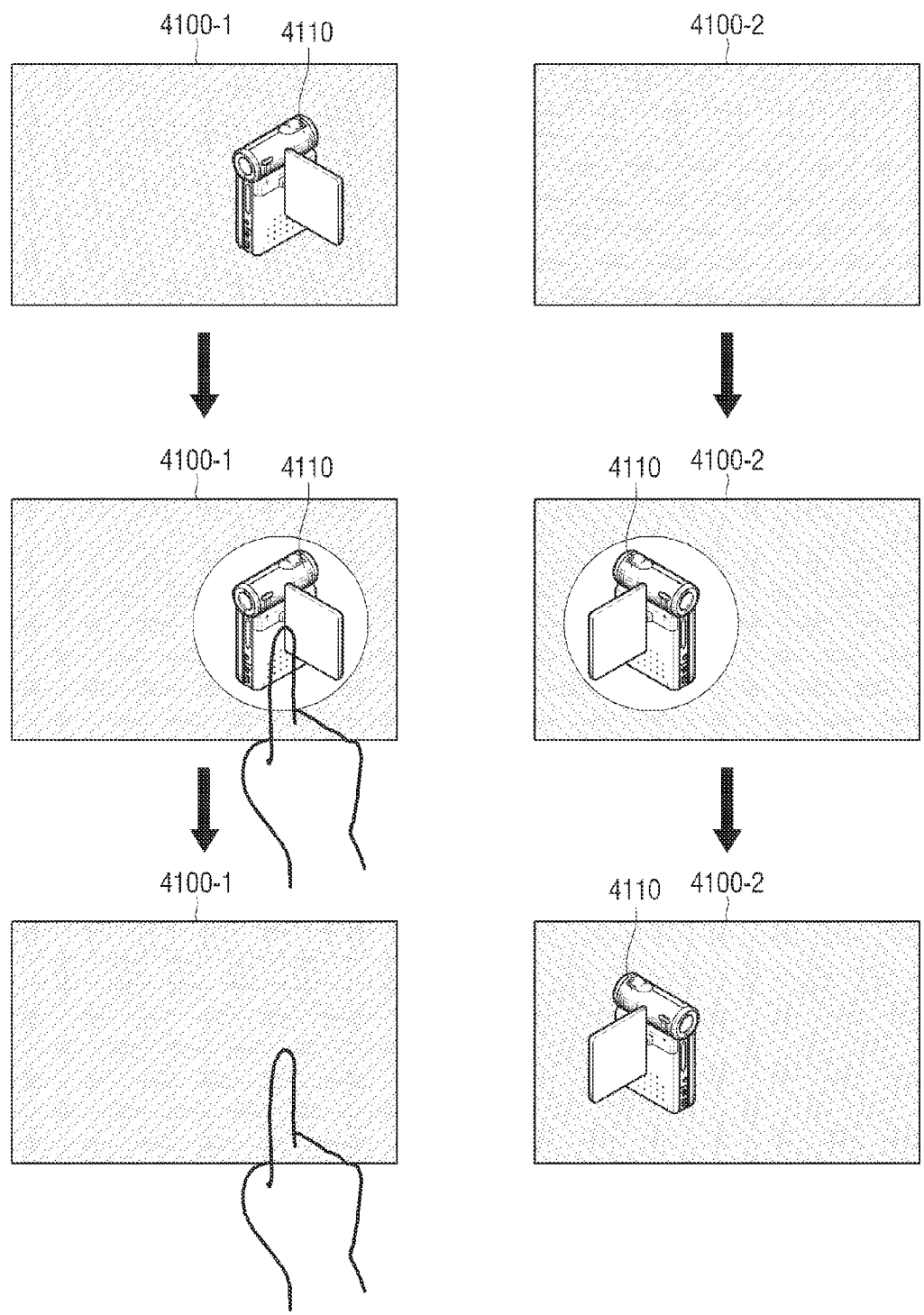
FIG. 41 is a view provided to explain a method for changing an object displayed on an individual job screen to a state perceivable at an opposite side according to an embodiment of the present disclosure.

FIG. 41 is a view provided to explain a method for changing an object displayed on an individual job screen to a state perceivable at an opposite side according to an embodiment of the present disclosure.

Referring to FIG. 41, a left side of FIG. 41 illustrates a front side 4100-1 of the individual job screen, while a right side of FIG. 41 illustrates a front side 4100-2 of the individual job screen. The object 4110 is displayed on the front side 4100-1 of the individual job screen. When the user long-presses the object 4110, as shown on the left side of FIG. 41, the pressed object 4110 is changed to the cooperative job screen. Accordingly, the pressed object 4110 disappears from the front side 4100-1 of the individual job screen and appears on the back side 4100-2, as shown on the right side of FIG. 41. As explained above, the user is able to control the operation of the transparent display apparatus 100 with various interactions.

Figure 42:
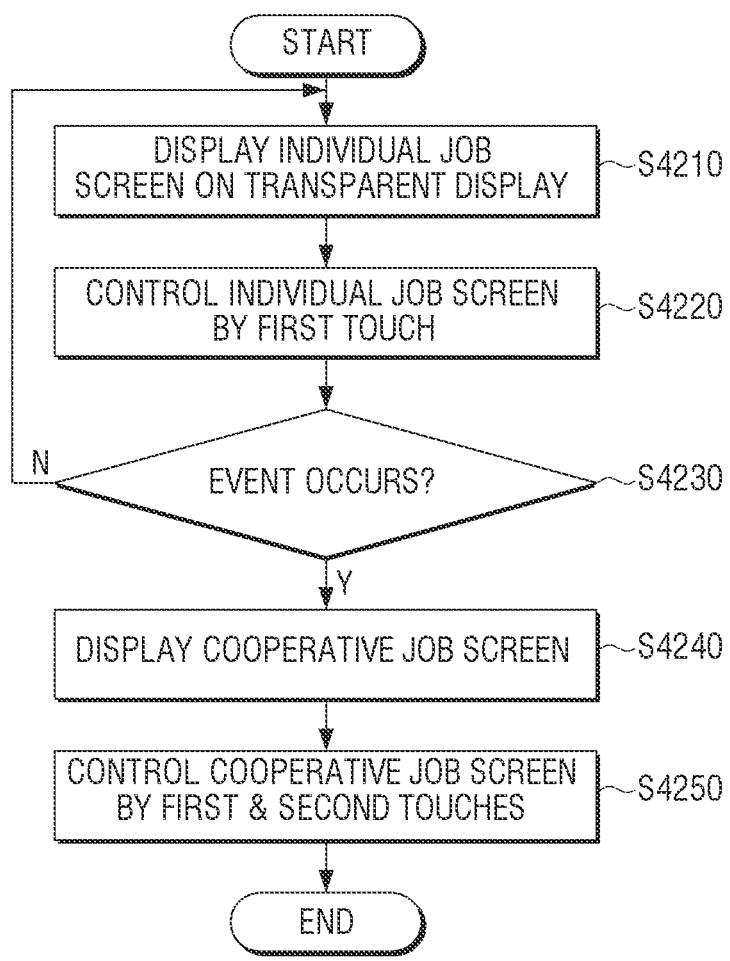
FIG. 42 is a flowchart provided to explain a display method of a transparent display apparatus according to another embodiment according to an embodiment of the present disclosure.

FIG. 42 is a flowchart provided to explain a display method of a transparent display apparatus according to an embodiments of the present disclosure.

Referring to FIG. 42, at operation S4210, the transparent display apparatus displays an individual job screen on the transparent display. At operation S4220, the transparent display apparatus 100 controls the individual job screen according to a first touch which is inputted to a direction where the individual job screen is displayed. When an event to display a cooperative job screen occurs at operation S4230, then at operation S4240, the cooperative job screen is displayed. Various types of events may be implemented. For example, the individual job screen may be entirely changed to the cooperative job screen, when a preset user manipulation is inputted on the individual job screen or when an event of selecting a screen change menu occurs.

Alternatively, the transparent display apparatus 100 may additionally display the cooperative job screen on one side of the individual job screen, when an event of dragging to one side of the individual job screen occurs. Additionally, when a user manipulation is inputted in the unit of objects, areas, or screens, as explained with reference to FIGS. 36, 37 and 38, some objects, areas or entire screen may be changed to the cooperative job screen attributes according to such manipulation.

In operation S4250, the transparent display apparatus 100 cooperatively controls the cooperative job screen in accordance with the first and second touches, when the cooperative job screen is displayed. By using the cooperative job screen, a plurality of users are able to perform a job in cooperation with each other.

In summary, according to the various embodiments, the screens are displayed by properly using the plurality of transparent display layers. Thus, user satisfaction may be improved. Meanwhile, the methods according to the various embodiments may be programmed and stored in various storage mediums, such as non-volatile computer readable storage mediums. Therefore, the methods according to the above various embodiments may be implemented in various types of electronic devices that implement the storage mediums.

Specifically, according to an embodiment, a non-transitory computer readable recording medium may store programs which consecutively perform displaying the first screen on the first transparent display layer among the plurality of transparent display layers, displaying the second screen on the second transparent display layer which is another layer among the plurality of the transparent display layers when the preset event occurs, and converting the layers that at least one of the first screen and the second screen is displayed according to a user command.

Alternatively, a non-transitory computer readable medium may be provided, storing therein a program to perform, in sequence, displaying an individual job screen on a transparent display, controlling the individual job screen according to a first touch inputted to a first surface of the transparent display, displaying a cooperative job screen on the transparent display when a preset event occurs, and cooperatively controlling the cooperative job screen in accordance with the first touch inputted to the first surface of the transparent display and a second touch inputted to the other surface.

Accordingly, a display method according to various embodiments may be implemented in an apparatus mounted with a non-transitory computer readable medium. Non-transitory computer readable recording medium may be medium which store data semi-permanently, such that the storing is non-transitory, and can be read by devices. Specifically, the above various applications or programs may be stored and provided in non-transitory computer readable recording medium such as a Compact Disk (CD), a Digital Versatile Disk (DVD), a hard disk, a Blu-ray disk, a USB, a memory card, or a ROM or any other similar and/or suitable non-transitory computer readable recording medium.

Further, the foregoing various embodiments and advantages are merely exemplary and are not to be construed as limiting the various embodiments. The present teaching can be readily applied to other types of apparatuses. Also, the description of the various embodiments of the present disclosure concept is intended to be illustrative, and not to limit the scope of the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A transparent display apparatus, the transparent display apparatus comprising:
   a display including a plurality of transparent displays, the plurality of transparent displays comprising a first transparent display and a second transparent display which is lower than the first transparent display; and
   at least one processor configured to:

control the display to display a first screen on the first transparent display, control to receive a first touch input while the first transparent display displays the first screen, in response to the first touch input, control the display to display a second screen related to contents provided within the first screen on the second transparent display and to maintain a state in which the first transparent display displays the first screen, control to receive a second touch input, and in response to the second touch input, control the display to display the first screen on the second transparent display and the second screen on the first transparent display for a predefined time before reverting.

2. The transparent display apparatus of claim 1, wherein the first screen and the second screen have independent sources respectively providing independent multimedia contents.

3. The transparent display apparatus of claim 1, wherein the at least one processor is further configured to separately adjust display features of the first screen and the second screen according to surrounding situation information, and wherein the display features include at least one of transparency, color, size, display position, display time, display shape, or resolution.

4. The transparent display apparatus of claim 1, further comprising:

a first touch sensor configured to sense user touches on the transparent display placed in a first direction from among the plurality of transparent displays; and a second touch sensor configured to sense user touches on the transparent display placed in a second direction opposite to the first direction from among the plurality of transparent displays, wherein the at least one processor is further configured to control operations performed by the plurality of transparent displays according to user touches sensed in at least one of the first touch sensor or the second touch sensor.

5. The transparent display apparatus of claim 1, further comprising:

a sensor configured to sense a user position, wherein the at least one processor is further configured to set a resolution of a screen displayed on the backside transparent display to be higher than that of a screen displayed on the transparent display placed toward user from among the plurality of the transparent displays.

6. The transparent display apparatus of claim 1, further comprising:

a sensor configured to sense a rotation of the transparent display apparatus, wherein the at least one processor is further configured to:
reverse at least one of the first screen and the second screen vertically or horizontally, and
display the at least one of the first screen and the second screen so as to correspond to the rotation, when the rotation of the transparent display apparatus is sensed by the sensor.

7. The transparent display apparatus of claim 1, wherein the at least one processor is further configured to move and display the first screen or objects within the first screen to a corresponding transparent display from among the plurality of transparent displays, and wherein the corresponding transparent display being disposed at a depth corresponding to user touches when the user touches are performed on the first screen.

8. The transparent display apparatus of claim 1, wherein the first event corresponds to a touch on the first screen, and wherein the at least one processor is further configured to:
generate a previous screen or a next screen of the first screen as second screen, and
display the second screen on the second transparent display when the first event occurs.

9. The transparent display apparatus of claim 1, wherein the second transparent display is a lower than the first transparent display, wherein the second screen is displayed on an overlapping area with the first screen from among a whole area of the second transparent display, and wherein the at least one processor is further configured to:
display the first screen while the second screen is being rendered, and
remove the first screen when the rendering the second screen is completed.

10. The transparent display apparatus of claim 1, wherein the second transparent display is a lower than the first transparent display, wherein the second screen is displayed on an overlapping area with the first screen from among a whole area of the second transparent display, and wherein the at least one processor is further configured to modify a shape of the first screen to expose the second screen which is shielded by the first screen when a user touches the first screen.

11. The transparent display apparatus of claim 1, wherein the first screen is a download implementing screen to implement contents downloading, and wherein the second screen is a download situation displaying screen to display at least one of a download processing degree of the selected contents, an expected completion time, a contents feature information or a contents source information, when contents is selected and a download begins in the download implementing screen.

12. The transparent display apparatus of claim 1, wherein the first screen is contents playing screen to play and output contents, and wherein the second screen is an information screen to display at least one of feature information of the contents playing on the first screen, information indicating a contents playing degree, a controlling menu to control a contents playing operation, a previous contents information, a next contents information, or a contents list.

13. The transparent display apparatus of claim 1, wherein the second screen is an additional information screen including at least one of a remaining battery amount, a communication situation, time information, system informing information, volume information, network connecting information, setup information, date information, weather information, text message receiving situation information, or missed call information.

14. The transparent display apparatus of claim 1, wherein, when user touches are performed on the transparent display to display the first screen, the at least one processor is further configured to display feedback effects corresponding to the user touches at an area corresponding to the touched point of the second transparent display that is arranged on a lower of the first transparent display.

15. The transparent display apparatus of claim 1,
wherein the at least one processor is further configured to adjust display features of the second screen differently from display features of the first screen, and
wherein the display features are at least one of transparency, color, size, display position, display time, display shape, or resolution.

16. The transparent display apparatus of claim 1, wherein the at least one processor is further configured to display the second screen at an area that is not overlapped with the first screen from among a whole area of the second transparent display.

17. The transparent display apparatus of claim 1,
wherein the first event includes at least one of an event to input user touches, an event to input a command to implement additional applications, an event to input a command to play additional contents, an event to approach a predetermined time, or an event to generate system informing messages, and
wherein the second event includes at least one of an event to perform a long touch, an event to perform a double touch, an event to perform a touch & drag, an event to perform a flick, an event to approach another predetermined time, or an event to generate new informing messages.

18. A display method of the transparent display apparatus including a plurality of transparent displays, the plurality of transparent displays having a first transparent display and a second transparent display which is lower than the first transparent display, the display method comprising:
    displaying a first screen on the first transparent display from among the plurality of transparent displays;
    receiving a first touch input while the first transparent display displays the first screen;
    in response to the first touch input, displaying a second screen related to contents provided within the first screen on the second transparent display and maintaining a state in which the first transparent display displays the first screen;
    receiving a second touch input; and
    in response to the second touch input, displaying the first screen on the second transparent display and the second screen on the first transparent display for a predetermined time before reverting.

* * * * *